US012706764B2

(12) United States Patent
Kaye

(10) Patent No.: US 12,706,764 B2
(45) Date of Patent: Aug. 11, 2026

(54) SYSTEM AND METHOD FOR DECENTRALISED, SCALABLE, AND SECURE CONSENSUS BETWEEN COOPERATING BLOCKCHAIN SYSTEMS

(71) Applicant: The Amaroo Verein, Baar (CH)

(72) Inventor: Max Kaye, Newtown (AU)

(73) Assignee: THE AMAROO VEREIN, Baar (CH)

( * ) Notice: Subject to any disclaimer, the term of this patent is extended or adjusted under 35 U.S.C. 154(b) by 235 days.

(21) Appl. No.: 18/568,103

(22) PCT Filed: Jun. 10, 2022

(86) PCT No.: PCT/AU2022/050578
§ 371 (c)(1), (2) Date: Dec. 7, 2023

(87) PCT Pub. No.: WO2022/256880
PCT Pub. Date: Dec. 15, 2022

(65) Prior Publication Data
US 2024/0297800 A1 Sep. 5, 2024

(30) Foreign Application Priority Data
Jun. 10, 2021 (AU) ................................ 2021901746

(51) Int. Cl.
*H04L 9/00* (2022.01)
*H04L 9/40* (2022.01)

(52) U.S. Cl.
CPC .............. *H04L 9/50* (2022.05); *H04L 63/123* (2013.01); *H04L 2209/56* (2013.01)

(58) Field of Classification Search
CPC ...... H04L 9/50; H04L 63/123; H04L 2209/56
(Continued)

(56) References Cited

U.S. PATENT DOCUMENTS 11,212,110 B1 * 12/2021 Griffin .................. H04L 9/3247
2019/0081793 A1 3/2019 Martino et al.
2021/0109797 A1 * 4/2021 Zhou ...................... G06Q 20/42

FOREIGN PATENT DOCUMENTS

CN 109886661 A 6/2019
CN 112631836 A 4/2021
(Continued)

OTHER PUBLICATIONS

International Search Report and Written Opinion, International Application No. PCT/AU2022/050578, mailed Aug. 26, 2022.

*Primary Examiner* — Lan Dai T Truong
(74) *Attorney, Agent, or Firm* — MARSHALL, GERSTEIN & BORUN LLP

(57) ABSTRACT

A method of maintaining integrity of a distributed block chain, including blocks of at least a first and second block chain sequence of blocks, the method including: (a) with the blocks of at least a first and second block chain sequence of blocks, reflecting at least the headers of a first block of the first chain in a subsequent first block of the second block chain; (b) reflecting at least the headers of the subsequent first block in a subsequent block of the first chain; (c) for the first chain, and the subsequent block, finding the most recently reflected first block in the reflected subsequent first block; (d) establishing the most recently reflected first block is known to the most recently reflected second block; and (e) establishing that the second block is known to the current second block and wherein the reflecting includes incorporating the header information of a block of one blockchain into the block of the other blockchain.

21 Claims, 24 Drawing Sheets

(58) Field of Classification Search
USPC ........................................................... 380/28
See application file for complete search history.

(56) References Cited

FOREIGN PATENT DOCUMENTS

| | | | |
|---|---|---|---|
| EP | 3520317 | B1 | 5/2021 |
| WO | WO-2017/168159 | A1 | 10/2017 |

* cited by examiner

Step 1: Chain R images Chain L; thus Chain R hosts a *projection* of Chain L.

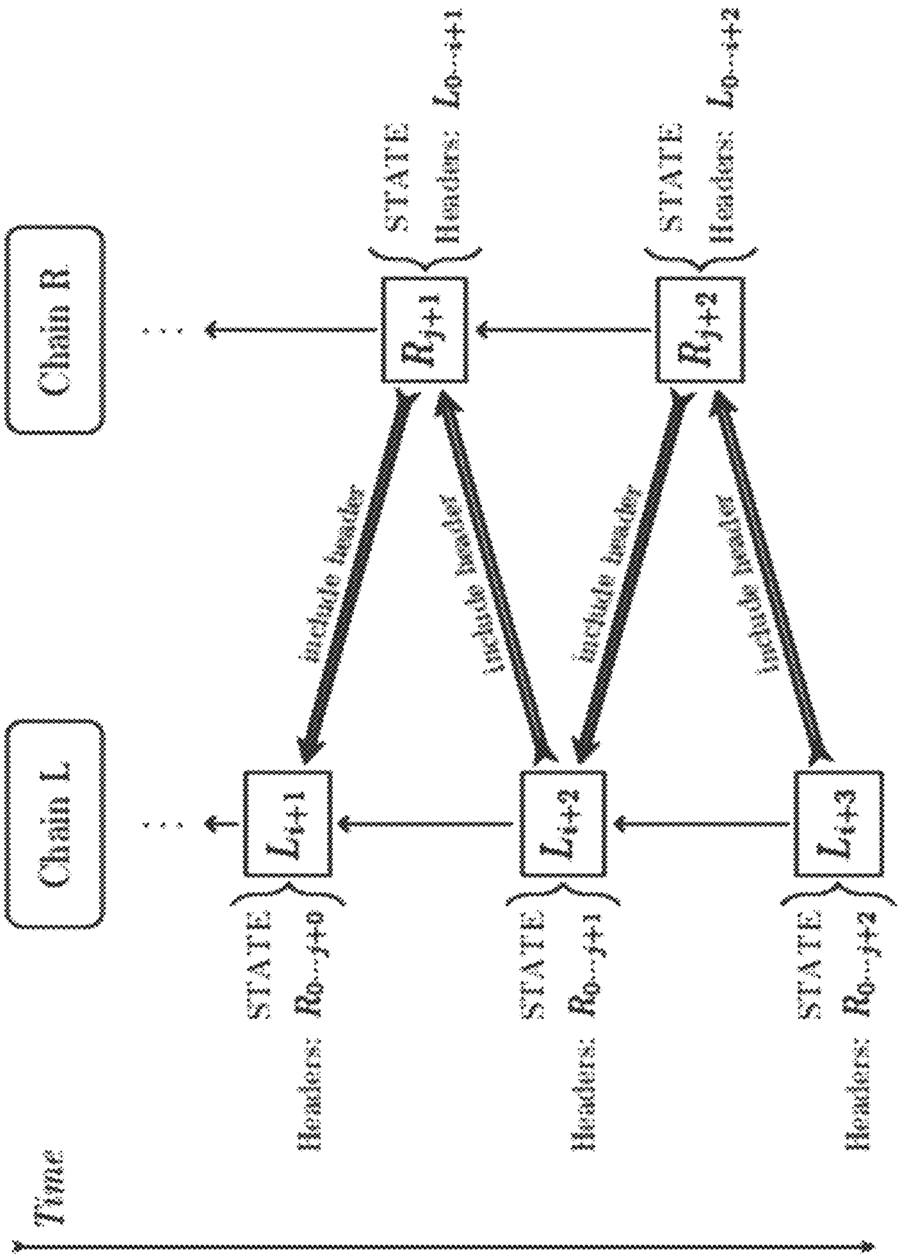
Fig. 5 Step 2: Chain L and Chain R contain a projection of each other's headers-only chain.

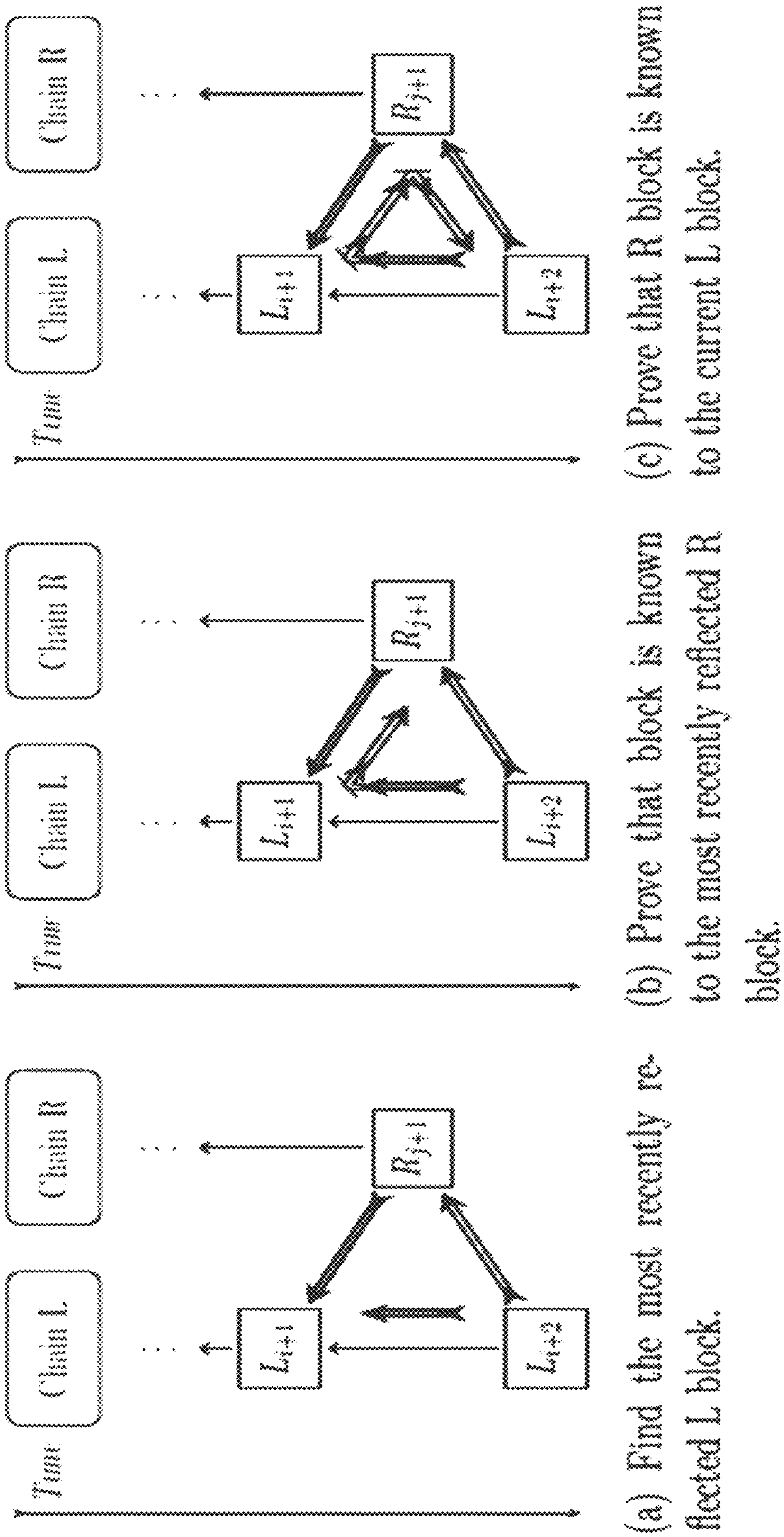
Fig. 6 Incrementally constructing a *proof of reflection*.

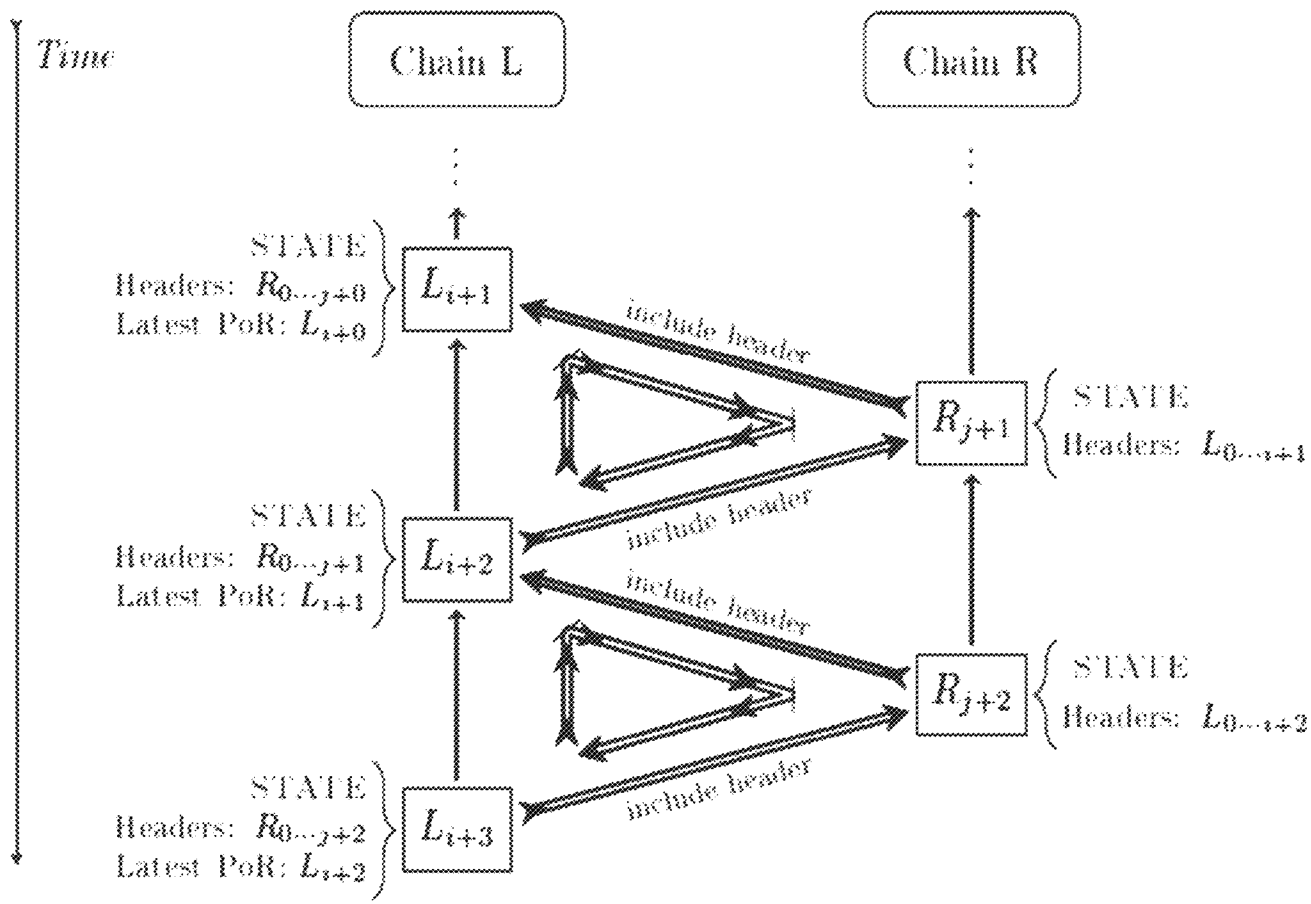
Fig. 7 Step 3: Chain L includes *proofs of reflection* (PoRs) along with headers. Proofs of Reflection allow Chain L to know which of its own blocks are known to Chain R.

Algorithm 1 Vanilla chain-weight algorithm (typical of traditional blockchains).

```
procedure ChainWeight(blocks, state)                               ▷ The weight of a chain
    if length(blocks) == 0 then
        return 0
    end if
    return BlockWeight(head(blocks), state) + ChainWeight(tail(blocks), state)
end procedure

                                                           ▷ The weight of an individual block
procedure BlockWeight(block, state)                        ▷ NB: defined by the consensus method
    return LocalBlockWeight(block, state) end
procedure
```

Fig. 8

Algorithm 2 Modified chain-weight algorithm to factor in reflections.

```
procedure ChainWeight(blocks, state)                               ▷ The weight of a blockchain
    if length(blocks) == 0 then
        return 0
    end if
    return BlockWeight(head(blocks), state) + ChainWeight(tail(blocks), state)
end procedure

procedure BlockWeight(block, state)
    W_l ← LocalBlockWeight(block)                   ▷ Weight due to work done producing block
    W_r ← ReflectedBlockWeight(block, state)                        ▷ Weight added via reflection
    return W_l + W_r
end procedure

procedure ReflectedBlockWeight(L_i, state)
    w ← 0                                                                      ▷ Sum of weights
    R_blocks ← ReflectingRBlocks(state)             ▷ Chain R blocks that reflect the local chain
    for R_i in R_blocks do
        RCHs ← ReflectedChainHeads(R_i, state)                  ▷ Local blocks reflected by R_i
        if L_i in RCHs then
            w    w + WeightOf(R_i, state)             ▷ NB: network specific, e.g., Algorithm 3
        end if
    end for
    return w
end procedure
```

Fig. 9

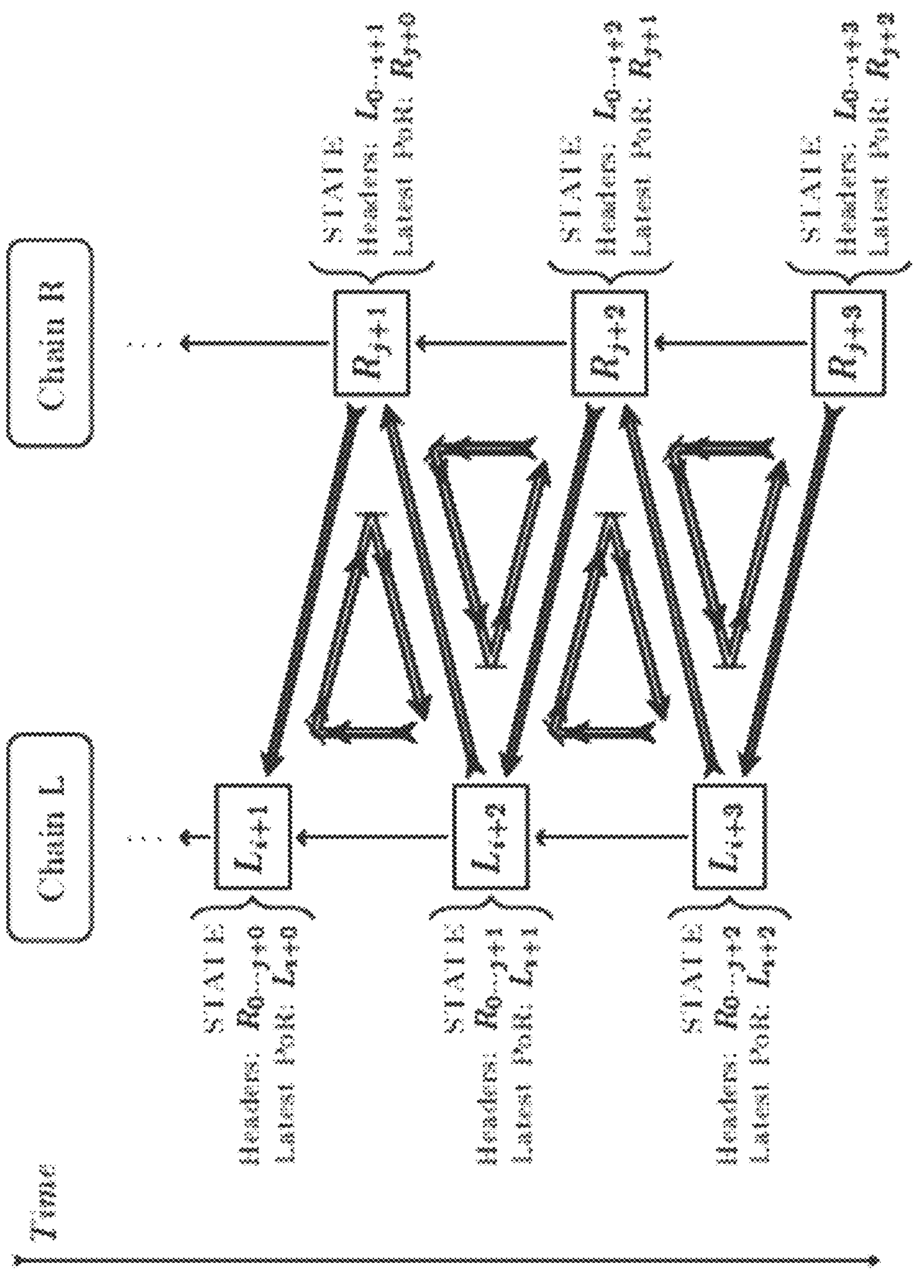
Fig. 10 Step 5: *Proof of Reflection* between two UT Chains, Chain L and Chain R

Algorithm 3 A WeightOf for networks of a single root token.

```
procedure WeightOf(B_i, state)                          ▷ The weight of a reflecting block in L-hashes
    t ← BlockTimestamp(B_i)
    R ← ChainOf(B_i, state)                             ▷ Either the local or a reflecting chain
    R_r ← BlockRewardOfAt(R, t, state)                  ▷ L-coins/R-block — by definition
    L_d ← LocalBlockDifficultyAt(t, state)
    L_r ← LocalBlockRewardAt(t, state)
    return R_r · (L_d ÷ L_r)                            ▷ See Equation 16 (Note: R_d cancels out)
end procedure
```

Fig. 13

Algorithm 4 A WeightOf function for networks of a single root token based on the ratio of root tokens that it hosts.

```
procedure WeightOf(R_i, state)                          ▷ Returns L-hashes
    t ← BlockTimestamp(R_i)
    R ← ChainOf(R_i, state)
    R_f ← BlockFrequencyOfChain(R, state)               ▷ Block production Hz of R
    R_t ← RootTokensOnChainAt(R, t, state)              ▷ Number of root tokenson R at t
    L_d ← LocalBlockDifficultyAt(t, state)
    L_f ← LocalBlockBlockFrequency(t, state)
    L_t ← LocalRootTokens(t, state)
    return ConvSRT_{R→L}(L_d, L_f, L_t, R_f, R_t)
end procedure

procedure ConvSRT_{R→L}(L_d, L_f, L_t, R_f, R_t)        ▷ Returns L-hashes for 1 R-block
    return R_t · L_f · L_d ÷ L_t ÷ R_f                  ▷ See Equation 19
end procedure
```

Fig. 15

Algorithm 5 A WeightOf function for one-way PoR between chains with different root tokens.

```
procedure WeightOf(B_i, state)                    ▷ Convert reflecting weight to local via a DEX
    t ← BlockTimestamp(B_i)
    R ← ChainOf(B_i, state)
    R_r ← BlockRewardOfChainAt(R, t, state)                          ▷ Block reward of R at t
    L_d ← DifficultyOfLocalAt(t, state)
    L_r ← BlockRewardOfLocalAt(t, state)
    X_{R→L} ← GetLocalDexRateFromAt(R, t, state)
    return ConvDEX_{R→L}(L_d, L_r, R_r, X_{R→L})
end procedure

procedure ConvDEX_{R→L}(L_d, L_r, R_r, X_{R→L})              ▷ Returns L-hashes for 1 R-block
    return (L_d ÷ L_r) · X_{R→L} · R_r                                    ▷ See Equation 20
end procedure
```

Fig. 16

Algorithm 6 Implementation of REFLECTEDBLOCKWEIGHT to support an arbitrary number of reflecting chains.

```
procedure ReflectedBlockWeight(L_i, state)
    w ← 0                                                ▷ Sum of weights
    for R in AllReflectingChains(state) do
        w_R ← 0                                ▷ Sum of converted weights for this R
        n_R ← 0                                      ▷ Count of reflecting blocks
        R_blocks ← ChainHeadsOfVia(R, L_i, state)    ▷ R chain-heads known to L_i
        for R_i in R_blocks do
            RCHs ← ReflectedChainHeads(R_i, state)   ▷ Local blocks reflected by R_i
            if L_i in RCHs then
                n_R ← n_R + 1
                w_R ← w_R + WeightOf(R_i, state)          ▷ Convert weight of R_i
            end if
        end for
        weightMod ← CapWorkOf(R, n, state)
        w ← w + w_R · weightMod
    end for
    return s
end procedure      ▷ This is an inefficient method and would not be used in production.

procedure CapWorkOf(R, n, state)           ▷ A simplistic method for capping work
    L_f ← BlockFrequencySelf(state)
    R_f ← BlockFrequencyOfChain(R, state)
    e ← R_f ÷ L_f                           ▷ Expected blocks from R per L block
    return min(1, e ÷ max(1, n))        ▷ Cap the contribution of R_blocks per L block
end procedure
```

Fig. 19

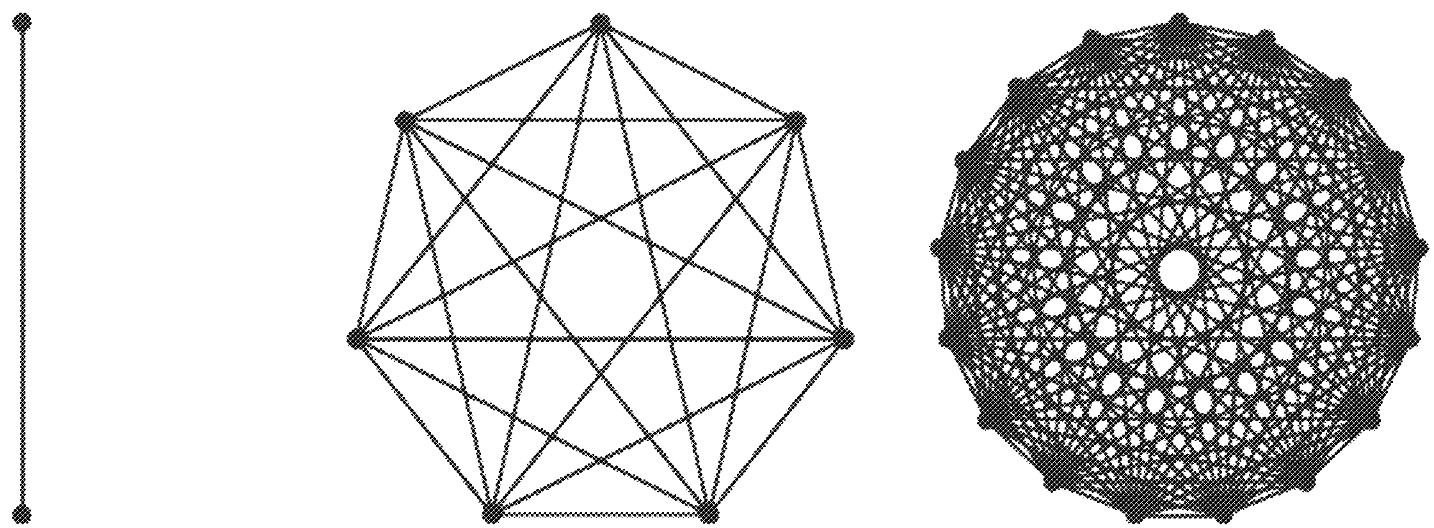
(a) Proof of Reflection between 2 blockchains. A 1-simplex. The most basic non-trivial simplex.
(b) Proof of Reflection between 7 blockchains; a 7-chain simplex; a 6-simplex.
(c) A 17-chain simplex; a 16-simplex. It has 136 unique mutual reflections in total.
Fig. 20 Simplexes of increasing capacity. Vertices are simplex-chains. Edges are the reflections between simplex-chains.

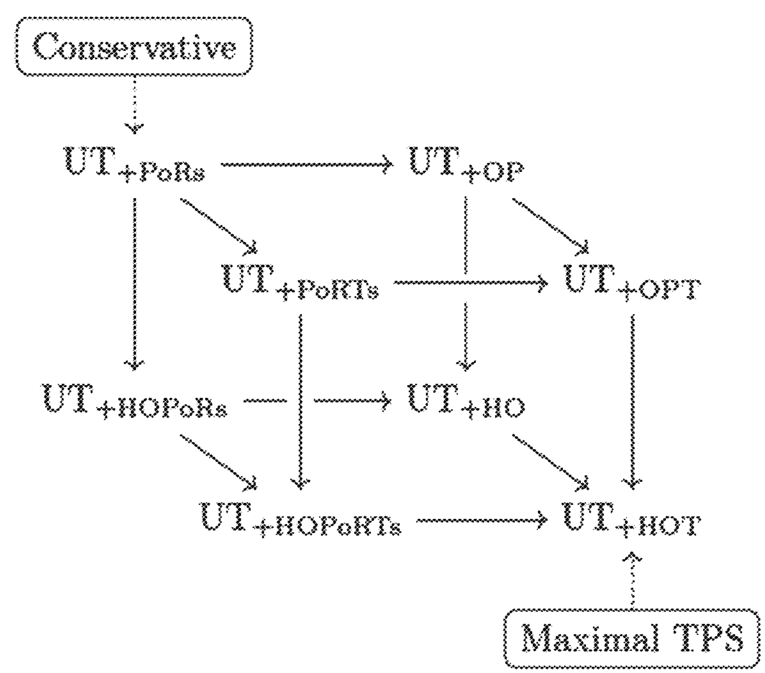
Fig. 21 Possible upgrade paths between UT variants, starting at $UT_{+PoRs}$ in the top left – the most conservative variant. Solid arrows show paths of increasing capacity.

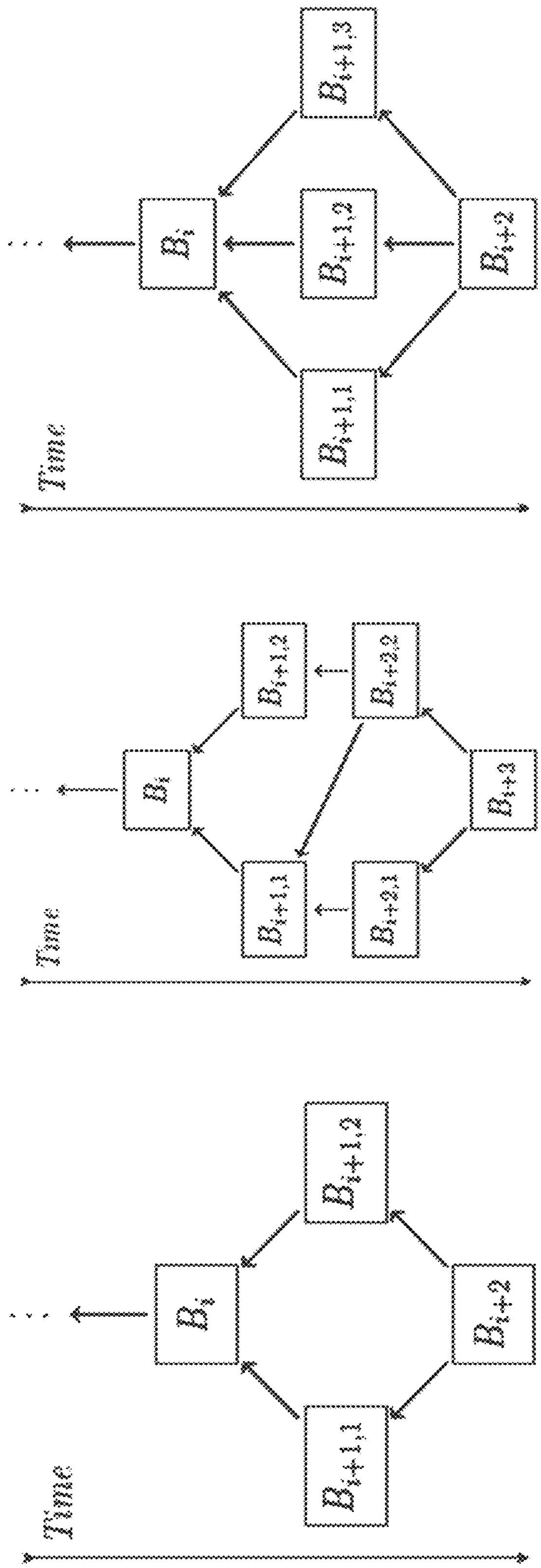
(a) A simple 2-parent example of a block-dag segment.
(b) A slightly more complex example of a block-dag segment.
(c) A 3-parent example of a block-dag segment.
Fig. 22 Some examples of simple block-dag segments.

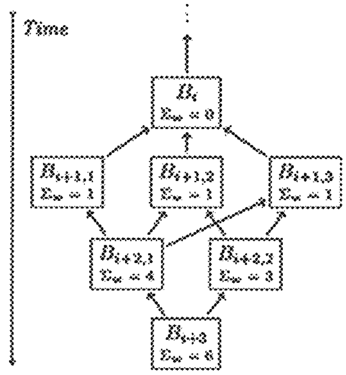

(a) How should we order this block-DAG? Note: children should *always* be after their parents, and *prioritization* means *earlier execution*.

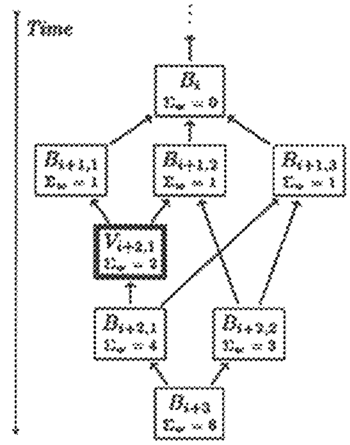

(b) The first thing we should do is create any virtual nodes that are required ($V_{i+2,1}$).

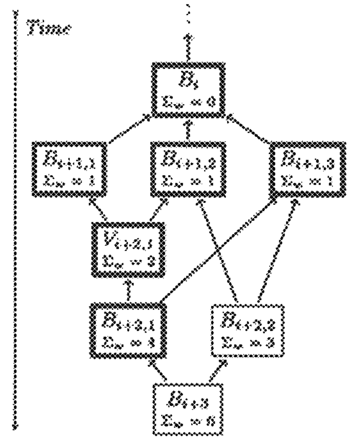

(c) Since there are two parents, we look at the *prioritized subgraph* (i.e., most worked).

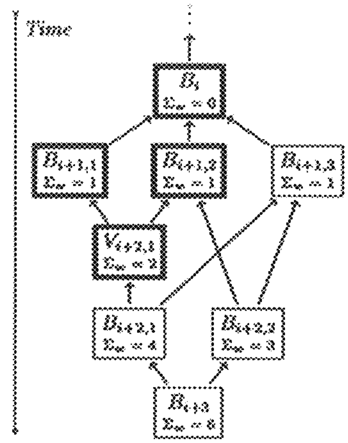

(d) Again, there are two parents, so we look at the *next* prioritized subgraph.

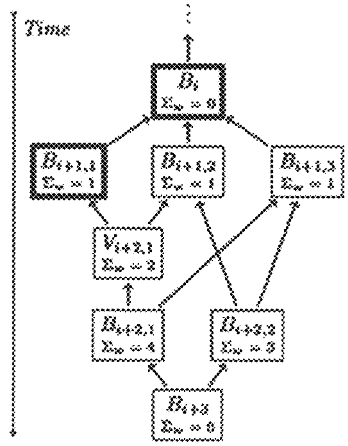

(e) We've found a chain. These blocks have the highest priority, so are executed first.

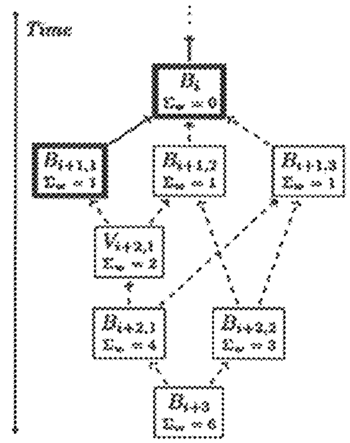

(f) We're now *ordering* the blocks – the solid arrows represent the final ordering. In this step we order the highest priority blocks.

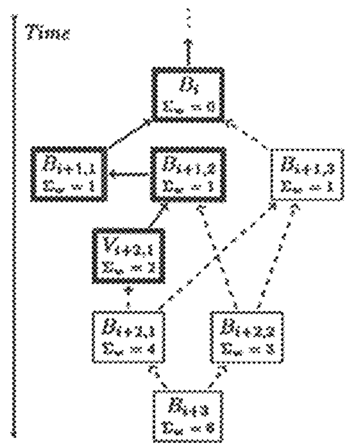

(g) Now that the highest priority blocks are ordered, we can order the *previous* subgraph.

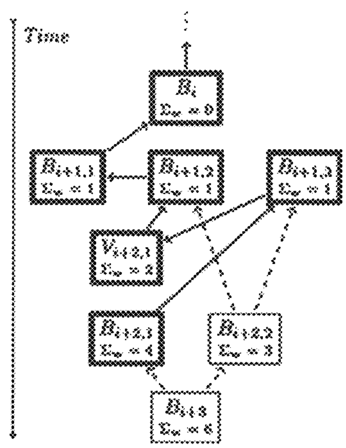

(h) Once more, we order the next-in-line subgraph.

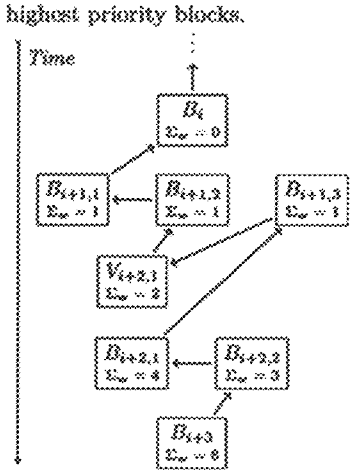

(i) And finally we order the last remaining blocks. (We could remove virtual blocks too).

Fig. 23 Example: sorting a moderately complex block-DAG; note that the left parent is always the best parent, so will have priority. Each block is annotated with its *chain-weight* ($\Sigma_w$).

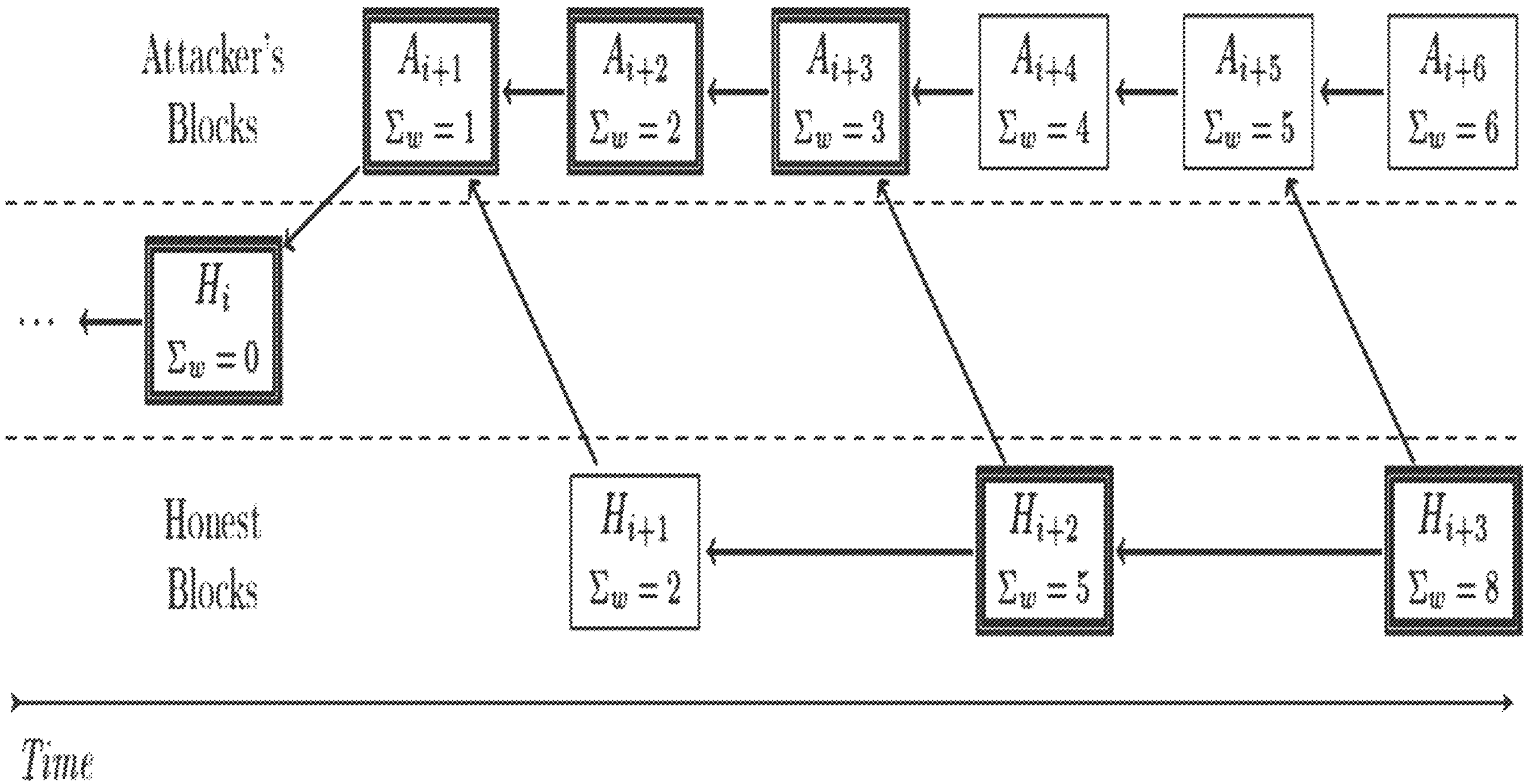

Fig. 24 An attempted DoS attack on a block-DAG. The attacker's blocks, $A_j$, are mined in public and contain no transactions. Each block is annotated with its *chain-weight* ($\Sigma_w$). Even though the attacker produces 2× as many blocks as the honest network, the attack inevitably fails after a short while. NB: $H_i$ is defined to have $\Sigma_w = 0$ for illustrative convenience.

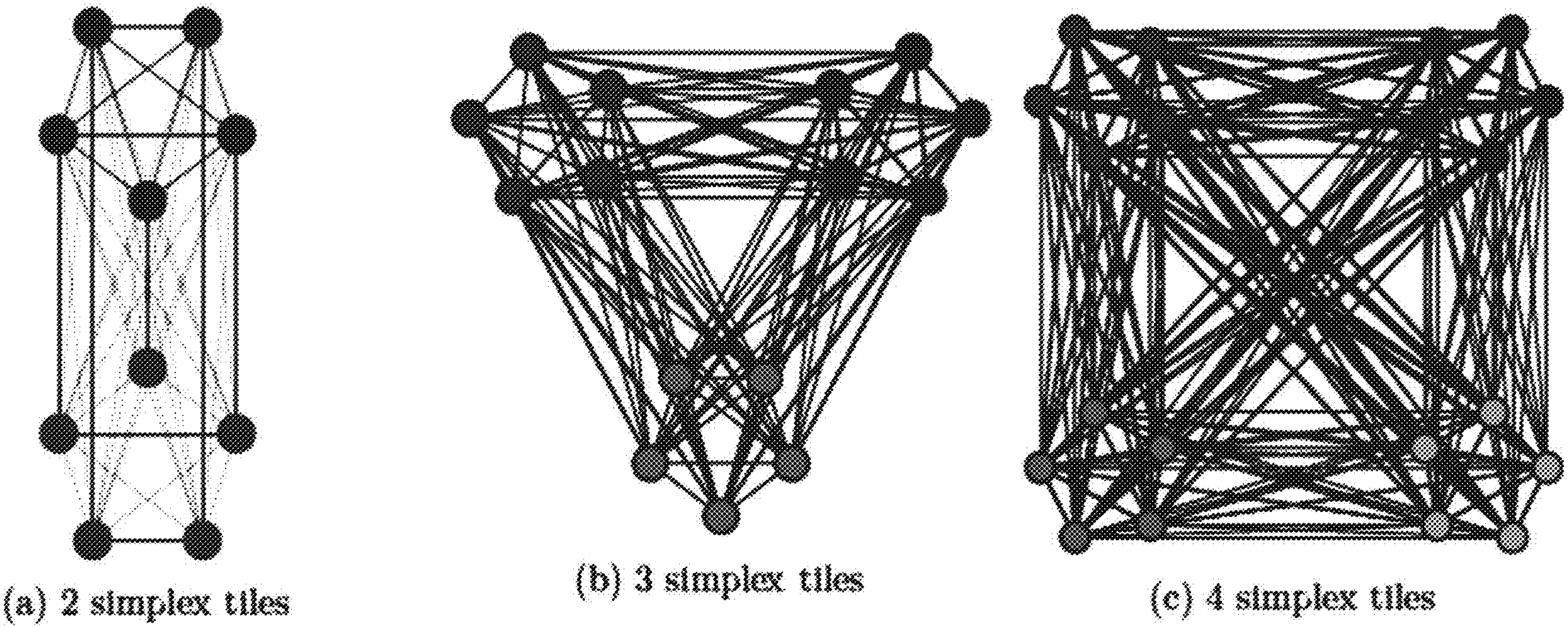
(a) 2 simplex tiles
(b) 3 simplex tiles
(c) 4 simplex tiles
Fig. 27
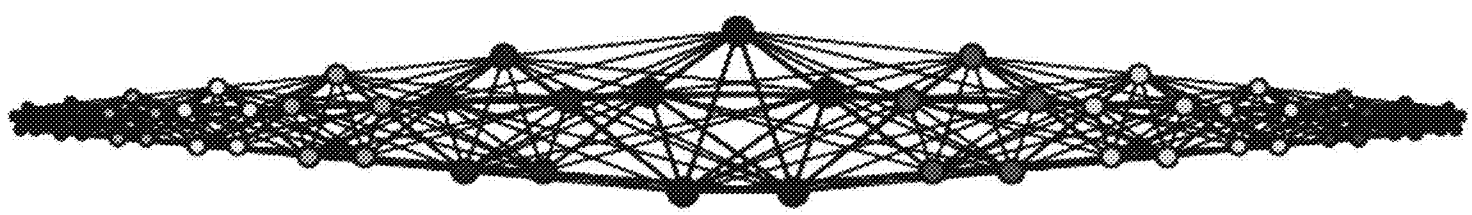
Fig. 28 The only unbounded tiling at $v = 2$. Although it is unbounded (we can always keep adding tiles), the *distance* between those tiles is proportional to the size of the network – so this isn't scalable.

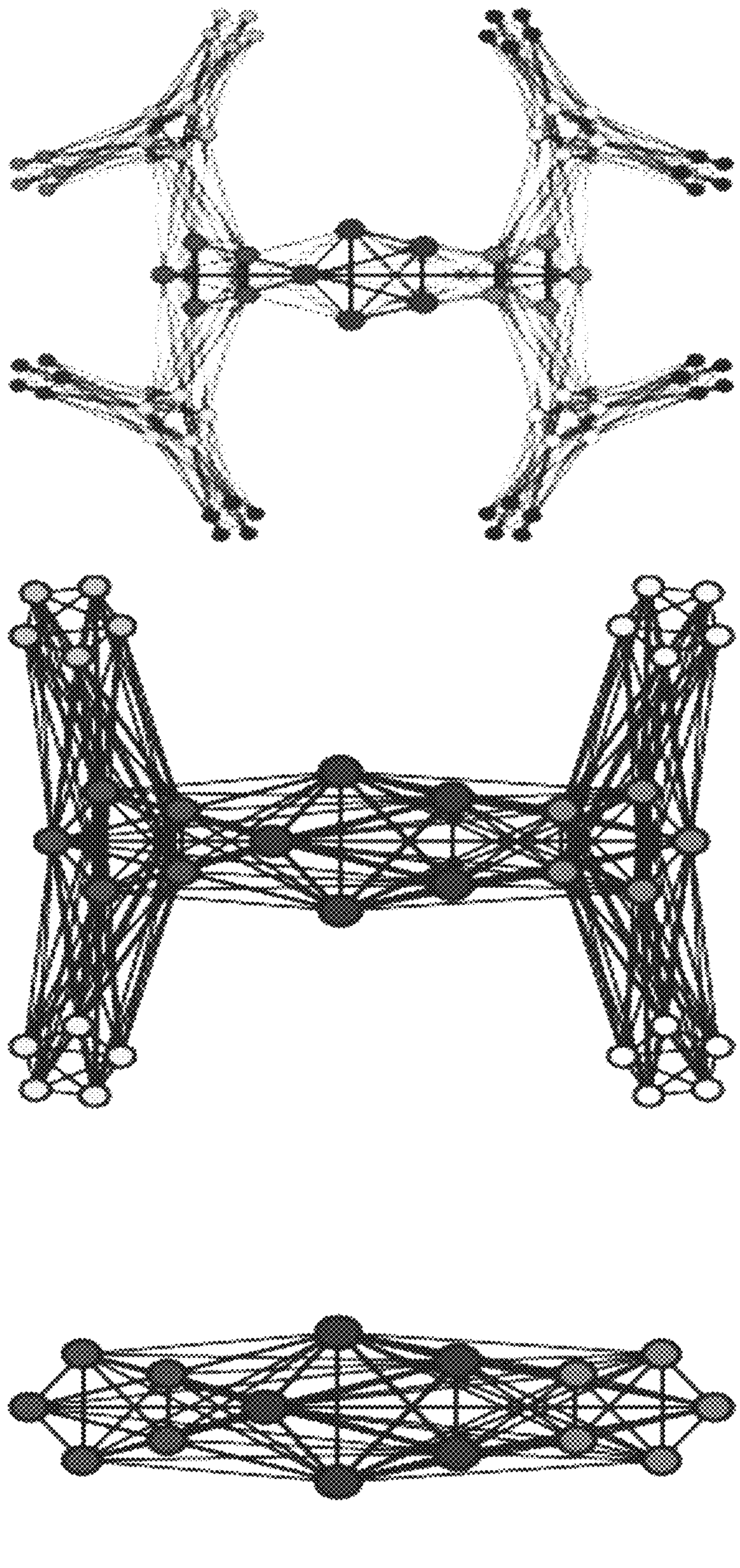
(a) 1st iteration. 3 tiles.
(b) 2nd iteration. 7 tiles.
(c) 3rd iteration. 15 tiles.
Fig. 29 Constructing a binary tree-tiling; the first 3 iterations.

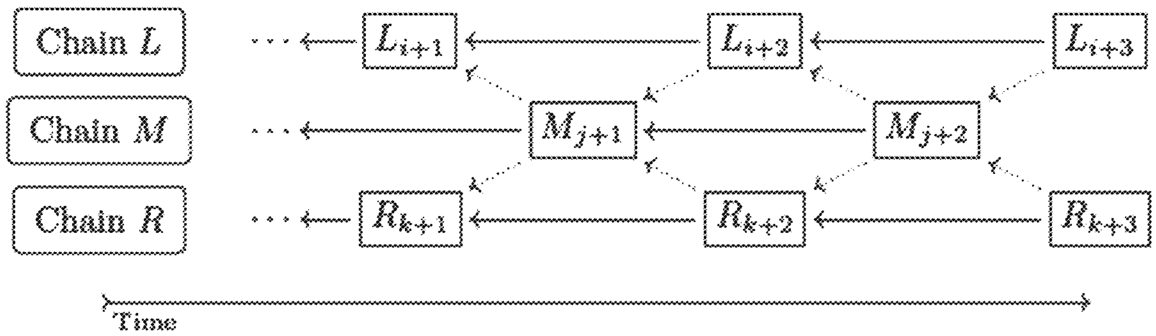
Fig. 30 A diagram of chain-segments demonstrating the simplest case of recursive PoR. Solid arrows indicate the usual child-parent relationship, and dotted arrows (⇠) indicate reflection.
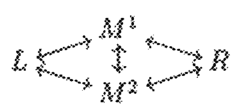
Fig. 31
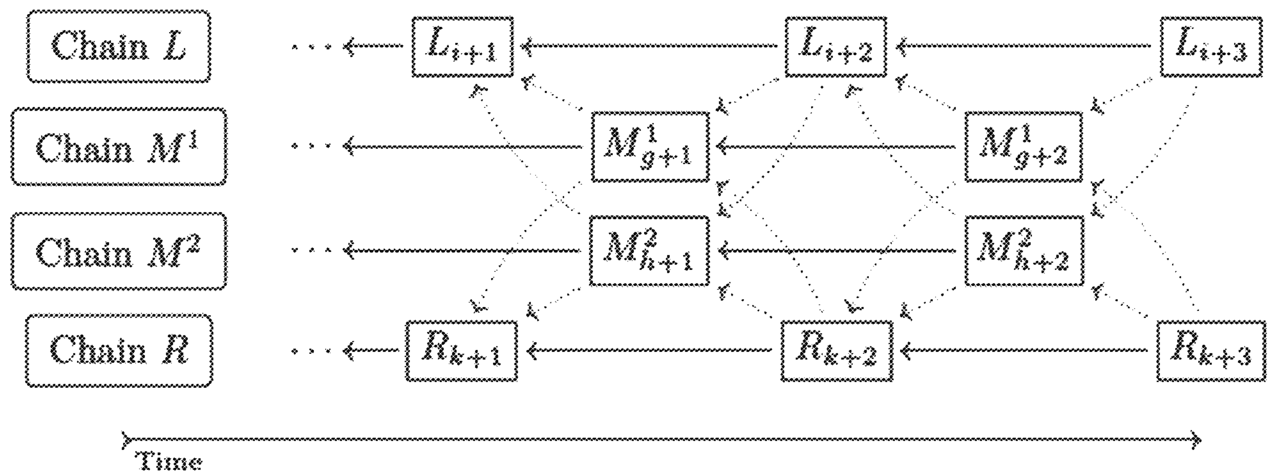
Fig. 32 Note that reflections between $M^1$ and $M^2$ are not shown.

SYSTEM AND METHOD FOR DECENTRALISED, SCALABLE, AND SECURE CONSENSUS BETWEEN COOPERATING BLOCKCHAIN SYSTEMS

CROSS-REFERENCE TO RELATED APPLICATION

The present disclosure claims benefit of priority to Australian Provisional Patent Application Number: 2021901746 filed Jun. 10, 2021, entitled: "System and Method for Decentralised, Scalable, and Secure Consensus between Cooperating Blockchain Systems of Diverse Implementation", the contents of which are incorporated herein by reference. In jurisdictions where incorporation by reference is not permitted, the applicant reserves the right to add any or the whole of the contents of said Australian Provisional Patent Application Number: 2021901746 as an Appendix hereto, forming part of the specification.

FIELD OF THE INVENTION

The present invention provides for systems and methods for the provision of blockchain systems, and in particular avoids the trade-offs of capacity, decentralisation and security of blockchain systems.

BACKGROUND OF THE INVENTION

Any discussion of the background art throughout the specification should in no way be considered as an admission that such art is widely known or forms part of common general knowledge in the field.

Blockchains are economic data structures that provide an append-only transaction log that is secure against an attacker. That append-only log is extended via "blocks". Blocks are not created arbitrarily and the producers of blocks are typically rewarded. A block is a cryptographic data structure that includes a specific collection of transactions. Each block points back to one or more parent blocks. Typically, a newly created block will use the "tip" of the blockchain as its parent block(s). Once a new block has been created, it is broadcast over the network, and nodes will validate the block and extend their local copy of the blockchain. Thus, each newly created block provides new transactions, extends the chain, and allows future blocks to point back to it, facilitating an ongoing cycle of: create, broadcast, validate, append, create, etc.

When a new block is created, broadcast, validated, and accepted as an extension of the blockchain, that block provides a "confirmation" to all prior blocks, and to all transactions both in prior blocks and in the new block. Once a transaction has received a sufficient number of confirmations (and the corresponding block is still part of the canonical chain), the transaction is considered "confirmed". The number of "confirmations" that a block or transaction has is 1 plus the number of blocks that build on top of that block (or, for a transaction, the block that the transaction was contained in). A new block builds on top of all prior blocks that it is cryptographically dependent on.

Each block has a property called "weight" that corresponds to the amount of "work" that was required to create the block. For blockchains using a consensus system based on Proof of Work, "weight" and "work" are both measured in hashes-particularly, the average number of hashes that the network (in aggregate) needed to calculate in order to find a valid block. The weight of multiple blocks is simply the sum of their individual weights-thus the weight of the full chain is the sum of all blocks between its initial block (the genesis block) and the "best" known block. This is how a consensus algorithm chooses the best block: it is the valid block with the greatest total weight of all blocks between it and the genesis block. Block producers are incentivized to build on the best block because they receive a smaller reward (often 0) if they build on other blocks.

A function known as the fork rule encapsulates the specific calculations involved in how a particular consensus algorithm chooses the best block. Particularly, the fork rule determines which of two possible chain histories (complete sequences of blocks) is the canonical one—the one that block producers should build on and extend.

The security of a blockchain (or a network of chains) is measured by the amount of resources that an attacker would need in order to effect a double-spend. A double-spend is when an attacker makes a valid transaction, which then seems to be confirmed as a permanent part of the ledger, and then that attacker publishes previously private blocks that cause a chain reorganization. The effect of this is that the previously valid transaction is now invalid. A double-spend is conceptually similar to a credit card charge-back that is made after a consumer has received the goods.

The speed of a blockchain is inversely proportional to the duration that a user has to wait before a transaction is considered "confirmed". This duration is measured in "confirmations"—e.g., it is common for users to consider a Bitcoin transaction confirmed after 6 confirmations (which takes approximately 60 minutes). After this number of confirmations has occurred, it is taken that the chances of an attack succeeding are so low that the possibility can be dismissed-thus a transaction is considered secure after this point.

Blockchains typically specify that blocks have a header-a small data structure (usually between 100 and 1000 bytes large) that includes cryptographic metadata. That metadata typically includes (but is not limited to): the hash of the parent block(s), a cryptographic commitment (often a Merkle root or equivalent) to both/either the transactions included in the block and/or the current state of the blockchain, network information such as the difficulty, the timestamp of the block's creation, a nonce, and protocol version information. Certain classes of consensus protocols (e.g., those based on Proof of Stake) may require additional data to be included in the header.

Since a block header is distinct from the transactions in the corresponding block, a headers-only chain can be constructed. A headers-only version of a blockchain is typically sufficient to verify both the order of blocks (and thus transactions) and the chain-weight of the chain; however, the corresponding chain cannot be fully validated because the validity of all constituent transactions is not established (that requires downloading and evaluating those transactions).

Headers-only chains are still secure, though, since the work required to produce them is practically equivalent to the work required to produce the full blockchain. Thus, headers-only chains are as secure against an attacker as the full chain in most circumstances. Headers-only chains can be used via their commitment to both/either the transactions included in the block and/or the current state of the blockchain.

The state of a blockchain is protocol dependent-a rough general description is: all of the up-to-date data required to evaluate whether new transactions are valid and, if so, the results of those transactions. For example: the state of the Bitcoin blockchain is the set of all of the current unspent transaction outputs; and the state of the Ethereum blockchain is all current account balances, all smart contract code, and the databases of all smart contracts.

It is possible to exclude an explicit commitment to the exact transactions in a block (since the resulting state root will not match if an incorrect list of transactions is evaluated), but this is costly. Typically, all but the earliest generation of blockchains specify headers that include commitments to both transactions and state.

These cryptographic commitments use systems chosen for their ability to produce succinct proofs. For example: it is efficient to prove that a bitcoin block contains a specific transaction, or, on an Ethereum-based blockchain, to prove the balance of a specific account. The method of constructing a headers-only chain (or chain-segment) and verifying that a transaction was included in one of the corresponding blocks is known as Simple Payment Verification (SPV) and was initially detailed in the Bitcoin whitepaper (2008).

Blockchain implementations are subject to Buterin's Trilemma (also known as the Scalability Trilemma, or Blockchain Trilemma), a seemingly intractable problem inherent in the construction of blockchain networks.

Buterin's Trilemma roughly states that, when the capacity of a blockchain's design is increased, there exists an unavoidable design trade-off between the level of security offered by the system and level of decentralisation of that system. That is to say, in order to remain decentralised while increasing capacity, a blockchain implementation must employ strategies such as sharding and preferring small block sizes. This necessarily compromises the security of each shard or chain, since the total security of the network is now split between each shard or chain.

If decentralisation may be compromised, and the level of security must remain high, then larger blocks (which include more transactions but require more computational resources to process) may be preferred. Therein lies the conflict. One may either choose to use larger blocks, or one may choose to shard/use smaller blocks, but not both simultaneously.

SUMMARY OF THE INVENTION

It is an object of the invention, in its preferred form to provide an improved for of blockchain type network.

In accordance with a first aspect of the present invention, there is provided a method of maintaining integrity of a distributed block chain, including blocks of at least a first (L) and second (R) block chain sequence of blocks, the method including the steps of: (a) with the blocks of at least a first (L) and second (R) block chain sequence of blocks, reflecting at least the headers of a first block ($L_{i+1}$) of the first (L) chain in a subsequent first block ($R_{i+1}$) of the second (R) block chain; (b) reflecting at least the headers of the subsequent first block ($R_{j+1}$) in a subsequent ($L_{i+2}$) block of the first (L) chain; (c) for the first L chain, and the subsequent ($L_{i+2}$) block, finding the most recently reflected L block in the reflected subsequent first block ($R_{j+1}$) block; (d) establishing the most recently reflected L block is known to the most recently reflected R block; and (e) establishing that the R block ($R_{j+1}$) is known to the current L block ($L_{i+2}$); and wherein said reflecting includes incorporating the header information of a block of one blockchain into the block of the other blockchain.

In some embodiments, the method can further include the steps of: (b1) reflecting at least the headers of the subsequent first block ($L_{i+2}$) in a subsequent ($R_{j+2}$) block of the second (R) chain; (c2) for the first R chain, and the subsequent ($R_{j+2}$) block, finding the most recently reflected R block in the reflected subsequent first block ($L_{i+2}$ block); (d3) establishing the most recently reflected R block is known to the most recently reflected L block; and (e4) establishing that the L block ($L_{i+2}$) is known to the current R block ($R_{i+2}$). In some embodiments, the reflecting further includes an estimate of the cost of creation of the reflected block chain blocks.

Preferably, the reflected information further includes a weighting of the reflected blockchain which is an indicator of the work formed in the reflected chain. A portion of the weighting of the reflected chain can be included in the original chain. The weight can be an estimate of the relative work involved in the reflected chain creation. The block confirmations can be based on individual chains having a higher confirmation rate than single chains, where the multiple chains independently issue confirmations.

In some embodiments, the miners of the blockchains are incentivized to mine blocks of the chain which produce a block with the largest reward (including transaction fees) divided by that chain's average time between blocks. The miners can be incentivised to mine the chain with a large number of unconfirmed transactions.

In some embodiments, the method includes further recursively reflecting blocks, including, the step of a first L block mutually reflecting an M block with the M block mutually reflecting an R block.

In accordance with a further aspect of the present invention, there is provided, in a blockchain environment where L mutually reflects M which also mutually reflects R, a method of mutually recursively reflecting L and R, the method including the steps of: (a) L reflected by a first block of M, (b) L reflecting a second subsequent block of M, (c) L utilising the two reflections via M to effect a reflection of R and determine a reflection in R. In some embodiments, the R blockchain utilises two reflections via M to effect a reflection of L and determine a reflection in L.

In some embodiments a series of blockchains mutually reflect one another. The series of mutually reflecting block chains wherein the number of reflections of each block chain can be greater than 2. In some embodiments, a first block chain reflects multiple child base chains which, in turn, reflect further child root chains. In some embodiments, at least one of said blockchains is also an application specific blockchain. In some embodiments, the application specific block chain is a child chain of a parent blockchain.

In accordance with another aspect of the present invention, there is provided a system comprising: a first blockchain; and a second blockchain, wherein: headers of blocks of the first blockchain are recorded in the second blockchain; and nodes of the first blockchain are configured to be able to determine if the headers of blocks of the first blockchain have been recorded in the second blockchain.

In some embodiments, the headers of blocks of the second blockchain are recorded in the first blockchain. The nodes of the second blockchain can be configured to be able to determine if the headers of blocks of the second blockchain have been recorded in the first blockchain. In some embodiments, nodes of the first blockchain have data access to the headers of blocks of the second blockchain. The headers of blocks of the first blockchain can be recorded in the second blockchain by a smart contract, or recorded directly. The headers can facilitate Merkle proofs. In some embodiments, at least one node of the first blockchain replicates a local instance of the second blockchain that follows network rules of the second blockchain. The headers can be not transmitted between nodes of the system.

In some embodiments, the first blockchain uses a chain-weighting algorithm which has as input a determination of whether the headers of blocks of the first blockchain have been recorded in the second blockchain. The chain-weighting algorithm has as input an exchange rate of coin of the first blockchain and coin of the second blockchain. The exchange rate can be sourced from an on-chain decentralized exchange operating between the blockchains. In some embodiments, the blockchains use different consensus methods and the blockchains produce blocks at different rates.

In some embodiments, the headers of blocks of the second blockchain are produced from headers of previous blocks from the second blockchain between production of blocks by the first blockchain. In some embodiments, the system comprises a network of a plurality of pairs of reflected blockchains having reflections wherein headers of blocks of a first of the pair are recorded in a second of the pair and headers of blocks of the second of the pair are recorded in the first of the pair. New blockchains and associated reflections can be instantiated depending on the capacity of the system. The miners of each blockchain partially validate the blocks of all other associated reflected blockchains. The reflections can be weighted, and can be weighted inverse to a blockchain production rate. In some embodiments, the network comprises a plurality of simplex tiles wherein each simplex tile is arranged such that reflections thereof are internal and mutual and wherein each simplex tile has at least one external reflection to one or more blockchains of another simplex tile.

BRIEF DESCRIPTION OF THE DRAWINGS

Embodiments of the invention will now be described, by way of example only, with reference to the accompanying drawings in which:

FIG. 5 illustrates a further step in Chain L and Chain R contain a projection of each other's headers-only chain;

FIG. 6 illustrates the steps of incrementally constructing a Proof of Reflection.

FIG. 7 illustrates step 3 of chain L includes Proofs of Reflection (PoRs) along with headers. Proofs of Reflection allow Chain L to know which of its own blocks are known to Chain R.

FIG. 8 illustrates an algorithm (1) for a vanilla chain-weight algorithm (typical of blockchains).

FIG. 9 illustrates an algorithm 2 for modified chain-weight algorithm to factor in reflections.

FIG. 10 illustrates ongoing mutual Proof of Reflection between two UT Chains, Chain L and Chain R;

FIG. 13 an algorithm for the weight of blocks for a single root token;

FIG. 15 illustrates algorithm 4 for a WeightOf function.

FIG. 16 illustrates algorithm 5 for a WeightOf function for one-way POR between chains with different root tokens.

FIG. 19 illustrates Algorithm 6 Implementation of ReflectedBlockWeight to support an arbitrary number of reflecting chains.

FIG. 20 illustrates simplexes of increasing capacity. Vertices are simplex-chains. Edges are the reflections between simplex-chains.

FIG. 21 illustrates possible upgrade paths between UT variants, starting at UT+PoRs in the top left—the most conservative variant. Solid arrows show paths of increasing capacity.

FIG. 22 illustrates some examples of simple block-dag segments.

FIG. 23 illustrates an example of an algorithm for a moderately complex chain-segment ($B_i \ldots B_{i+3}$ which is 7 blocks total), and each step is enumerated and explained.

FIG. 24 illustrates an attempted DoS attack on a block-DAG. The attacker's blocks, Aj, are mined in public and contain no transactions. Each block is annotated with its chain-weight (Σw). Even though the attacker produces 2 as many blocks as the honest network, the attack inevitably fails after a short while.

FIG. 27 illustrates a trivial simplex tilings—these are all equivalent to a single simplex as each simplex-chain reflects all other simplex-chains in the network.

FIG. 28 illustrates the only unbounded tiling at v=2. Although it is unbounded, the distance between those tiles is proportional to the size of the network—so this isn't scalable.

FIG. 29 illustrates the construction of a binary tree-tiling: the first 3 iterations.

FIG. 30 illustrates a diagram of chain-segments demonstrating the simplest case of recursive PoR.

FIG. 31 illustrates a series of chains.

FIG. 32 illustrates multiple chains. Note that reflections between $M^1$ and $M^2$ are not shown.

DETAILED DESCRIPTION OF THE DRAWINGS

Figure 1:
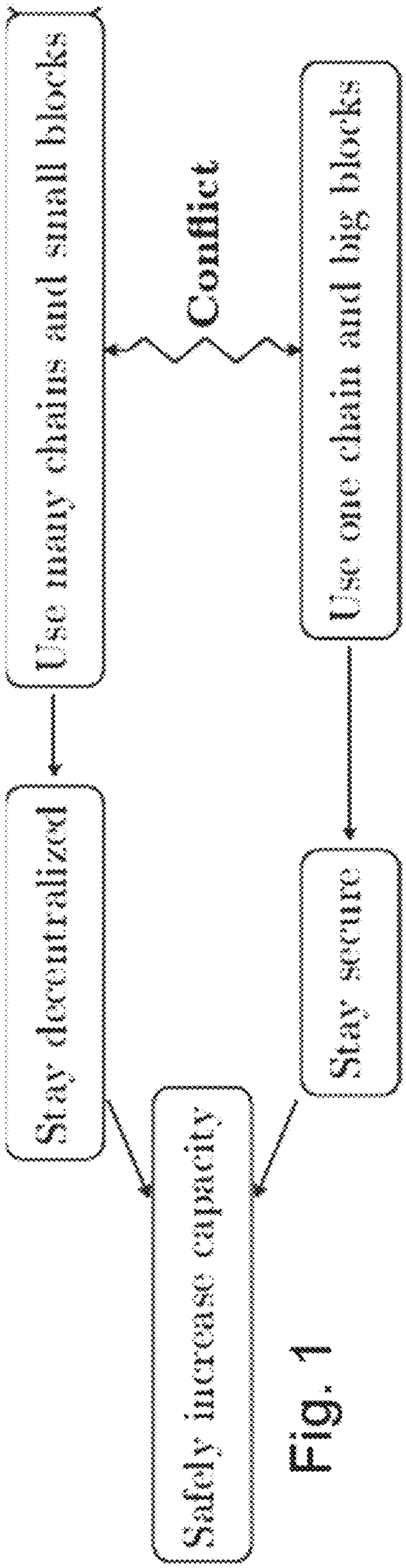
FIG. 1 illustrates some of the elements in the core conflict of Buterin's trilemma.
Figure 2:
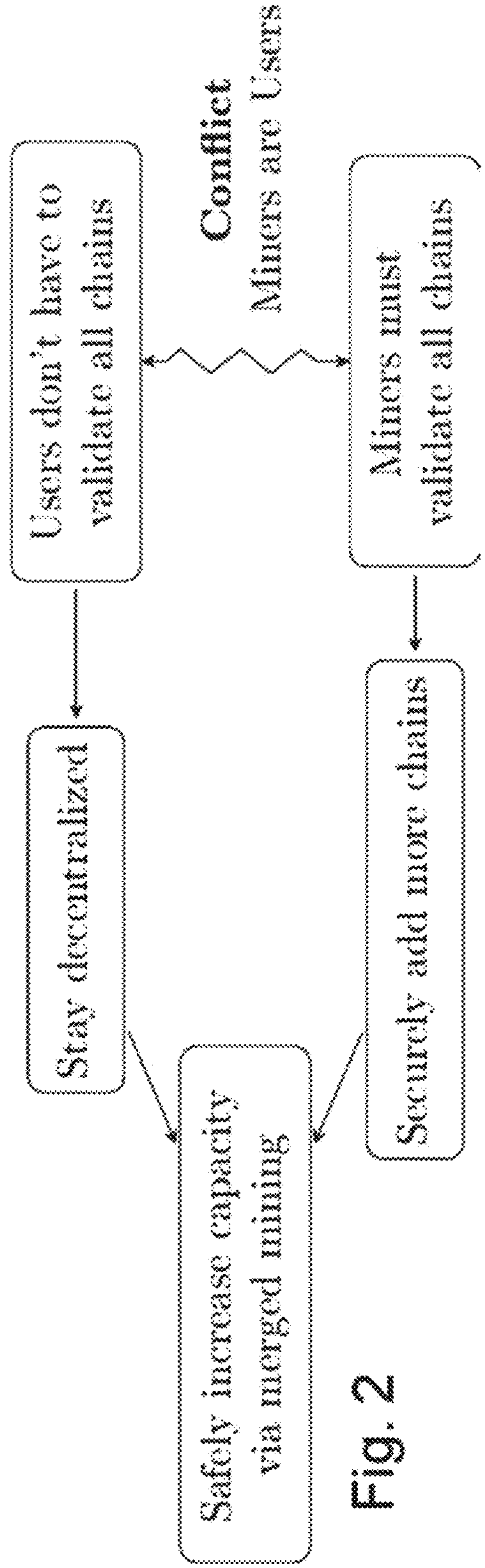
FIG. 2: illustrates a number of elements in the scaling conflict of merged mining.

The preferred embodiments provide for a system and method which provides a highly distributed, highly secure, and highly scalable blockchain network, hereinafter termed Ultra Terminum (UT). Ultra Terminum (UT) is a cooperative cross-chain consensus strategy that addresses Buterin's Trilemma (aka the Scalability Trilemma). That is Ultra Terminum builds on existing consensus methods to produce a new form of blockchain network.

Compared with existing consensus methods, UT provides equal or better security properties than all existing consensus methods (including Bitcoin's Proof of Work (PoW) method and variants, and all Proof of Stake (PoS) variants). This is because UT leverages existing consensus methods in combination and, by way of construction, UT can only add security to these methods. As a consensus method, UT differs from existing consensus methods in that it is a novel modification to particular components of pre-existing consensus algorithms. These modifications allow those consensus algorithms to cooperate. This improves the maximal security and decentralization of the network, whilst also providing a foundation for scalability.

UT is capable of supporting millions of transactions per second with similar chain parameters (like block size) to those of traditional blockchains (like Bitcoin or Eth1).

At the core of Ultra Terminum is a new method for sharing security: Proof of Reflection. This technique (which works in conjunction with PoW, PoS, etc) allows the incremental construction of complex blockchain networks with powerful scaling properties. Proof of Reflection is how Ultra Terminum (excluding nested chains) scales with order $O(c^2)$, and is the basis for unbounded O(n) scaling. UT's higher-order scaling configurations, $O(c^3)$ and $O(c^4)$, require dapp-chains: chains that are application-specific and which inherit security properties from the foundational structure.

As UT is primarily a method of structuring a blockchain network, the scalability configurations mentioned herein do not include layer 2 methods. That means that layer 2 techniques (e.g., state/payment channels, ZK/optimistic rollups) can be implemented on top of UT.

UT's novel structure means that confirmation times within UT are of order $O(c^{-1})$ (i.e., the confirmation rate is O(c)). This means that, as computers get more powerful, confirmation times in UT will approach 0. This is an improvement over existing architectures, which are (ideally) of order O(1).

Buterin's Trilemma

The Trilemma can be illustrated as follows: For some magnitude of computational resources (computation, bandwidth, storage, etc), c, and magnitude of the network (transaction throughput, state size, market cap, etc), n, it is claimed that blockchain systems have, at most, 2 of these 3 properties:

Decentralization—the system can operate with participants that have only O(c) resources (e.g., a laptop, a raspberry pi, a VPS; typical internet bandwidth, storage space, etc).

Security—the system is secure against attackers with up to O(n) resources.

Scalability—the system can process O(n) transactions with $O(n)>O(c)$; this means that, as the network grows, the throughput of the system grows faster than the computational resources required per user.

The definition of scalability is perhaps problematic. If the network, which is O(n), becomes bottlenecked by an $O(c^2)$ scaling method, is the network really scalable? The Scalability Trilemma is a bad name because scalability is one of the three conflicting qualities; you could just as well call it the Decentralization Trilemma, etc. Apparently the term was coined by Vitalik Buterin, hench Buterin's Trilemma. Whether Ultra Terminum is a consensus method or not is somewhat unclear. On the one hand: a new combination of methods is still a method. On the other hand: UT provides a way to modify other consensus methods with a fork rule, and UT doesn't provide a way to run a single blockchain. This is why it is introduced as a cross-chain consensus strategy.

Definition of scalability: the system can process O(n) transactions in O(1) time, i.e., confirmations neither take longer nor become more scarce as n and/or c change.

Why mention $O(c^2)$ scaling particularly? Why is that an important breakpoint for scaling configurations? In a word: sharding. The standard method of sharding (or hosting child-chains generally) is to replace transactions with shard-headers in the host-chain. Extra data might also be required. If the host-chain has O(c) capacity, then it should be able support O(c) shards (presuming a secure method of sharding is known and in use). Each shard has O(c) capacity also, thus the full system has $O(c^2)$ capacity.

Core Conflict

FIG. 1 shows a cloud for the core conflict. It reads: safely increasing capacity requires that we stay decentralized. Staying decentralized requires that we use many chains and small blocks. Safely increasing capacity requires that the network stays secure. Staying secure requires that we use big blocks. Big blocks are the opposite of small blocks, so we have a conflict. Additionally: using multiple chains compromises security; and big blocks compromise decentralization.

To understand the core conflict we need to look at the underlying assumptions. Buterin writes in the Ethereum sharding FAQ regarding the many chains with small blocks strategy: "This greatly increases throughput, but at a cost of security: an N-factor increase in throughput using this method necessarily comes with an N-factor decrease in security, as a level of resources 1/N the size of the whole ecosystem will be sufficient to attack any individual chain." He writes, regarding the big blocks strategy: "such an approach inevitably has its limits: if one goes too far, then nodes running on consumer hardware will drop out, the network will start to rely exclusively on a very small number of supercomputers running the blockchain, which can lead to great centralization risk."

A mistaken way to break the conflict is merged mining (aka AuxPoW). This method attempts to share security between chains, so that one might be able to have decentralization and security via small blocks and merged mined chains/shards (sometimes called side-chains). Buterin writes: "If all miners participate, this theoretically can increase throughput by a factor of N without compromising security. However, this also has the problem that it increases the computational and storage load on each miner by a factor of N, and so in fact this solution is simply a stealthy form of block size increase."

An underlying assumption here is that maximally sharing security across the network requires miners to maintain a record of all chains and do validation on all those chains. The naive solution (using many chains, mentioned above) conflicts with secure methods of merged mining. It seems like progress is impossible.

In the embodiments: We can share security between chains/shards and can use small blocks. We can share security without miners keeping and validating all chains/shards. This is the crux of the problem: how do you construct a network of blockchains (scalable) such that attacking an individual chain is about as difficult as attacking the full network (secure), whilst ensuring that the security of the network does not require validating all chains (decentralized)?

The following beliefs are common amount those skilled in the art: Sharing PoW security requires merged mining. Sharing PoW security requires that chains use the same hashing algorithm. Different (non-merged-mined) PoW chains using the same hashing algorithm is insecure. Simultaneously securing a network with PoW and PoS is not possible without compromises (like that PoW miners could DoS PoS validators or vice versa). It is unsafe for miners/validators to build on unvalidated histories (as is done with SPV mining, which is unsafe). These beliefs are true for many blockchain designs, but are not true for Ultra Terminum.

Conjecture: A Principle of Scaling: A scalable system can have components with complexities worse than O(c) if and only if those components are not bottlenecks. As long as there is excess capacity in those components, the system can still scale.

Ultra Terminum

The embodiment, hereinafter called Ultra Terminum (UT) is not a method to scale a single blockchain. It is a method to scale a network of blockchains. Those blockchains use the technique Proof of Reflection described below to mutually secure each other, forming something called the simplex. Blockchains at this level are called simplex-chains and are able to host dapp-chains— chains that are dedicated to a dapp, and they can be application specific (e.g., a DEX) or general (e.g., a chain hosting an instance of the EVM).

Practically, there is little difference between a single blockchain and the simplex. Proof of Reflection allows each simplex-chain, and each hosted dapp-chain, to do efficient SPV proofs regarding state-entries on other simplex-chains or dapp-chains. This allows for the creation of rich cross-chain functionality, such as the ability to use a single network-level token across all simplex-chains and dapp-chains.

Although SPV proofs can be hundreds of bytes long, UT can be structured so that their length does not significantly impact scalability. UT does this by prioritizing a clean and simple protocol for simplex-chains and allowing dapp-chains the freedom to implement whatever state- and transaction-protocols are suitable for the application in question. This means that complex or inefficient data-structures for a dapp-chain's state do not impact the network globally, preventing bottlenecks in foundational components.

Finally, a UT simplex can be modified to enable a tiling of simplexes. This technique removes the upper bound on a UT network's growth, without sacrificing security of the network.

Proof of Reflection

The embodiments rely on blockchains working cooperatively to secure each other. The general idea of one blockchain tracking the headers of another will be the starting point.

Projection: A projection of a chain is its headers-only version which is recorded and evaluated by a different chain. For example BTC Relay is a smart contract by which Ethereum previously hosted a projection of Bitcoin. The act of one chain creating and maintaining the projection of another is called imaging. Also, Verkle trees can replace Merkle trees—this reduces proof costs (approximately) by 5× to 10×. The general idea of an on-chain headers-only version of another chain is termed a projection. The generalized process via which projections are created is called imaging.

A Projection of Bitcoin in Ethereum

The idea that Ethereum smart contracts (SCs) can track Bitcoin chain-headers is known—i.e., Ethereum images Bitcoin. The result of this is that the projection of Bitcoin is available to Ethereum users and SCs. Bitcoin's proof of work algorithm is clean and simple, so implementing the necessary logic in an Ethereum SC is viable. In principle, any chain that supports some headers-only mode can be imaged in this way. In practice that can be difficult (e.g., Ethereum's EVM doesn't generally support memory hard hashes unless special cases are introduced).

Figure 3:
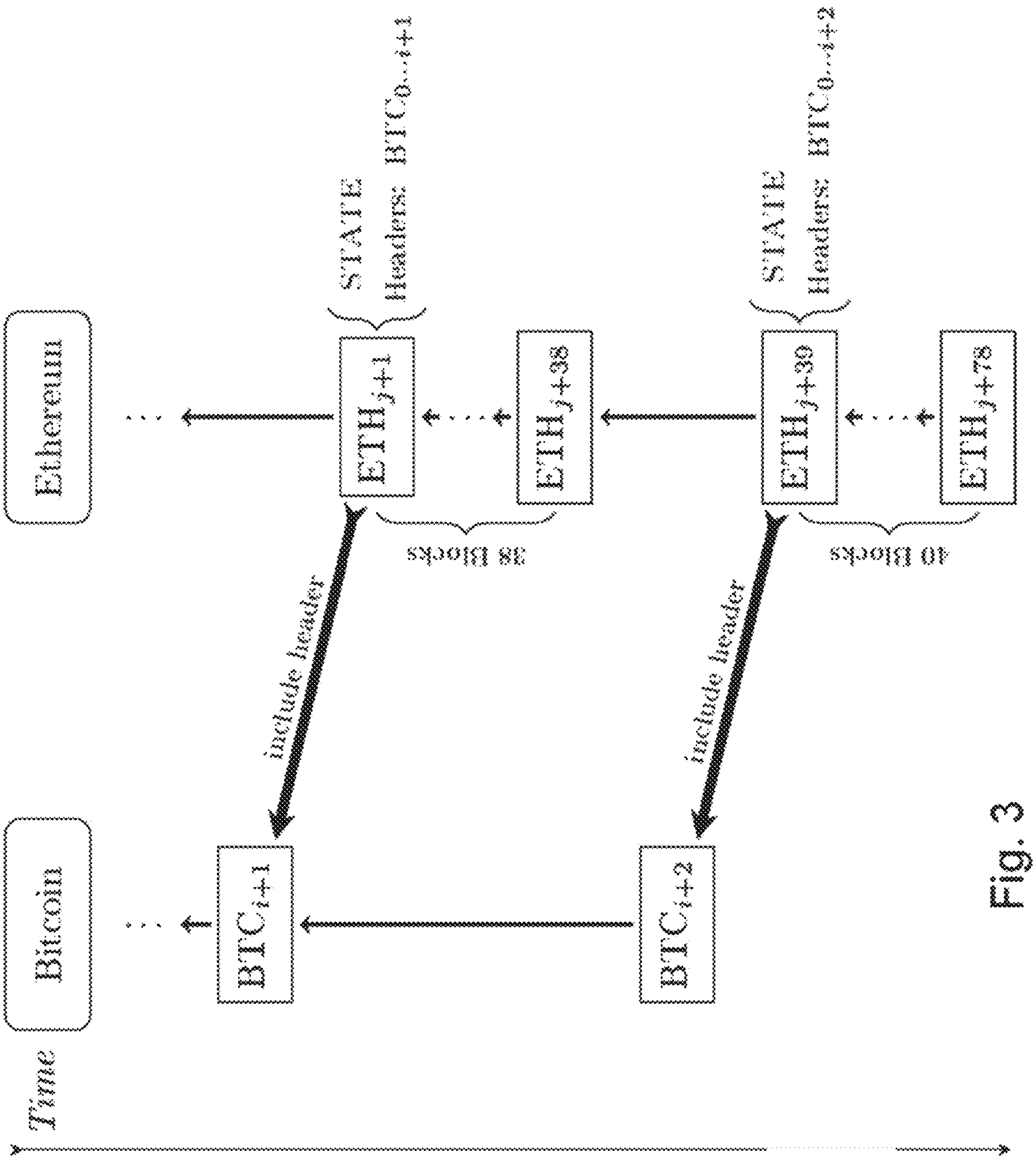
FIG. 3 illustrates a hypothetical example of Bitcoin production of headers, as they are produced, are included in Ethereum's state via a smart contract and user made transactions.

Let's add such a contract to Ethereum and describe the relevant data and events in FIG. 3. FIG. 3 includes some variance in Ethereum's block production rate, similar to what might be observed in a real-world environment, but Table 1 does not.

TABLE 1

(Hypothetical) Data and events for both Bitcoin and Ethereum as a projection of Bitcoin in Ethereum is maintained via Bitcoin headers being included in an Ethereum SC.

| Time step (~15 s increments) | Bitcoin block mined | Eth block mined | Eth block contents | Eth state |
|---|---|---|---|---|
| 0 | k | | | |
| 1 | | j | $BTC_k$ header | Records $BTC_{0 \ldots k}$ |
| . . . | | | | |
| 40 | k + 1 | | | |
| 41 | | j + 40 | $BTC_{k+1}$ header | $BTC_{0 \ldots k+1}$ |

FIG. 3 illustrates the (Hypothetical) Bitcoin headers, as they are produced, are included in Ethereum's state via a smart contract and user made transactions. This is roughly how BTC Relay worked. After a Bitcoin block is produced, an Ethereum miner includes a transaction containing the Bitcoin header, which updates the SC imaging the Bitcoin chain. In reality there are practical concerns about incenting someone to produce such a transaction. Why would a chain want to include a projection of another chain? The typical answer is to prove transactions or state occurred on the foreign chain. On Ethereum, one could build a trustless BTC↔ETH market, for example.

Incremental Implementation of Proof of Reflection

Let's build up the idea via a hypothetical situation with two distinct blockchains. For simplicity, you can imagine these as Bitcoin and Ethereum 1—at least to start with. However, keep in mind that the changes required to support Proof of Reflection are unlikely to ever be integrated with either Bitcoin or Ethereum.

Our starting case is that both chains use different Proof of Work algorithms and neither includes a projection of the other. For simplicity, the following progression will use two blockchains (Chain R and Chain L) with identical block times, and will not account for variance in block production.

Step 1. Chain R images Chain L

Figure 4:
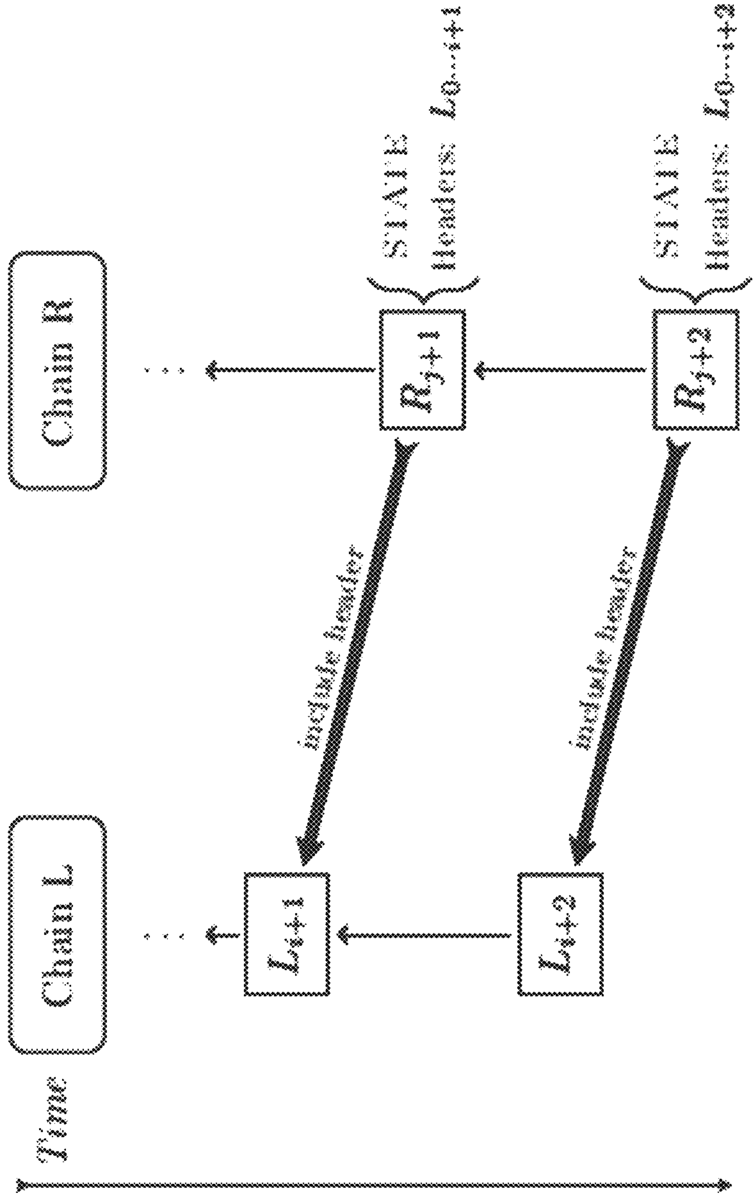
FIG. 4 illustrates a first reflection step of including headers in a chain with Chain R imaging Chain L; thus Chain R hosts a projection of Chain L.

This is conceptually similar to having a projection of Bitcoin in Ethereum, and shown in FIG. 4.

Similar to before, Chain R will include Chain L's headers as they are produced. This can be a protocol-level implementation; it does not have to be at the smart contract level—as it would be with Ethereum.

FIG. 4: Step 1: Chain R images Chain L; thus Chain R hosts a projection of Chain L.

Step 2. Chain L images Chain R

Say that the protocol of Chain L is extended to support a projection of Chain R. That is, a bespoke protocol extension is created that allows/requires miners to publish known Chain R headers along with their Chain L block. Similar to the way Chain R images Chain L, now Chain L also images Chain R. This is shown in FIG. 5 and Table 2.

TABLE 2

| Step 2: Both Chain L and Chain R host a projection of each other. | | | | | | |
|---|---|---|---|---|---|---|
| Time | L block made | L block contents | L state | R block made | R block contents | R state |
| 0 | k | $R_{j-1}$ header | Records $R_{0 \ldots j-1}$ | | | |
| 1 | | | | j | $L_k$ header | Records $L_{0 \ldots k}$ |
| 2 | k + 1 | $R_j$ header | Records $R_{0 \ldots j}$ | | | |
| 3 | | | | j + 1 | $L_{k+1}$ header | Records $L_{0 \ldots k+1}$ |

FIG. 5: Step 2: Chain L and Chain R contain a projection of each other's headers-only chain.

Step 3. Chain L's reflection in Chain R

Can we use a projection of a chain for a different purpose? What happens if Chain L tracks whether Chain L's history is confirmed within Chain R? This can be done via Merkle branches that prove Chain R's relevant state. In essence, Chain L uses its projection of Chain R to prove that its own history matches that of its projection in Chain R. Chain L proves that it is reflected in Chain R.

The following progression is shown in FIG. 6. First, Chain L must prove that its history is reflected, so we first find the most recently reflected header, $L_{i+1}$ (ideally, this is the previous L block). Secondly, we want to prove that $L_{i+1}$ is also the best block (for Chain L) according to Chain R's projection of Chain L, using the best known R block, $R_{i+1}$. For that, we need a merkle branch showing $L_{i+1}$ is part of $R_{i+1}$'s state—this is sometimes referred to as the missing Merkle branch. Thirdly, we want to prove that $R_{i+1}$ is the best block according to Chain L's projection of Chain R. We can do that via a Merkle branch, too, but full nodes of Chain L already know whether $R_{i+1}$ is the best block or not, so this branch doesn't need to be explicit. However, L's nodes must be able to generate it. The full collection of information required to prove reflection is called a proof of reflection (POR).

FIG. 6: Incrementally constructing a proof of reflection. Segments of Chain L and R (events and data) are shown in Table 3 and FIG. 7.

Under the right conditions, an appropriate configuration of Proof of Reflection results in an increase in the rate that confirmations are acquired.

At this point, if an attacker was to publish an alternate, better Chain L history, then Chain L nodes would reorganize around the new history published by the attacker, and the attacker's block headers would end up being recorded in Chain R and causing a reorganization there, too. Currently, this configuration does not add any security to Chain L.

Step 4. One Way Reflection

It is important to note that chain-work done with one hashing algorithm is not generally convertible to 'equivalent' work done via another hashing algorithm. For example, there is no meaningful generic answer to the question how many double SHA256 hashes is one ETHash hash worth?

For the purposes of our hypothetical construction, let's say that L and R do equal work over equal time. In the current example, that means that the work required to produce either $L_i$ or $R_j$ is the same. For the sake of this construction, we'll also presume this relationship doesn't change over time. Our constant of conversion is thus: 1 R Blocks per L Block.

Methods for converting work are discussed below. Currently, the Chain L network chooses the "heaviest" (most worked) chain as its common history. Chain L calculates the "weight" of blocks (i.e., how much work went into them) via an estimation of how many hashes were required—e.g., some number of double SHA256 hashes. For the purposes of illustration, let's convert this number to be in terms of L

TABLE 3

| Step 3: Chain L records which of its headers are known about by Chain R. That is: Chain L includes proofs of reflection. | | | | | | |
|---|---|---|---|---|---|---|
| Time | L block mined | L block contents | L state | R block mined | R block contents | R state |
| 0 | k | $R_{j-1}$ header, $L_{k-1}$ PoR | Hdrs: $R_{0 \ldots j-1}$, PoRs: $L_{0 \ldots k-1}$ | | | |
| 1 | | | | j | $L_k$ header | Hdrs: $L_{0 \ldots k}$ |
| 2 | k + 1 | $R_j$ header, $L_k$ PoR | Hdrs: $R_{0 \ldots j}$ PoRs: $L_{0 \ldots k}$ | | | |
| 3 | | | | j + 1 | $L_{k+1}$ header | Hdrs: $L_{0 \ldots k+1}$ |

Chain L now knows which L blocks are recorded by Chain R, i.e., which local blocks are known about by some external source. Put another way: Chain L's history is confirmed not only by new Chain L blocks, but also by Chain R blocks. Vector commitments (or Verkle branches) can be used, too (this applies to most uses of Merkle trees/branches in this description). For the sake of convenience and simplicity, Verkle trees won't be explicitly mentioned as an alternative unless there is a specific purpose.

FIG. 7: Step 3: Chain L includes proofs of reflection (PoRs) along with headers. Proofs of Reflection allow Chain L to know which of its own blocks are known to Chain R.

Blocks instead of double SHA256 hashes. That's easy, since each block is worth 1 L Block by definition. We can also measure the work of an L block in terms of R Blocks (1 L Block=1 R Block by the constant of conversion above). How can the network choose the heaviest chain? Well, a traditional blockchain might use a simple recursive function like Algorithm 1 as set out in FIG. 8. Bitcoin uses Hash(x)=SHA256 (SHA256(x)) as its PoW hash.

Now that we can convert block weights between L blocks and R blocks, L's ChainWeight algorithm can incorporate the idea that Chain R had confirmed part of L's history. The can be used to by Chain L to thwart some types of attack.

The block-weight calculation can be modified so that it accounts for work contributed by Chain R. Algorithm 2 as set out in FIG. 9, is such an algorithm. Essentially, additional weight is added to a block when it is the best block known to Chain R, i.e., when, according to Chain R, it is at the tip of Chain L. This weight is still added if Chain R knows of multiple competing chain-tips.

What is the meaning and impact of this change?

The meaning of this change is that Chain L now incorporates work done on Chain R into Chain L's own calculation of the heaviest worked chain. When a chain does this we say Chain L (or Chain L's work) is reflected in Chain R. This technique is what is meant by the term Proof of Reflection.

Proof of Reflection (POR): The consensus technique whereby a blockchain becomes more difficult to attack by including work done by reflecting blockchains in its fork rule.

One particular impact of this change is that a double-spend attack on L (e.g., withholding a privately mined chain-segment that reverts a transaction) must now be performed not only against Chain L, but also and simultaneously against Chain R. The attacker's privately mined L blocks are not known about by Chain R. Rather, Chain R knows about the public Chain L history against which the attack competes. Thus, either: the private chain-segment must contribute more total work to the Chain L blockchain than the public chain-segment does (including the relevant Chain R chain-segment); or the attacker must additionally produce a private Chain R chain-segment such that the total work of both private chain-segments is greater than the total work of both public chain-segments, and publish both chain-segments simultaneously.

At this point, there is no benefit to Chain R's security. That's because Chain R isn't 'reading' the reflected work back from Chain L. Thus a double-spend attack against Chain R has the expected, non-reflected profile—it isn't more difficult to attack Chain R yet. However, Chain R can take advantage of the reflection. The main requirements are: the inclusion of appropriate proofs of reflection that show known Chain R blocks according to Chain L, and an update to Chain R's block-weight calculations to account for the reflected work. Proof of Reflection doesn't automatically secure both chains; each chain can proactively and independently take advantage of Proof of Reflection.

Naturally, if there were a large difference in target block frequencies (e.g., 10 minutes vs 15 seconds) then there would also be a good deal of latency between the points where the higher-frequency chain gains the security benefit from reflected work. For this reason, Proof of Reflection is most useful between high frequency chains, or chains of similar frequencies. One downside of this is that shortening the block production frequency requires the inclusion of more block headers. In the scheme of things, this can be somewhat significant.

Exactly how one chain can properly account for reflected work requires that we cover how to compare (and convert) that work, and is discussed below.

As the Chain L tip is gaining reflections from Chain R, miners on Chain L are incentivised to include as many novel Chain R headers and PoRs as possible. That's because each new Chain R header (with a PoR) will increase the weight of the ancestors of the Chain L draft block, which helps the draft block compete with other draft L blocks. This increases the overall chain-weight that the miner is building on, and thus contributes to their block becoming part of the most-worked chain.

Where do Chain L miners get PoRs from? There are multiple answers, but one is for miners of Chain L to request them from Chain R nodes—light-client protocols often support this sort of thing. The problem is discussed below. For now, it's okay to assume that PoRs are broadcast alongside headers.

There are still potential attacks on Chain L. For example: what if an attacker mines a double-spend in private and produces a longer chain-segment than the honest chain? That is, the attacker's segment—excluding reflections—is heavier than the honest chain-segment. At this point the attacker can publish their blocks even though the honest chain-segment—including reflections—is heavier. Chain L nodes would not reorganize around this new chain-segment, so why would an attacker do this? If the projection of Chain L in Chain R does not account for reflections, then the attacker's chain-segment will appear (to Chain R) to have more work than the honest chain-segment. Thus the projection of L in R will reorganize to favor the attacker's chain-segment.

If the attacker has more hash power than the honest miners (i.e., q>p) then they might be able to use this reorganization as a foothold-either to launch a traditional 51% attack against L, or to attack SPV verification and light clients.

Note: Chain R is not required to actually evaluate Chain L's tip. POR can still work if Chain R simply records every Chain L header that it can, and nothing more. However, this increases the complexity of a PoR implementation, and Chain R users won't have access to a projection of L. Since a correctly-evaluated projection of L is useful (for users of either chain), we should solve this problem if we can.

The attack is only possible because Chain R was not accounting for reflected weight—if Chain R's projection of Chain L accounts for reflections, then this attack is not possible. If Chain R users were required to run full nodes for both L and R, then we've essentially just combined L and R into one big, overly-complex blockchain—this change would thwart the attack, but it isn't a solution. Instead, we need to ensure that Chain R can cheaply and reliably evaluate the weight of L's reflections.

Let's add a field to L's header: the total chain-weight, including reflections, of that block. If this value is always reliable, then it's trivial to correctly construct L's headers-only chain. With traditional blockchains (like Bitcoin) it's easy to verify the weight of a header, and thus a headers-only chain, because the header's difficulty is already available as part of the PoW's payload. In this case, though, additional data is required—specifically, the proofs of reflection. Full nodes of Chain L already verify that the claimed chain-weight is accurate-all the required data is contained in L blocks—but this doesn't help light clients. We need additional protocol changes to ensure that the claimed chain-weight of a header is always reliable.

One solution is to adopt a design that allows R nodes to independently calculate and verify L's reflections without evaluating L's state. Provided that R nodes can calculate any missing Merkle branches on demand, this will work. This method has substantial advantages, however, some configurations have considerable overhead. This is discussed below.

We can, at least, guarantee that a fraud proof will always be possible when a malicious L block lies about its total chain-weight. Additionally, other L miners can detect the lie and link back to the malicious block as an invalid parent alongside the fraud proof. These are useful features, but they're overkill at this point. For now, let R record both L headers and the corresponding PoRs.

Step 5. Mutual Reflection

The final step in this progression is mutual reflection—where both chains image one-another and include the necessary PoRs and modifications to their chain-weight algorithms. This is shown in FIG. 10 which shows: Step 5: Proof of Reflection between two UT Chains, Chain L and Chain R When two chains (Chain L and Chain R) mutually reflect each other, detecting attacks becomes easier. The security of both Chain L and R are partially dependent on each others' histories (along with their own). If one chain is attacked, where some alternate chain-segment is published, then that chain's nodes will know that those blocks have not been reflected-potentially indicating that the recently-published chain-segment was constructed in private or constructed after the fact.

There are several details that still require discussion, though, such as: how exactly is weight contributed by a reflecting chain converted to weight in the local chain? (discussed below); and how can proofs of reflection be calculated without the requirement that miners are full nodes of both chains? This last question is particularly important for moving beyond mutual reflection between only two chains.

In principle, we can make blockchains more difficult to attack based on the idea that blockchains can include a projection of the history of other blockchains (and confirm a chain's history like they do transactions). In principle, it is possible to increase the security of a blockchain via reflection and to increase the security of multiple blockchains via mutual reflection.

Applicability of POR

Does POR work for "blockchains" in the broad sense, or are there constraints on a blockchain's architecture?

Proof of Reflection modifies the fork rule and accounts for block-weight in discrete amounts. Some alternative distributed ledger networks (i.e., non-blockchain DLTs) do not produce network-wide discrete updates. It's not clear how such DLTs would use POR themselves or be used by a blockchain for PoR. Examples: Hedera uses Hashgraph; Solana uses Proof of History (PoH). PoR also requires that state can be verified in the reflecting chain.

Some blockchains obscure their state (e.g., Monero). If we can't publicly verify PoRs, then we can't convert chain-work, so those networks can't easily be used for reflection (but they could perhaps do one-way PoR, though). In that case, appropriate protocol changes would enable mutual PoR. Some DLTs don't have meaningful network-wide state; i.e., there is no single, consistent view of that network's history. In this case we can neither convert work nor verify PoRs. Example: IOTA uses The Tangle.

POR also needs a way to normalize the idea of "a confirmation" so that confirmations can be compared. (This is trivial for PoW chains.) Consider a PoA chain with irregular block production. It has discrete updates, and state can be verified against it. But, what does each confirmation mean? Is a block that is produced soon after its parent worth as much as a block produced long after its parent? For non-PoW chains, we'll need conversion methods that have non-arbitrary answers for these questions.

In general, intuition suggests that we can almost always use POR with data structures that fit the traditional idea of a blockchain. (And when we can't, a protocol change could fix that.)

Comparing Incomparable Proofs of Work

For Proof of Reflection to work, we must alter the fork rule (which compares the chain-weight of two candidate best-blocks). We sum block-weights to get the chain-weight. PoW chains use the expected number of hashes to produce a block as the measure of work. Alternatively, something that's linearly convertible to number-of-hashes (like difficulty) can be used instead. For mutually reflecting PoW chains, we need a way to compare and convert hashes done on R to hashes done on L (and vice versa).

If we are to convert work between PoW chains, then we must be able to convert between L-hashes and R-hashes in a consistent way. Consistency, here, means the conversion shouldn't change the outcome of the fork rule; if the fork rule says $L_{i \ldots j,a} > L_{i \ldots j,b}$ in terms of L-hashes, then it should give the same result for all cases when the units are changed to R-hashes.

Since both weight and hashes can be summed, a way for this to work is for us to use a linear conversion method (i.e., the units are proportional, we have some constant of conversion for that specific situation, and all units share an origin). In effect, for any two values, the ratio between linearly converted values is constant provided those values are in same units, but independent of which units those values are represented in. This doesn't imply that all mid-states are linearly convertible, though. However, if some mid-states are linearly convertible (to and from hashes), then the fork rule should work for the absolute value of those units, too.

When it comes to comparing work, we'll need to work with particular factors (or properties) that are intrinsic to all blockchains (though the particular values vary by chain). These are the factors which naturally come as rates, even though they're often measured in absolutes. For example: instead of measuring work in raw hashes, we'll use hashes per block; instead of measuring block rewards, we'll measure coins per block and the inflation rate. Even though the act of block production is discrete, blockchains have a block target time; a way of keeping things consistent over time (at least in the short term). Since a block represents a discrete amount of work, and has a known, measurable target time, we can sometimes unify the two via the idea of rate of work, e.g., hashes per second. Making these sorts of conversions up-front (where appropriate) will simplify the work to come, since we'll be working with ratios of units which naturally allow for useful conversion.

If we can measure the rate of work in some direct way (e.g., number of hashes per block) then we can also scale block rewards according to both the network difficulty and the demonstrated rate of work. This enables dynamic block production (i.e., blocks with a flexible minimum difficulty). This would (probably) be disruptive to a traditional blockchain, due to many stale blocks. For UT, it becomes relevant. There's no requirement that support for dynamic block production is used in UT, but it's useful to have as a technique in reserve.

The problem is that there is no known method of universal and generic conversion between qualitatively different units. We need a specific goal and context to successfully convert—in fact, the goal is what enables us to judge whether it's a successful method of conversion or not. This philosophical idea is the work of the philosopher Elliot Temple and it not well known to those who are skilled in the art, nor to philosophers, although it may seem self-evident. The method of the conversion of work integrates, applies, and extends Temple's ideas in the field of blockchain architecture. The goal of the conversion of work is to convert chain-work in such a way that PoR works. The conversion shouldn't introduce any vulnerabilities, and it should work within the constraints that we've discussed up to this point.

In order to discuss conversion methods we need to know the context within which the conversion happens. We already know some background context, like that we're using blockchains, that root tokens (which are exact and fungible) are involved via block rewards, that nodes have access to certain information via some proof or because it's already in their state, etc. This background context isn't enough, though. What specific contexts can facilitate conversion? This section provides two examples. Before we discuss the examples themselves, let's discuss some intermediate conversions that we'll use in those two examples.

Theoretical Conversion

Consider a traditional blockchain (like Bitcoin, or Ethereum 1). We know that traditional blockchains have properties specific to their blocks, like: reward per block (coins/block); a block target time (seconds/block)—or block frequency (blocks/second); and a difficulty (hashes/block). There are also network-wide properties, too, like the inflation rate (coins/second). The instantaneous relationship between these properties is mediated by various protocols—these protocols (e.g., difficulty adjustment algorithms) are part of the context of those properties and relationships. How can we use these relationships to our advantage?

With regards to Proof of Reflection, consider that we only need to convert simultaneous work. That means: PoR does not need to be able to convert chain-work between chains over time, only for some given moment.

The units that we have to work with are: blocks, seconds, hashes, and coins. There are actually multiple types of blocks (L-blocks and R-blocks), coins (L-coins and R-coins), and hashes (L-hashes and R-hashes). We can't combine those unless we're able to convert those values to common units.

If we had an exchange rate between L-coins and R-coins, then we can trivially convert between them. If we have that, then, for our current purpose, is pragmatic. We can treat L-coins and R-coins as interchangeable units—because we can always convert between them. So now we have L-blocks, R-blocks, coins, and L-hashes and R-hashes.

Let's consider Chain L, and give some of these properties variables: $L_f$ (L-blocks/s) for block frequency, $L_r$ (L-coins/L-block) for the block reward, and $L_d$ (L-hashes/L-block)—the difficulty. We can multiply combinations of these to get new units: $L_f L_d$ gives us L-hashes/s; $L_f L_r$ gives L-coins/s, and $L_d/L_r$ gives us L-hashes/L-coin.

Let's add that exchange rate: $X_{R \to L}$ (L-coins/R-coin). And some variables for Chain R which correspond to Chain L's above: $R_f$, $R_r$, and $R_d$. There's a symmetry between chains L and R, so we already know that $R_d/R_r$ gives us R-hashes/R-coin.

In theory, can have an exchange rate to help us convert between R-hashes/R-coin and L-hashes/L-coin?

Converting Block-Weights

Can we find some function, $\text{ConvWork}_{R \to L}(w)$, that converts R-hashes to L-hashes?

$$\frac{L_d}{L_r} \qquad \frac{L\text{-hashes}}{L\text{-coin}} \tag{1}$$

$$\Rightarrow \frac{L_d}{L_r} \cdot X_{R \to L} \qquad \frac{L\text{-hashes}}{R\text{-coin}} \quad \text{Multiply by } X_{R \to L}$$

-continued $$\Rightarrow \frac{L_d}{L_r} \cdot X_{R \to L} \cdot \frac{R_r}{R_d} \quad \frac{L\text{-hashes}}{R\text{-hash}} \quad \text{Divide by } \frac{R_d}{R_r}$$

$$\therefore ConvWork_{R \to L}(w) = \frac{L_d}{L_r} \cdot X_{R \to L} \cdot \frac{R_r}{R_d} \cdot w \;\; R\text{-hashes} \to L\text{-hashes} \tag{2}$$

With Equation 1, we have just found our first constant of conversion for block-weight. What's going on here? We start out by observing $L_d/L_r$ gives us a value in units of L-hashes/Lcoin. This is a constant of conversion from L-coins to L-hashes for a given moment-if some miner earned x L-coins today, then x. $L_d/L_r$ would tell you roughly how many hashes were done to earn that reward. Next, we multiply by the exchange rate to find the constant of conversion for L-hashes/R-coin. Then, we divide by $R_d/R_l$ to find the constant of conversion for L-hashes/R-hash. If we multiply this constant of conversion by a value of R-hashes, then we'll end up with a value of L-hashes. It tells us the relative weight contributed to each network by each hash performed. Finally, we can deduce the function $\text{ConvWork}_{R \to L}(w)$ which takes a value of R-hashes and returns a value of L-hashes.

Root Token (RT): Aka Coin. The Typically Sole Network-Level Token Required by Blockchain Protocols. e.g., Bitcoin has BTC, Ethereum has ETH, Polkadot has DOT, Cardano has ADA.

Consider two blockchains (L and R) that are very similar to Bitcoin. Unless otherwise specified, the chains are identical. Here are the key assumptions: Both L and R started on the same day, with the same block rewards (in their respective root tokens), block frequencies, and inflation schedules. L and R have equal money supplies, and (by chance) the exchange rate has been stable at $X_{R \to L}$=3 L-coins/R-coin. L and R use different PoW algorithms, L uses something like Scrypt (similar to Litecoin) and R uses something like SHA256 (similar to Bitcoin). ASIC/FPGA mining doesn't exist yet, but GPU mining does. (In this thought experiment) the best GPUs for mining Scrypt and SHA256 are of the same brand and model—i.e., the same supply is responsible for the hardware of all miners, regardless of which chain they mine. There's no comparative advantage between GPU makes/models—i.e., a miner can't increase their revenue by cleverly organizing which GPUs mine which networks. The cost of running both L and R nodes is negligible. L and R have perfect difficulty adjustment algorithms. The miner(s) used in this thought experiment are small relative to the total population of miners—their choices don't meaningfully impact network hash-rates or difficulty adjustments.

What should we expect regarding the conversion of work? To start with, let's note that GPU miners could work on either chain—good hardware for one chain is good hardware for the other, too. We know that L and R's block rewards (in root tokens) and block frequencies are the same, so the exchange rate is going to play a dominant role in RoI (since the only other difference is difficulty and hash-rate). If a miner could break even by making 30 L-coins, then they could also break even by making 10 R-coins. They'd need to make 3 as many L-coins as R-coins—that's the exchange rate. If L and R used the same hashing algorithm, then we could compare difficulties to see if this makes sense—does that miner make 3× as many L-blocks as they would R-blocks?

In this case, though, the difficulties are set for different hashing algorithms—so how many hashes can GPUs do for each hash? Say a GPU can do 7 SHA256 hashes for each 1 Scrypt hash. A miner that can do h Scrypt hashes/day should be able to do 7 h SHA256 hashes/day. That same miner should be able to make h. $L_r/L_d$ coins per day-L's coins per block, divided by L's difficulty (hashes per block) gives us a constant of conversion with units L-coins/L-hash. Of course, the miner could, instead, mine on R, thus making $7hR_r/R_d$ coins per day. How do we know which is better? We use the exchange rate to determine this.

If miners could swap from their current chain to the other chain and increase their revenue, then we should expect some to do that. In turn, we expect each chain's difficulty to change, reflecting that change in participation. If some miners (on the whole) moved from L to R, then we'd expect L's difficulty to decrease and R's difficulty to increase, roughly proportionate to how many miners moved. Since this is an arbitrage opportunity (for miners), we expect that any profitability gap will quickly be closed. Thus, we can say that a miner's revenue is equal regardless of which chain they're mining: $\text{Revenue}_L=\text{Revenue}_R$ when measured in the same units.

$$\text{Revenue}_L = h \cdot \frac{L_r}{L_d} \quad L\text{-coins} \quad \text{Revenue on } L \tag{3}$$

$$\text{Revenue}_R = 7h \cdot \frac{R_r}{R_d} \cdot X_{R\to L} \quad L\text{-coins} \quad \text{Revenue on } R \text{ in } L\text{-coins} \tag{4}$$

$$\begin{aligned}
&\text{Revenue}_L = \text{Revenue}_R && L\text{-coins} && \text{The equality we set above} \\
&\therefore h \cdot \frac{L_r}{L_d} = 7h \cdot \frac{R_r}{R_d} \cdot X_{R\to L} && L\text{-coins} && \text{Equation 3 and Equation 4} \\
&\frac{L_r}{L_d} = 7 \cdot \frac{R_r}{R_d} \cdot X_{R\to L} && \frac{L\text{-coins}}{L\text{-hash}} && \text{Divide by } h \\
&\frac{R_d}{L_d} = 7 \cdot \frac{R_r}{L_r} \cdot X_{R\to L} && \frac{R\text{-hashes} \cdot L\text{-blocks}}{L\text{-hash} \cdot R\text{-block}} && \text{Multiply by } \frac{R_d}{L_r} \\
&\frac{R_d}{L_d} = (7 \cdot 3) && \frac{R\text{-hashes} \cdot L\text{-blocks}}{L\text{-hash} \cdot R\text{-block}} && \text{Sub } X_{R\to L}, R_r, \text{ and } L_r
\end{aligned} \tag{5}$$

$$R_d = 21 L_d \quad \frac{R\text{-hashes}}{R\text{-block}} \quad \text{Multiply by } L_d \tag{6}$$

So, the ratio of difficulties should be 21 R-hashes/L-blocks, or, R's difficulty value should be 21×L's difficulty value.

Why did the substitution of $X_{R\to L}$, $R_r$, and $L_r$ (Equation 5) equal 3, though? First, notice that the units did not change with that operation. Next, we know the exchange rate $X_{R\to L}=3$; we said so earlier. So it must be that $R_r/L_r=1$. This simplifying step is only possible because we began calculating numerical values. We said earlier that L and R have-numerically-identical block rewards, so it must be that $R_r/L_r=1$ in this case.

Let's consider Equation 2 in light of the above.

$$\begin{aligned}
\text{ConvWork}_{R\to L}(w) &= \frac{L_d}{L_r} \cdot X_{R\to L} \cdot \frac{R_r}{R_d} \cdot w \quad R\text{-hashes} \to L\text{-hashes} \quad \text{Equation 2} \\
&= \frac{1}{21} \cdot \frac{R_r}{L_r} \cdot X_{R\to L} \cdot w \quad L\text{-hashes} \quad \text{Sub } \frac{L_d}{R_d} \text{ from Equation 5} \\
&= \frac{3}{21} \cdot w = \frac{w}{7} \quad L\text{-hashes} \quad \text{Sub } \frac{R_r}{L_r} \cdot X_{R\to L} \text{ as before}
\end{aligned}$$

We said this was true earlier—1 L-hash is worth 7 R-hashes. Thus far, we have not yet found an inconsistency (i.e., we don't yet have a reason to think this won't work). There is, however, an inconsistency lurking. Consider:

$$\begin{aligned}
&\frac{R_r}{L_r} \cdot X_{R\to L} && \frac{L\text{-blocks}}{R\text{-block}} \\
&\frac{L_f}{R_f} && \frac{L\text{-blocks}}{R\text{-block}} \\
\text{But! } &\frac{L_f}{R_f} \neq \frac{R_r}{L_r} \cdot X_{R\to L} && \frac{L\text{-blocks}}{R\text{-block}}
\end{aligned} \tag{7}$$

These two values are not equal (or comparable), and nothing we've said implies that they should be. There are qualitative differences between the two that is not represented in the current units. On the one hand, we have something like relative block frequencies, and on the other we have something like a ratio of the weight or value of block creation. But they have the same units. How do we know whether a constant of conversion works for our purposes?

Consider $L_f/R_f$ and $R_r/L_r \cdot X_{R\to L}$

This section regards some subtle ideas about when conversions work (i.e., give meaningful results), and when conversions don't. It's worth spending some time on these ideas because when and how you can convert is not always obvious. But, we must understand this to construct a meaningful method of converting block-weight—which POR requires.

Let's consider some units with real-world interpretations. What can L-blocks/R-block mean? Relative block frequencies or relative confirmation rates—This has real-world meaning: Ethereum 1 produces approximately 40 Ethereum-blocks in the same period (measured in seconds) that Bitcoin produces 1 Bitcoin-block. Relative block weights—This has real-world meaning: how much harder is it to generate a block on one network vs another network? Relative confirmations—This has real-world meaning: how many confirmations does one network take, compared to another, to reach equivalent security?

"Equivalent security" means that a double-spend attempt on one network is just as risky, costly, etc, as a double-spend attempt on the other network. To do this comparison, we start by picking some q for the attacker on L, a transaction value (in L-coins), L's block reward, and then finding boundary of attack—viability (measured in L-confirmations). The boundary of attack—viability is where rules of thumb around confirmation times come from, e.g., for Bitcoin, a transaction is safe after 6 confirmations. Next, we consider an equivalently valuable transaction on R (converting via the exchange rate), and an equivalent attacker (using Equation 2 to convert). How many confirmations are needed on R so that $P_L$ (attack success)=$P_R$ (attack success)?

Intuitively, relative block weights and relative confirmations sound related. If blocks on L are 5 heavier than blocks on R, then we'd have a constant of conversion of ⅕ L-blocks/R-block; and a chain of 5 R-blocks would be roughly as hard to create as a chain of 1 L-block. So ⅕ seems like a reasonable estimate for relative confirmations, too.

Naively, relative block frequencies seems to be in the same units as the other two: L-blocks/R-blocks; but they cannot be in the same units as the values mean different things. Let's consider relative confirmation rates particularly. What happens if we assume that seconds on each chain aren't the same thing, i.e., the units of confirmation rate are L-blocks/L-second (or R-blocks/R-second)? Crucially, we cannot cancel the seconds anymore:

$$? = \frac{L_f}{R_f} \quad \frac{L\text{−blocks} \cdot R\text{−seconds}}{L\text{−second} \cdot R\text{−block}} \quad \text{Relative confirmation rates} \tag{8}$$

$$? = \frac{R_r}{L_r} \cdot X_{R\to L} \quad \frac{L\text{−blocks}}{R\text{−block}} \cdot \text{[illegible]} \quad \text{Relative block weights via } X_{R\to L} \tag{9}$$

We can see that Equation 8 and Equation 9 are now not comparable. The reason that $L_f/R_f$ did not make sense before is that we were not including all necessary context! There is implicit context in some properties of blockchains-participation. Values like $L_f/R_f$—when used to measure the target block frequency—do not factor in participation; the target block time is usually a constant, so it can hold no network-specific context.

Where does this network-specific context come from? How is it separated from "world" context—like target block frequencies? How is the network-specific context maintained over time? The answer to all three questions is the same: the Difficulty Adjustment Algorithm (DAA). Difficulty Adjustment Algorithm (DAA): An algorithm which updates its chain's difficulty as valid blocks are produced. The output of a DAA is context laden—units take on additional context. DAA's typically work like this: calculate a ratio by which to adjust (multiply) the prior difficulty, based on a target block production rate and the measured block production rate.

Bitcoin, for example, adjusts its difficulty every 2016 blocks. A ratio is found by multiplying the previous difficulty ($D_{prev}$) by the actual duration ($\Delta t_{actual}$) of the last 2016 blocks and dividing by the target duration ($\Delta t_{target}$) for 2016 blocks. The units of $\Delta t_{actual}$ are B-seconds/(2016 B-blocks), and the units of $\Delta t_{target}$ are seconds/(2016 blocks).

Due to the dynamics of confirmations, we can't directly compare chain-segments like this, generally speaking—this example is here to help give you an intuition. The reason we can't directly compare in this way is that simply having more confirmations is worth something in and of itself. The relationship is not linear.

DAA's are special: they are the means by which context is added. DAA's don't explicitly deal with this context though—it's not mentioned in the algorithm itself. The key to a DAA's success is that it operates relative to a past state that is already context laden. So DAA's don't need to have any special awareness of context, just that multiplying the past difficulty by a particular ratio will adjust the confirmation rate to align with the target block frequency. It's an incremental and ongoing process. Since DAA's don't have initial conditions, there's no bootstrapping concern. To function, a DAA only needs to say how the difficulty should change; it doesn't need to know what it actually is. We will use the subscript W→B to denote the idea of converting between some world context, and the network context (of Bitcoin).

When a DAA adds context, it converts blocks→B-blocks, and seconds→B-seconds. (Alternatively, it could strip context; the only thing that matters is that $\text{ConversionConst}_{W\to B}$ is unitless. Either way works because the DAA acts as a boundary of the convertible context in both cases.)

$$\text{With context: } \text{NextWork}_{W\to B}(D_{prev}) = \frac{\Delta t_{actual}}{\Delta t_{target}} \cdot D_{prev} \quad \frac{B\text{−hashes}}{B\text{−block}} \tag{10}$$

$$\Rightarrow \mathit{ConversionConst}_{W\to B} = \frac{\Delta t_{actual}}{\Delta t_{target}} \quad \text{(unitless)}$$

Convertible Context: The boundary of a group of values that are mutually convertible. Within a convertible context, all values must be of the same scale or have known exact scaling factors.

Figure 11:
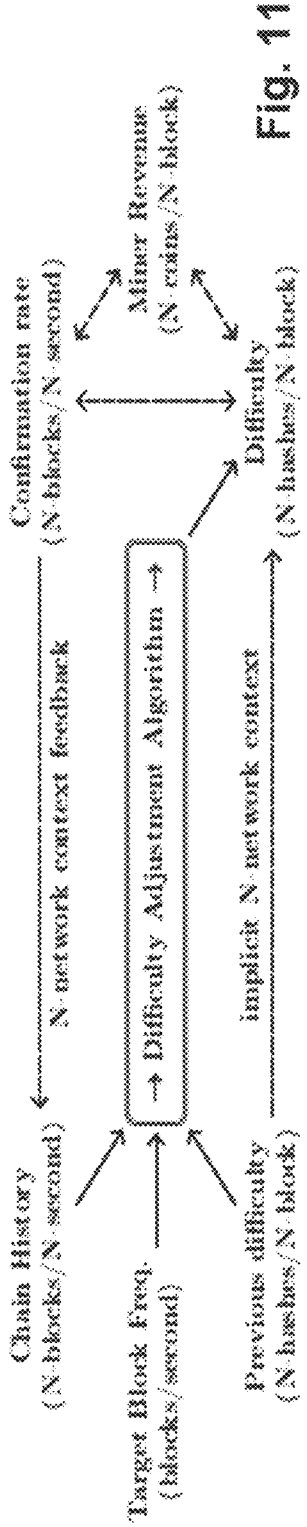
FIG. 11 illustrates the general case of a DAA's relationships (flows of information and context)

The general case of a DAA's relationships (flows of information and context) are diagrammed in FIG. 11. How do we know that both blocks and seconds become context laden via a DAA, though? Let's consider what L/R/means for the possible combinations of context laden values and note whether the meaning works for conversion or not (i.e., whether using it appropriately as a constant of conversion, or scaling factor, will produce sensible results).

$$\text{No context: } \frac{L_f}{R_f} \quad \text{(unitless) works} \tag{11}$$

$$\text{Context laden blocks: } \frac{L_f}{R_f} \quad \frac{L\text{−blocks}}{R\text{−block}} \quad \text{fails} \tag{12}$$

$$\text{Context laden seconds: } \frac{L_f}{R_f} \quad \frac{R\text{−seconds}}{L\text{−second}} \quad \text{fails} \tag{13}$$

$$\text{Both context laden: } \frac{L_f}{R_f} \quad \frac{L\text{−blocks} \cdot R\text{−seconds}}{L\text{−second} \cdot R\text{−block}} \quad ? \tag{14}$$

We've seen Equation 11 and Equation 12 before. The first represents the ratio of block frequencies (unitless)—that's straightforward and works. The second has units L-blocks/

R-block, which sounds like it should be the ratio of block weights—but it's clear that it isn't that (So this conversion method fails).

Equation 13 has unusual units, though. R-seconds/L-second means something like: the relative participation of each network compared with a recent past state; i.e., the ratio of the ratios of each network's actual block production compared to its target block production. Equation 14 measures something like relative weighted confirmation rates. It's not clear if is useful or not, but we do know that no other value we have access to has context laden seconds as a unit. How can we use it to convert between anything meaningful if context laden seconds can't be cancelled via some conversion?

In general, it seems like the safe option is not to use $L_f$ or $R_r$ when converting work—unless we have some specific, context-driven explanation for why it's okay in that case. How do these ideas of context laden values work when converting values between these network-contexts? This is diagrammed in FIG. 11.

In essence, an exchange rate provides meaningful conversion between L-coins and R-coins. Converting in this way does not drop context. Since network context is respected, we can use an exchange rate to build a meaningful constant of conversion across networks.

Conversions and Sums

We know that, after conversion, we can sum work from two different chains. Are there any other values (in units other than L-hashes) that we can sum up, though? When we're summing weights as part of calculating chain-weight (e.g., that of Algorithm 2, or Algorithm 6), do we need to sum L-hashes? No. We only need to end up with L-hashes.

Consider the case for a two-stage linear conversion method. That is: we convert the input into some common units (which could be anything), then we convert those common units into the final units. If both partial-conversions are linear, then we must have a situation like this:

$\text{Convert}_{L\to R}(\ \ldots\ )=\text{Conv}_1(\text{Conv}_2(\ \ldots\ ))=V_1\cdot \text{Conv}_2(\ldots)$, for some constant of conversion, $V_1$. Let's sum multiple conversions, e.g., as done in Algorithm 2:

$$\sum_{i=0}^{n}\text{Convert}_{L\to R}(\ \ldots\ ) = \sum_{i=0}^{m} V_1\cdot Conv_2(\ \ldots\ )$$
$$= V_1\cdot\sum_{i=0}^{m} Conv_2(\ \ldots\ )\quad \text{Factorize out } V_1$$

Thus, any common units, which are linearly convertible both from a reflecting chain's block and to local chain-work, can be used during summation.

Before we move on, let's consider: (15)

$$\frac{L_d}{L_r}\cdot X_{R\to L}\quad \frac{L\text{-hashes}}{R\text{-coin}}$$
$$\frac{R_r}{R_d}\cdot X_{R\to L}\quad \frac{L\text{-coins}}{R\text{-hash}}\qquad \text{Similarly}$$
$$\therefore\ ConvReward_{R\to L}(w)=\frac{R_r}{R_d}\cdot X_{R\to L}\cdot w\quad R\text{-hashes}\to L\text{-coins}$$

Is it possible that we can convert chain-work via summing block rewards?

Turning now to FIG. 11, the difficulty adjustment algorithm governs the relationship between the inputs: the previous difficulty, the target block frequency, and network participation (chain history); and the output: the network difficulty. The DAA is how confirmations and coins become laden with implicit context. If we don't account for this implicit context then our conversions will be nonsensical. The implicit context is network participation-thus, N-prefixes the units which are context laden. Thick arrows indicate network context, and thin arrows indicate world context. Solid arrows show the flow of information. Dashed arrows show the flow of context. Two-way arrows link two values that are convertible. The collection of values mutually linked by two-way arrows define the convertible context. Values can only be converted when there is a direct two-way path between them.

Figure 12:
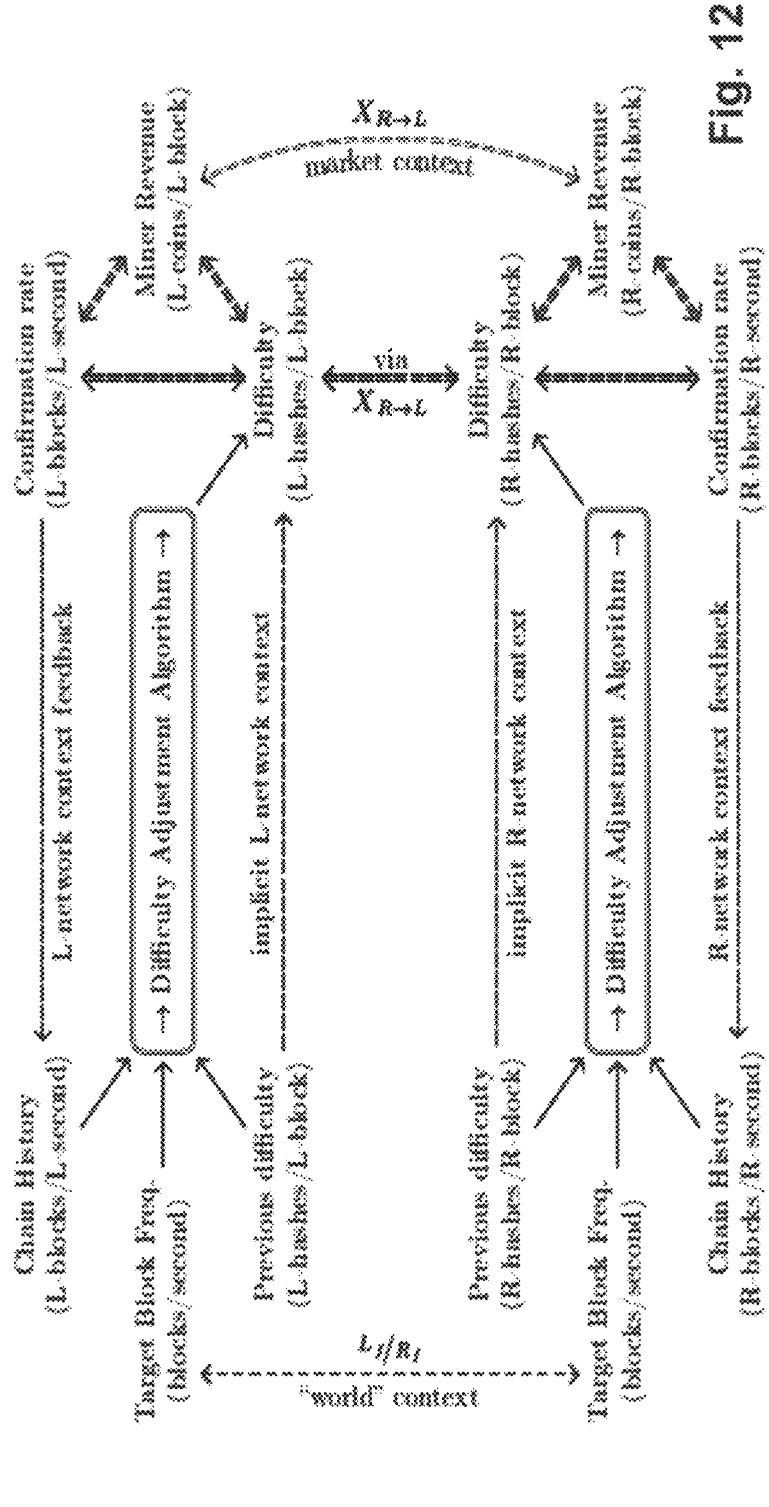
FIG. 12 illustrates the convertible contexts of two different networks.

Turning now to FIG. 12: How are the convertible contexts of two different networks related? Without the market context, there's no conversion path that allows for the conversion of work—the conversion path between difficulties is a consequence of $X_{R\to L}$ (the exchange rate). This is the same convertible context that miners use to determine which network is most profitable for them. Double-lined arrows indicate market context. Thin single-lined dashed arrows indicate world context. Notice that the convertible properties which we are interested in (such as $L_d$ and $R_d$) use thick, double-lined, and dashed two-way arrows, indicating that we are using network context and market context to convert block-weight.

Conversion Contexts

What blockchain contexts can facilitate the conversion of block-weight?

Whatever contexts we find, we will need to figure out a way to get the exchange rate that is at least as secure as the consensus algorithms (otherwise we'd be introducing a new weakest-link).

Can we avoid that exchange rate, though? Well, there is a context where $X_{R\to L}=1$: when L-coins R-coins, i.e., both chains use the same root token. In that case, $L_d/L_r\cdot R_r/R_d$ gives us L-hashes/R-hash directly.

A Single Root Token Across Multiple Chains

The first example context is one network split over two chains. Both chains use the same root token. There are, naturally, questions to answer, like How are block rewards managed? And How can the root token be on two blockchains at once?

Let's consider the following restricted case first: the chains (L and R) have a two-way peg between them, ensuring that no coins are ever wrongly created or destroyed.

In this case, for a single R-block, Equation 2 collapses to $$ConvWork_{R\to L}(w)=\frac{L_d}{L_r}\cdot\frac{R_r}{R_d}\cdot w\qquad \text{Since } X_{R\to L}=1 \tag{16}$$
$$\Rightarrow ConvWork_{R\to L}(R_d)=\frac{L_d}{L_r}\cdot R_r\quad L\text{-hashes}\quad w=(R_d\cdot 1)\ R\text{-hashes}$$
$$\Rightarrow ConvWork_{R\to L}(R_d)\cdot\frac{L_d}{L_r}=R_r\quad L\text{-coins}\qquad \begin{matrix}\text{Weight of an}\\ R\text{-block in } L\text{-coins}\end{matrix}$$

If we convert like this (treating 1 R-block as worth $R_r$ 1 L-coins) then we'll need to convert the result to L-hashes eventually—but we can sum this up if we had multiple reflections to process (since $L_r/L_d$ is a constant for some given moment in time). It's worth remembering that block-weight is measured per block. Since we're only converting with respect to a single block at any one time, the per block part of the resulting units cancels out. Let's use this context to write our first WeightOf function: Algorithm 3 (we'll still return work in L-hashes, though, not L-coins). FIG. 13 illustrates Algorithm 3.

But where do we get the reflecting chain's block reward? To start with, we can't let each chain set its own reward, that would break the two-way peg. It also means the reflecting chain shouldn't be the source of that data. We could retrieve it from state (if it's already calculated), but for the sake of this example, let's calculate it in the WeightOf function.

Right now, we don't have enough context to know what to do; what contexts would be useful?

What purpose does a block reward fulfill? It must be something about security, because that's why miners are given an incentive to mine (the how is via the block reward). If we have multiple chains (with the same root token), why should one chain be more secure than another? One reason is because more commerce happens there; i.e., more of the network relies on that chain compared to the other one.

What would make sense, given the context of a commerce-imbalance, to base the block reward on? A straightforward answer (which can be globally known, too) is the ratio of root tokens on each chain. We can have a network wide rule that there is some network wide inflation rate, and each chain's block reward is proportional to the ratio of coins on that chain relative to the entire supply. This way, the global inflation rate is predictable, even though the number of coins produced on each chain (via block rewards) is variable. Moreover, with this method we should expect that the value to the community of each chain roughly matches the distribution of the community's activities, and the distribution of security, too. This method is also consistent with the idea of equal work for equal reward. We can rely on that idea because equality of work is a result of the market (for block rewards) formed by participating miners.

If the network uses this rule to determine block reward, then, for either chain C, what can we say? Let: I (coins/s) be the network-wide inflation rate; Gt (coins) be the network-wide root token supply; and Ct (coins) be the number of root tokens on chain C. Cf (blocks/s) is the block production frequency of chain C.

$$C_r \cdot C_f = \frac{C_t}{G_t} \cdot I \quad \frac{C\text{-coins}}{\text{second}} \quad \text{As set above} \tag{17}$$

$$\Longrightarrow C_r = \frac{C_t \cdot I}{G_t \cdot C_f} \quad \frac{C\text{-coins}}{C\text{-block}}$$

$$\therefore \frac{R_r}{L_r} = \frac{R_t \cdot I}{G_t \cdot R_f} \cdot \frac{G_t \cdot L_f}{L_t \cdot I} \quad \frac{L\text{-blocks}}{R\text{-block}} \quad \text{Via Equation 17} \tag{18}$$

$$\frac{R_r}{L_r} = \frac{R_t \cdot L_f}{L_t \cdot R_f} \cdot \frac{G_t \cdot I}{G_t \cdot I}^{1} \quad \frac{L\text{-blocks}}{R\text{-block}} \quad \text{by definition}$$

Why is it okay to use block frequencies ($L_f$ and $R_f$) in conversions now?

Consider how block rewards could be set network-wide so that they're consistent across all chains. Unlike a chain's difficulty, the block reward needs to be consistent with some global inflation rate. Equation 18 implies that $R_r R_f L_t = L_r L_f R_t$, so in some cases we don't need to know the global state, just that the relationship is enforced. That said, if I is known across the network (i.e., it is constant or a well-known function) then calculating $G_t$ is trivial: $G_t = I \cdot l + G_{t0}$, where l is the lifetime of the network (in seconds), and $G_{t0}$ is any initial root token supply that was not created via inflation (e.g., via some token generation event).

Could we maintain consistency across chains via something like a Reward Adjustment Algorithm (RAA)? If each chain commits to the input values (e.g., via the inclusion of $C_t$ in their block-headers), then an RAA could be evaluated using only the header-chain (similar to the DAA). This way, if a miner (or a chain) tries to subvert or attack the RAA, it's trivially detectable by reflecting chains. Reward Adjustment Algorithm (RAA): An algorithm which updates the block reward of each chain in a network of chains that share a root token. Similar to a DAA, the output of an RAA is context laden. If we use a RAA, then the RAA output could become context laden (depending on the RAA's input parameters). In the case of a global inflation rate, this means that chains would rely on a common meaning of "seconds". So it is by construction and definition that the block frequency introduced in Equation 17 becomes part of the convertible context. Thus, we can now include $L_f$ and $R_r$, though we couldn't before.

Figure 14:
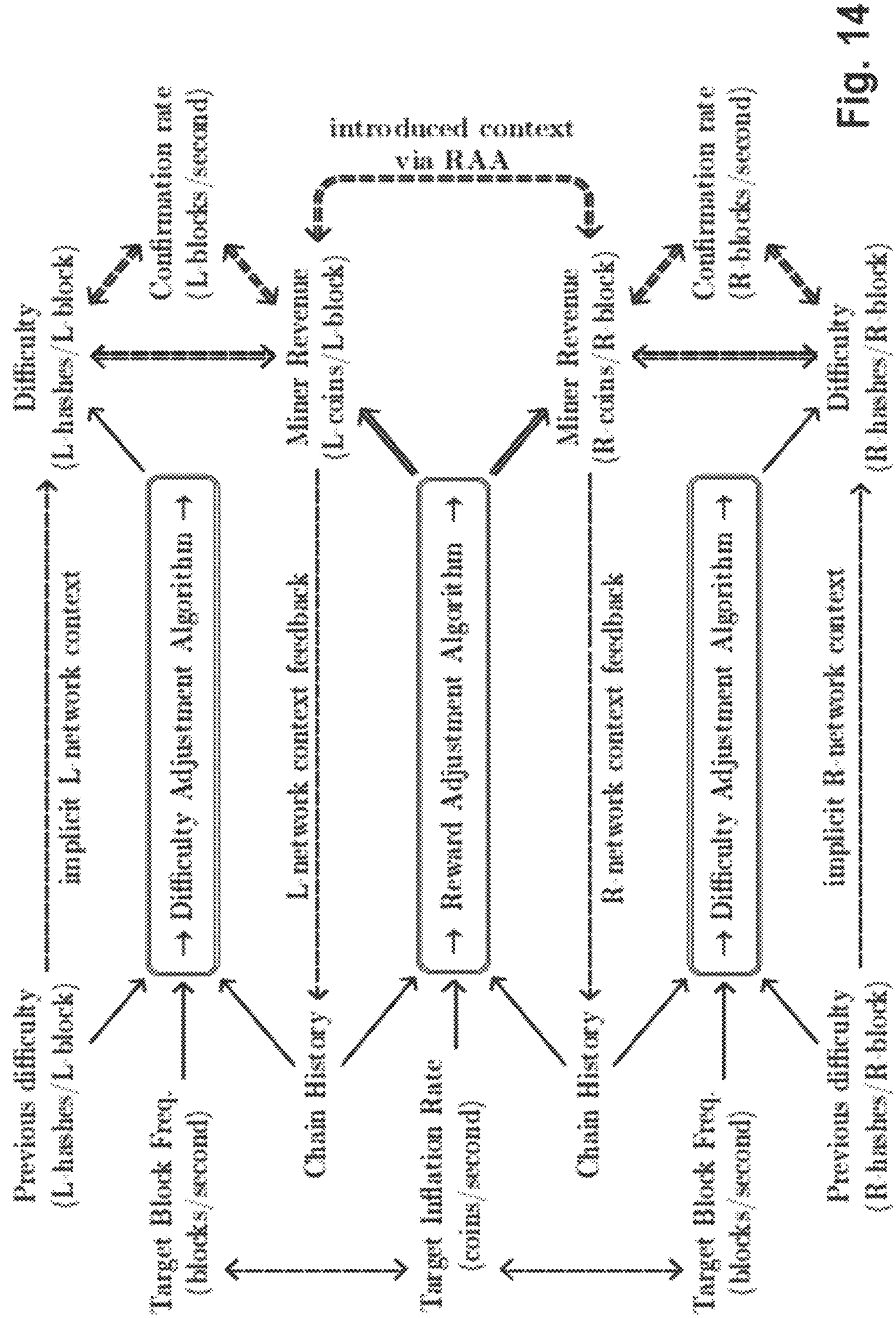
FIG. 14 illustrates how implicit context changes when considering networks of a single root token.

FIG. 14 illustrates how does implicit context change when considering networks of a single root token? In this case, because we set a network-wide inflation rate (Equation 17), by definition, $L_f$ and $R_r$ have meaning in the convertible context. In essence: both L and R have convertible factors that are dependent on the same meaning of "seconds". The collection of values mutually linked by two-way arrows define the convertible context. Double-lined arrows indicate the new context used in the RAA (which is related to the world context). Thick Double-lined arrows indicate the new hybrid context which allows for conversion (for multi-chain networks of a single root token). As before, dashed arrows indicate the flow of context.

Note that we also prove Equation 7 for this case. We know that—when $L_r$ and $R_f$ are in the convertible context—we can use them via a scaling factor that typically ≠1. For example, to convert $L_f/R_r$ to units of L-blocks/R-block, it must be scaled by $R_t/L_t$ (which is contextual and unitless). We can find a scaling factor here (but not generally) because we included it in a protocol-level relationship (Equation 17).

This new situation and context are diagrammed in FIG. 14. Let's use Equation 18 to create our next WeightOf algorithm for this context of a single root token (SRT)—Algorithm 4 as illustrated in FIG. 15. These and the following conversions all collapse nicely if we set R≡L. This is due to the symmetry mentioned above.

Different Root Tokens with a DEX: Our starting point will be Equation 2:

$$ConvWork_{R \to L}(w) = \frac{L_d}{L_r} \cdot X_{R \to L} \cdot \frac{R_r}{R_d} \cdot w \quad R\text{-hashes} \to L\text{-hashes}$$

It's easy to see that we can work with this—of course, the WeightOf function needs access to R's difficulty and block reward, and the exchange rate, too. Do we need to use $R_d$, though? Surely any conversion to L-hashes will work, right?

Let's see:

$$\frac{L_d}{L_r} \cdot X_{R \to L} \cdot R_r \quad \frac{L\text{-hashes}}{R\text{-block}} \tag{20}$$

$$\therefore ConvDEX_{R \to L}(b) = \frac{L_d}{L_r} \cdot X_{R \to L} \cdot R_r \cdot b \quad R\text{-blocks} \to L\text{-hashes}$$

So we can convert to L's block-weight (L-hashes) without knowing R's difficulty. It's good to know that we have options there—there's excess capacity in the values we can convert between. If one value is not available, then we might not even need it.

To move forward, we need to use $X_{R\to L}$ in a new WeightOf function—where does that value come from? The value can't be hard-coded, or provided by a third party—these would introduce vulnerabilities. We need an accurate exchange rate for the moment of conversion, too—one that is reactive enough to remain up-to-date, and precise enough to be useful. It also needs to be provable; in practice, it needs to be on-chain and available to both chains (and they should agree on the exchange rate). If that wasn't the case, how could one chain validate the weight of another chain's PoRs? Ideally, the exchange rate should already be recorded in both chains. (This way, full nodes of either chain do not need extra data to calculate/verify chain-weight.)

However, there is a major loop-hole in some of the above requirements: they only matter for mutual POR. What's different if we consider one-way POR instead? In the case of one-way PoR, the reflecting chain doesn't need to know much about the reflected chain, and the heavy lifting (like the burden of knowing exchange rates) can be offloaded to the reflected chain only. Provided that the source of the exchange rate is a well-built, protocol-level DEX, are there any real issues? Let's consider this limited case first: one-way POR where the reflected chain hosts a DEX between its root token, and the RT of the reflecting chain. Using Equation 20, we can write Algorithm 5.

FIG. 16 illustrates Algorithm 5 A WeightOf function for one-way POR between chains with different root tokens.

Converting Confirmations

So far, we've considered PoW chains only. Conversion of chain-weight between PoW chains can work if and only if we can convert between work (i.e., hashes) done on each chain—given an appropriate context. For a given PoW block, the network knows exactly how much work is implied by that block—the expected number of hashes to produce it. Thus, for PoW chains, there is an exact conversion between work and confirmations (for some context at some point in time). Over short time-scales, this conversion ratio is approximately constant (in general it's a function that takes a timestamp as an input parameter). Thus, chain-weight (as represented in figures via Σw, e.g., FIG. 23) can be represented either in something like hashes or difficulty or chain-weight can simply be in terms of confirmations.

If we convert work to confirmations, will we end up with something incompatible and contradictory to the traditional notion of "a confirmation"? There are definitely differences. For example: if we convert confirmations, then we'll have non-integer confirmations, and what does 0.88 confirmations mean? Is that less good than a normal confirmation?

This problem arises because we're not actually converting work to confirmations, per se: we're converting another chain's work into equivalent-confirmations relative to something. Equivalent-confirmations are another chains confirmations that have been converted to be in terms of the local chain's confirmations. Most likely, those equivalent-confirmations will be relative either to some known historical confirmation, or to that of the current block.

Why think about chain-weight in terms of equivalent-confirmations instead of work? There are a few reasons. First, confirmations are general. If we reason in terms of confirmations instead of work, then maybe we can apply these ideas to other chains that don't use PoW. Second, it simplifies thinking. The purpose of converting chain-weight is clearer and easier to reason about. Finally, it makes explicit the requirement that we can only compare to a grounded context.

There is no way to say X work on L is worth Y work on R without adding necessary context like when that conversion is happening. Confirmations (like work) require that grounding, since they need to be scaled when converting between different chains. What about confirmations from the same chain? Unlike work (which can be summed directly), confirmations always require conversion to a known standard—even when they're from the same chain. For example, we can say that the single confirmation provided by Bitcoin block 704610 is equivalent to approximately 19,893,045,000,000 genesis-confirmations. The conversion-ratio is equal to the difficulty of block 704610. That is, it would take a chain of 20 trillion blocks, each with 1 genesis-confirmation worth of work, to match the weight of block 704610.

Now, converting confirmations, how do we actually do it? If we want to convert confirmations, then we'll need to abstract away from the idea of difficulty in our conversion method.

$$\text{Consider: } \frac{R_r}{L_r}\cdot X_{R\to L} \quad \frac{L\text{-blocks}}{R\text{-block}} \tag{21}$$

$$\therefore ConvBlocks_{R\to L}(b) = \frac{R_r}{L_r}\cdot X_{R\to L}\cdot b \quad R\text{-blocks} \to L\text{-blocks}$$

So 1×R confirmations is worth $(R_r/L_r\cdot X_{R\to L})$ L confirmations.

Coins Per Confirmation

Given a multi-chain network, could we measure block-weight in coins? It seems promising and elegant if it works, but does it have any real-world meaning?

Let's consider this, starting with the conversion used in Equation 18.

$$C_r = L_r\cdot\frac{C_t}{L_t}\cdot\frac{L_f}{C_f} \quad \frac{L\text{-coins}}{C\text{-block}} \quad \text{Via Equation 18} \tag{22}$$

$$C_r\cdot\frac{C_f}{L_f} = L_r\cdot\frac{C_t}{L_t} \quad \frac{L\text{-coins}}{L\text{-block}}$$

$$\therefore \sum_{C\in\{L,R\}} L_r\cdot\frac{C_t}{L_t} = L_r\cdot\frac{L_t+R_t}{L_t} \quad \frac{L\text{-coins}}{L\text{-block}} \quad \text{Sum coins (as a proxy for weight)}$$

$$L_r\cdot\frac{C_t}{L_t} = \frac{L_t\cdot I}{G_t\cdot L_f}\cdot\frac{C_t}{L_t} \quad \frac{L\text{-coins}}{L\text{-block}} \quad \text{Via Equation 17} \tag{23}$$

$$= \frac{C_t\cdot I}{G_t\cdot L_f} \quad \frac{L\text{-coins}}{L\text{-block}}$$

$$\therefore \sum_{C\in\{L,R\}} \frac{C_t\cdot I}{G_t\cdot L_f} = \frac{L_t+R_t}{G_t}\cdot\frac{I}{L_f} \quad \frac{L\text{-coins}}{L\text{-block}} \quad \text{Sum coins (as a proxy for weight)}$$

What does Equation 22 imply if L and R are the only two chains in a context? Notice that, in this case, $L_t+R_t=G_t$, the network-wide currency supply. One implication is that weight (measured in coins) effectively counts how much of the full network is contributing to Chain L's security—represented via the coins that were minted in those contributing blocks. It's easier to see in Equation 23 as the sum collapses to $I/L_f$.

If all chains in the network are functioning well, we should expect that summing a chain's weight in coins over the full history of the chain should be close to the sum of all coins minted through block rewards. Of course, this is only useful over multiple chains. If a single, traditional blockchain tried to do this, then all chain-weights would be basically identical.

This may be a new criticism of PoS. In essence: a blockchain needs something like a DAA to factor—in participation. PoS chains use coins instead of hashes, but coins will never provide a way to determine which chain has higher participation. Moreover, coins are actually a bad way to measure participation (for a standalone PoS chain), because the most valuable future network is one where coins are being used for actual trade, and this must happen at the expense of the number of coins dedicated for staking. Thus, PoS chains can only ever have objectively secure fork-rules when other factors are included in their conversion contexts (like using POR with a PoW chain). One thing PoS chains could try is: measuring weight in another chain's hashes.

This happens because these conversion methods don't try to convert work done at different times. PoR only ever converts near-simultaneous work, i.e., if the coin-weights of reflecting blocks are summed, that is always converted to local work with respect to some specific moment in time.

While measuring weight in coins (in this case, at least) seems to have some meaning, we probably shouldn't leave chain-weight in those units. The difficulty of a PoW network converts network size (participation) into hashes, and it is adjusted regularly. If a chain-weight measurement doesn't account for this, then how does it include participation at all? Without including participation in chain-weight, how can two local alternate histories be meaningfully compared? When measuring and converting chain-work, we always want to convert confirmations or coins back to meaningful units which factor in participation in some way.

Reflection Between PoW and PoS Chains

Whether PoS systems can be secure is not a focus of this application. There are still criticisms of PoS without adequate answers. The intention of sections like this is not to endorse PoS, but rather to explore what is possible if PoS can be done securely.

Perhaps one of the most interesting features of Proof of Reflection is that PoW chains and PoS chains can reflect one another. Up till now, we've contextualized the weight of a reflection via the work required to produce a block. But the concept of work does not neatly apply to foundational consensus mechanisms that do not require the utilization of some physical resource—such as PoS.

Foundational Consensus Mechanisms: Those mechanisms, like PoW and PoS, which can work in some standalone fashion; POR is a cross-chain extension to such mechanisms.

Putting the issue of conversion aside for a moment, is it possible in principle for PoW and PoS chains to reflect one another? Yes. Additionally, POR provides decisive advantages both for PoW chains and PoS chains, though there are some additional problems that must be solved, too.

If a PoW chain is reflected in a PoS chain, then an attacker will likely need more than just computational resources to attack the PoW chain. Consider a PoW chain and a PoS chain that share a root token, and each chain hosts approximately 50% of the total supply. If the two chains have equal block production frequencies, then (using Algorithm 4) 50% of the network's security comes from each chain.

Consider an attack on the PoW chain and presume that the difficulty on the PoW chain is constant over the attack, i.e., the PoW chain's difficulty doesn't adjust quickly enough to react to the attack. Additionally, assume the attacker has not been contributing to the network before the attack, i.e., their hash-rate is not accounted for in the PoW chain's difficulty. Given the two chains are mutually reflecting, half of the network's security is provided by the PoS chain (and thus immune to the attacker in this case). Therefore, a successful attacker-using the traditional method of mining a competing chain-segment in private-must generate more blocks than both chains combined. That means the attacker needs twice the honest hash-rate for a guaranteed successful attack.

However, consider the case that the security contribution of the PoW chain is capped at 50%—i.e., capped at the proportion of root tokens hosted on that chain. For our purposes, this situation is approximately equivalent to that where the PoW chain has a perfect difficulty adjustment algorithm, i.e., the network instantly adapts to keep the block production frequency constant. For the sake of this demonstration, assume that these chains retroactively adjust block weightings to ensure this cap holds. Let $p>0$ be the honest miners' contribution to overall network security, and $q>0$ be the attacker's contribution. As the PoW contribution to overall security is capped at 50%, the equality $p+q=0.5$ is enforced. In this case, the attacker will have a maximum chain-weight contribution rate of $\frac{1}{2}\cdot q/(q+p)$ and the honest chain-segments will have a maximum contribution rate of $(\frac{1}{2}\cdot q/(q+p))+\frac{1}{2}$.

The condition for a successful attack is shown in Equation 24, and the inequality has no solutions.

$$\frac{1}{2}\cdot\frac{q}{q+p} > \frac{1}{2}\cdot\frac{p}{q+p}+\frac{1}{2} \tag{24}$$

$$q > p+(q+p)$$

$$0 > 2p \qquad \text{which is a contradiction since } p>0$$

Given the right set-up, a PoW chain gains an incredible security advantage from mutual reflection with a PoS chain.

The attack scenario assumes that the attacker is not attacking the PoS chain that is reflecting the PoW chain. That is not a safe assumption. Additionally, with traditional blockchains (which are trees), an empty-block DoS is possible.

What about the PoS chain, though; what benefits does it gain from this relationship? The answer here is simple: by using mutual POR with a PoW chain, the PoS chain gains thermodynamic security; the PoS chain's history is thermodynamically secured by the PoW chain. This solves the Nothing at Stake problem for any well-constructed PoS scheme. Furthermore, it is possible for error-correction methods like slashing to be implemented on the PoW chain, not the PoS chain. Moving the staking and error correction methods to a different chain will require precise protocol design, but such changes are possible with tolerable overhead.

Conversion methods for reflected weight, like Algorithm 6, will work provided a well-defined WeightOf function exists.

There are some other conjectured solutions to the Nothing at Stake problem.

"Long-range "nothing-at-stake" attacks are circumvented through a simple "checkpoint" latch which prevents a dangerous chain-reorganisation of more than a particular chain-depth. To ensure newly-syncing clients are not able to be fooled onto the wrong chain, regular "hard forks" will occur (of at most the same period of the validators' bond liquidation) that hard-code recent checkpoint block hashes into clients." (Dr. Gavin Wood; Polkadot Whitepaper, s5.2).

"Provided that stakeholders are frequently online, nothing at stake is taken care of by our analysis of forkable strings (even if the adversary brute-forces all possible strategies to fork the evolving blockchain in the near future, there is none that is viable), and our chain selection rule that instructs players to ignore very deep forks that deviate from the block they received the last time they were online." (Ouroboros: A Provably Secure Proof-of-Stake Blockchain Protocol, s10)

These two examples solve the Nothing at Stake problem via mechanisms that are external to the protocol itself, i.e., hard-coded checkpoints and the requirement that nodes are online "frequently".

The solution provided by mutual reflection with a PoW blockchain—i.e., thermodynamic security is provided by the protocol itself and can only increase the security of PoS mechanisms. Thus, UT's solution to Nothing at Stake is qualitatively superior.

Counting Work

Figure 17:
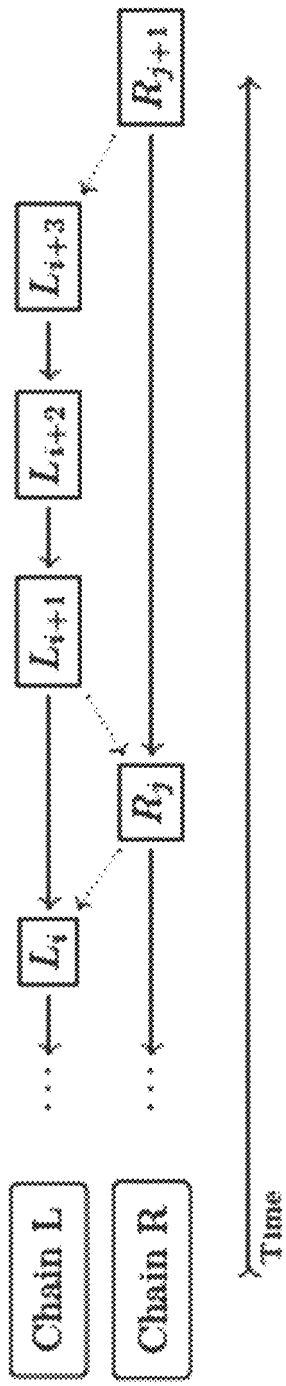
FIG. 17 illustrates the temporal nature of block production including reflections between Chain L and Chain R.

When chains L and R have the same block frequency and produce blocks in an orderly fashion, it's trivial to count how much work is contributed by each POR. However, real-world blockchains do not produce blocks like this—even if chains L and R have the same block frequencies, sometimes L will produce 2 or 3 (or more) blocks before R produces its next one (or vice versa). Such an example is illustrated in FIG. 17.

Should $R_{j+1}$ include 3 PoRs, or just 1? How should $R_{i+1}$ calculate the weight of those PoRs and the total weight contributed to chain R? If $R_{i+1}$ had reflected only $L_{i+1}$, then it's clear that we would count work from both $L_{i+1}$ and $R_{i+1}$ that much is easy. However, $R_{i+1}$ reflected three L headers. Should $R_{i+1}$ count work from all three, or something else?

Consider the situation from the miner's perspective (the miner of $L_{i+2}$). There is no new R block for them to reflect—if there were, they'd include it. The miner is effectively claiming—via the absence of a new reflection—that $L_{i+2}$'s parent ($L_{i+1}$) reflects the most recent R header ($R_j$); that $L_{i+1}$ is still up-to-date. From this perspective, it's clear that $L_{i+2}$ should contribute reflected weight to the best R headers that were most recently reflected: in this case, just $R_j$. We can evaluate $L_{i+3}$ the same way. So, $R_{i+1}$ should include and count work from all 3 PoRs in this case.

Figure 18:
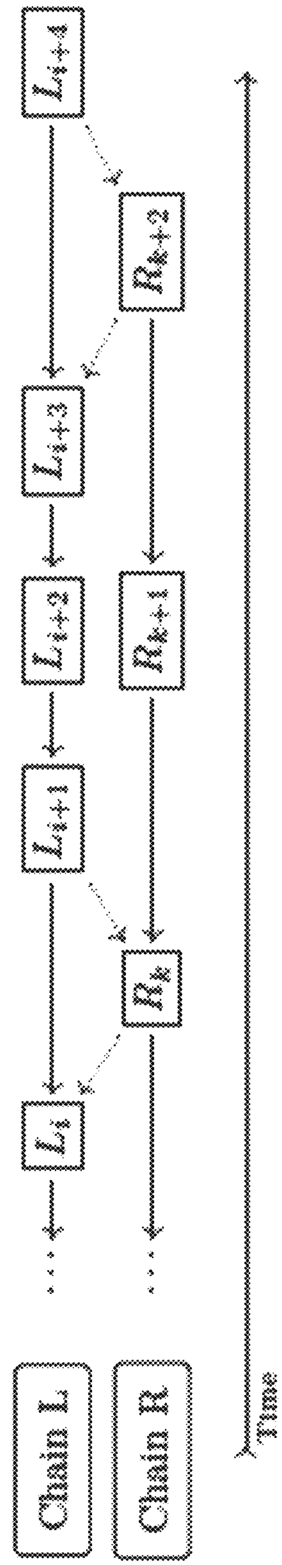
FIG. 18 illustrates a further example of the temporal nature of block production including reflections between Chain L and Chain R.

FIG. 18 illustrates a more complicated example. In this example, $R_{k+2}$ can be evaluated by similar logic to $R_{j+1}$ above, but what about $L_{i+4}$? Does $L_{i+4}$ count the weight of $R_{k+1}$? If so, does it count towards $L_{i+3}$'s chain-weight? The difficulty in answering these questions—with what we've covered so far—is that the fork-rule doesn't care where the weight is added, just that it is added. When the fork rule compares $L_{i+4}$ to an alternative block, only the total chain-weight of each is relevant. However, to understand exactly how PoRs should be counted, we need to know more. The essence of POR is the confirmation of another chain's history—so a reflection cannot contribute to a block which exists in the reflecting block's future. It must be that reflections contribute to the most recent common ancestor of all possible L blocks which could include that specific PoR.

This leads us to a simple and elegant way to count reflected work: follow the arrows back from the reflecting block to the most recently reflected local block. $L_{i+4}$'s reflection of $R_{k+2}$ contributes chain-weight to $L_{i+3}$ because any block that builds on $L_{i+3}$ could reflect $R_{k+2}$. Following the arrows: $R_{k+2} \rightarrow L_{i+3}$. Similarly, $L_{i+4}$'s reflection of $R_{k+1}$ (which could be either explicit or implicit via $R_{k+2}$) must contribute chain-weight to L; because any block building on $L_i$ could reflect $R_{k+1}$ and include that PoR. Following the arrows: $R_{k+1} \rightarrow R_k \rightarrow L_i$. We can also say more about $R_{k+2}$'s reflection of $L_{i+3}$, now, too. Particularly, that the reflected work of $L_{i+1.3}$ should contribute to $R_k$, not $R_{k+1}$.

UT: Constructing Ultra Terminum

Proof of Reflection can be used to build UT1—an $O(c^2)$ foundation for a blockchain network (hereinafter called the simplex). This section details the construction of such a foundation, and how it can be extended up to UT3—which has $O(c^4)$ complexity. The O(n) scaling configuration ($UT_x$) is detailed below.

Such a foundation (the simplex) is not a sharded blockchain—there's no requirement that participating chains are interchangeable or using the same primitives. Rather, the simplex is an emergent construct that is created via the relationships between blockchains. Instead of one blockchain being split into many (as occurs with sharding), the simplex is many blockchains becoming one coherent network.

Generalizing Reflection

Proof of Reflection is, in essence, the idea that a chain can acknowledge that its history has been confirmed by a different chain.

In principle, the necessary capabilities (and actions) that some chains, $C_A$ and $C_B$, must have (and do) in order for $C_A$ to be reflected by $C_B$ are: The headers of $C_A$ can be (and are) freely recorded-promptly and unambiguously—in $C_B$; The headers of $C_B$ can be (and are) freely recorded-promptly and unambiguously—in $C_A$; and $C_A$ is able to (and does) promptly prove that its past headers have been recorded in $C_B$, and has full knowledge of which headers have been recorded.

FIG. 19 illustrates Algorithm 6 Implementation of ReflectedBlockWeight to support an arbitrary number of reflecting chains.

The benefits from Proof of Reflection begin as soon as $C_A$ integrates this knowledge into its chain-weighting algorithm, by a method suitably similar to Algorithm 2 and Algorithm 3. If $C_A$ and $C_B$ are doing mutual Proof of Reflection, then both chains must satisfy all requirements. Is $C_A$ able to simultaneously do reflection with more than one other chain, e.g., $C_C \ldots C_Z$? Yes. There is nothing that we have covered so far that would prevent this. If Proof of Reflection is viable with a single other chain, then it is viable with many other chains. However, the dynamics do become increasingly complex, as discussed below.

In order to support arbitrarily many reflections, we need to modify ReflectedBlockWeight from Algorithm 2 as shown in Algorithm 6 (FIG. 19). Note that Algorithm 6 integrates the cap on weight contributed by each reflecting chain, as suggested previously.

UT1: The Simplex

Turning now to FIG. 20, there is illustrated simplexes of increasing capacity. Vertices are simplex-chains. Edges are the reflections between simplex-chains. FIG. 20 illustrates Proof of Reflection between 2 blockchains. A 1-simplex. The most basic non-trivial simplex. Proof of Reflection between 7 blockchains; a 7-chain simplex; a 6-simplex. A 17-chain simplex; a 16-simplex. It has 136 unique mutual reflections in total.

The simplex provides a single coherent structure that emerges from a collection of blockchains that mutually reflect each other.

When two or more blockchains mutually reflect each other, they form a simplex. For the sake of brevity: all reflections within a simplex are mutual reflections. Examples of simplexes are shown in FIG. 20. When a blockchain is part of a simplex, it is called a simplex-chain (as distinct from dapp-chains). A Simplex-chain is a blockchain that is part of a simplex; it mutually reflects all other simplex-chains in that simplex.

The name is taken from geometry (particularly: the higher-dimensional kind). A simplex, for a given dimensionality, is the uniquely simplest polytope; e.g., a line in 1D space, a triangle in 2D space, a tetrahedron in 3D space, etc. A k-dimensional simplex is known as a k-simplex. As shown in FIG. 20, a particular 2D projection of a k-simplex is identical to a diagram of all possible mutual reflections between k+1 blockchains, where each chain is represented by a vertex and each mutual reflection is represented by an edge.

To maintain consistency with the geometric usage of the term simplex: a simplex with k+1 chains is called a k-simplex or a (k+1)-chain simplex. In a k-simplex, each simplex-chain has k reflections (one reflection for each of the other simplex-chains). A k-simplex has, in total, (k+1) reflections.

UT2: Dapp-Chains

Dapp-chains are the method by which Ultra Terminum exceeds $O(c^2)$ scaling without using the method described below. The $O(c^2)$ configuration of UT is compatible with that other method; dapp-chains are a separate and independent method of scaling. However, there are decisive reasons to introduce and use dapp-chains. Dapp-chains provide features that the O(n) scaling configuration alone cannot easily provide. Additionally, dapp-chains increase the simplex's scalability to $O(c^3)$ or $O(c^4)$. Dapp-chain: An application-specific child-chain that is secured via the parent-chain. Dapp-chains may have architecturally distinct state- and transaction-schemes (distinct from those schemes used in the simplex, and other dapp-chains).

Dapp-chains are not restricted to any particular foundational consensus method. They might use PoW, or PoS, or PoA, or something else. However, dapp-chains also use Proof of Reflection with their host simplex-chain. With a suitable foundational consensus method, POR enables dapp-chains to be as secure as their host simplex-chain with little overhead. Since dapp-chains can use whichever foundational consensus method, they can optionally have their own root token (and use that for mining rewards, transaction fees, etc).

It's preferable that a simplex-chain validate the headers of its dapp-chains (similar to a light client), though this is not required. For some consensus methods that dapp-chains might choose (such as PoS), there might be special primitives that a host simplex-chain must support. However, only that host simplex-chain requires those primitives; other simplex-chains do not. This means that simplex-chains can specialize in hosting particular types of dapp-chains, providing rich and efficient environments (for nodes of both simplex-chains and dapp-chains).

Validating dapp-chain headers, on-chain, can be done via the following simple, clean, and extensible method: encode dapp-chain headers as simplex-level transactions. This means that supporting new dapp-chain consensus methods is about as difficult as introducing new transaction types (or opcodes), and different simplex-chains have a great deal of freedom in choosing which dapp-chain consensus methods to support.

Header-transactions: Dapp-chain headers that are encoded as simplex-level transactions; i.e., they are processed by a simplex-chain as a transaction, but they also function as the header for a dapp-chain block.

Practically speaking, a simple input-output transaction system with scripting capabilities (like that of Bitcoin) can be created to facilitate the necessary primitives. Additionally, different simplex-chains can implement different scripting systems, effectively facilitating any practical consensus mechanism. There is not much (if any) overhead to using an input-output system like this: a header's parent hash is equivalent to a transaction input, the output can be omitted, and other particulars of the header can be treated as an input script to the transaction. A header-transaction's output script can be generic (or templated) as it is the same for all header-transactions for that dapp-chain. In practice this can be as simple as a single opcode that validates that header. In Bitcoin, an output script is known as the scriptPubKey. In Bitcoin, the input script to a transaction is called the scriptSig; see https://en.bitcoin.it/wiki/Transaction.

Dapp-Chain Security

If the headers of dapp-chains are simplex-level transactions, what can we say about the security of dapp-chains?

First, there is no substantive difference between standalone headers and header-transactions. That means that zero-confirmation header-transactions are exactly as secure as a standalone counterparts (and at least as secure as zero-confirmation transactions). This is not very secure in the case of a PoW dapp-chain, but it means that a PoS dapp-chain's zero-confirmation header-transactions are just as secure as blocks from an equivalent standalone PoS blockchain. (It also means that the PoS dapp-chain is much more secure after header-transactions are confirmed, compared to the standalone equivalent.) When a header-transaction is confirmed by the simplex, the corresponding dapp-chain can efficiently use one-way PoR to inherit the security (and security properties) of the host simplex-chain.

PoW dapp-chains will have a much lower difficulty than the host simplex-chain. Although a simplex-chain could do mutual POR with dapp-chains, this is unnecessary and inefficient-provided that this difficulty asymmetry exists.

Similar to mutual PoR, this can provide a security context where otherwise-insecure methods of consensus can be done securely.

With regards to double-spends, one-way POR means that the reflected chain is at least as difficult to attack as the reflecting chain. Since the parent simplex-chain is as difficult to attack as the complete simplex, each dapp-chain must therefore also be that difficult to attack. Attacking a dapp-chain is as difficult as attacking the entire network. Parent-chains (generally) need to record their child-chains' headers anyway, so this use of one-way POR—where a simplex-chain reflects child dapp-chains—has near-zero overhead for both the simplex-chain and the dapp-chain. The only major, generic concern for dapp-chains is preventing DoS attacks. This is one reason to favor PoS (or PoA) dapp-chains over PoW dapp-chains.

Three General Incentive Models for Dapp-Chain Reflection

If dapp-chain headers are included along-side transactions in simplex-blocks, is it not the case that both must pay some kind of transaction fee? If not, how are simplex-chain miners to prioritize what to include in their blocks? Even if such a fee is not always necessary, the ability to provide a fee has decisive advantages—like creating asymmetry between an attacker and honest miners.

If it is possible to implement dapp-chains (or any system of child-chains) such that those chains have freedom of protocol and freedom of incentivization whilst inheriting the parent-chain's security, then we should strive to achieve that.

Freedom of Incentivization: The property whereby child-chains have free choice of incentive-system (i.e., the nature and dynamics of their root token, or lack thereof).

Freedom of Protocol: The property whereby child-chains have free choice of protocol (including consensus mechanism, scripting, accounting methods, block structures, etc). Here are three methods of abstraction which maintain the above freedoms.

Method 1: Pay the simplex miner on the dapp-chain: In this method, the dapp-chain uses its root token to pay both the dapp-chain miner and the simplex-chain miner (who includes the relevant dapp-chain header in their block). Since all dapp-chain miners are required to run a full node of the parent-chain, this is simple. In essence, the host simplex-chain is a subset of the dapp-chain. Simplex-miners can run light clients of the dapp-chain to regularly collect block-rewards. A simplex-miner could use other methods too, like maintaining full nodes of each dapp-chain and continuously. A dapp-chain could, have a rule like X root tokens are created as part of the Coinbase transaction and the miner of that block has free choice of the proportion of those which are provided as a transaction fee to the host-miner.

Method 2: Pay the simplex miner via a native DEX: When a dapp-chain hosts a native DEX, it can use that DEX for PoR. The general case (where a reflecting chain contributes far more chain-work than the reflected chain) was discussed above. Consider the limited context of a DEX with only one required trading pair (between the dapp-chain's root token and the ROO), combined with the security-contribution differential between a simplex-chain and a dapp-chain. Note that a conservative implementation of a DEX between this pair only relies on local state—that of the host simplex-chain and the dapp-chain, all of which is accessible to dapp-chain full nodes. The simplest method of preventing market manipulation (that might allow for some attack on the dapp-chain) is to calculate POR weight via an old exchange rate (e.g., from 24 hours ago), or to use an average over some period of time. Both of these ensure that competition between blocks (at any given time) is not dependent on the current DEX execution. With regards to dapp-chains using Proof of Reflection, this is sufficient.

Given a DEX, the dapp-chain can use this to automatically convert some of the mining reward to the root token of the host simplex-chain. These rewards could accrue over time and be bundled into far fewer transactions than would otherwise be necessary and automatically managed by the DEX. Unlike the previous method, this method doesn't require the simplex-chain miner to ever interact with dapp-chains (besides including their header-transactions); however, the protocol is more complex.

Method 3: Pay the simplex miner directly: If the dapp-chain is willing to forego more efficient SPV transactions (or otherwise doesn't require them), and it is willing to bear the full burden of PoR in this context, then simply recording the hash of a dapp-chain header might be sufficient. In such a case, transactions (in the style of Bitcoin's OP_RETURN transaction format) provide everything required. This makes sense if the dapp-chain has exceptionally large headers, or if the dapp-chain does not wish to disclose the headers themselves (perhaps it is a private/permissioned network). In any case, since it is impossible to stop users including hashes in transactions, this is always a method by which dapp-chains can enable POR with the host simplex-chain.

PoS Dapp-Chains

If the headers of dapp-chains are encoded as simplex-transactions, then techniques like slashing are first-class operations within the hybrid PoW context provided by the simplex. This solves the Nothing at Stake problem for PoS dapp-chains, provided the necessary PoS primitives can be encoded in a simplex-transaction. The abstraction layer between simplex-chains and dapp-chains brings practical benefits, too. For example: existing (open-source) PoS blockchain schemes can be easily integrated as dapp-chains.

Given that dapp-chains inherit security properties of their parent-chain (via one-way PoR), if such a dapp-chain's consensus method supports other features—e.g., finality guarantees—those features are free. (Sharding also).

The most likely method of integration has three core components: modification of the headers (and integration of PoR), modification of existing slashing protocols, and support for intra-simplex SPV proofs. For example: OpenEthereum could be integrated as a dapp-chain with the creation of a new header format, the creation or modification of a suitable engine, and the implementation of suitable built-ins that facilitate intra-simplex SPV proofs and any other useful features. Naturally, there are some other components that are necessary (like a component for broadcasting header-transactions), but those components are common over many dapp-chain integrations and only need to be written once for each kind of dapp-chain.

Practical Considerations for UT's Design

Availability of Reflected Blocks

What would happen if a header—with valid PoW but without a valid block—were to be reflected? Let's consider the two chains (L and R) from FIG. 7. That would mean that chain L contains a header, $H_{R,1a}$, for chain R for which no block is available.

This does not break chain R, but it could mean that other blocks on chain R temporarily have a harder time competing, or waste the resources of chain R nodes as they go looking for that block, $B_{R,1a}$. Furthermore, it risks chain R miners doing SPV mining, which is bad. After $H_{R,1a}$ is reflected, chain R miners shouldn't build on that header without validating the block (so they should not mine on top of it). Before long they'd produce an alternate valid block, $B_{R,1b}$. But $B_{R,1b}$ (and its header, $H_{R,1b}$) wouldn't be reflected yet. So $B_{R,1a}$ would have priority over $B_{R,1b}$ until $B_{R,2b}$ (building on $B_{R,1b}$) is created and both $H_{R,1b}$ and $H_{R,2b}$ are reflected. After that, a minor chain re-org would restore normality.

There is at least one way to ensure that blocks of reflected headers are available. That is: miners on both chain L and chain R should refuse to build on blocks that include headers without a known block. This would mean that the chain L block (which includes $H_{R,1a}$) is invalid on chain L while $B_{R,1a}$ is unavailable. If such a method is feasible, then the malicious chain L miner has greater opportunity cost to produce a block reflecting $H_{R,1a}$. Moreover, this method prevents chain L (and its miners) from contributing to a potential attack on chain R.

For this to work, though, miners must verify that blocks exist for all reflected headers. Is this practical if there are 1,000 or 10,000 reflected chains in a simplex? The miners are only required to do very small amounts of computation on these other blocks, so their computational capacity won't be a bottleneck here. Furthermore, they don't need to keep these other blocks indefinitely, just long enough to be confident that they reflect only headers with existent blocks. So they won't need much extra disk space, either—after a few years, the history of a simplex-chain will be larger than, say, the last 12 hours of all simplex-chains' histories combined. The complexity and impact of this strategy is discussed below.

Proving Reflection

If simplex-chains' consensus protocols require accounting for reflected work, then nodes must have some method whereby they know which work (in a particular chain's history) has been reflected. That is: a node for chain L must be able to answer the question: for each other simplex-chain, which blocks in chain L's history have been reflected? This means that each node must have $N_1$ answers, per block, for a simplex of $N_1$ chains.

There is a trivial method: with each header, include the corresponding Merkle branch which proves reflection. Specifically: when a miner on chain L mines a block that includes a header from chain R, they should also include-along-side the header-a Merkle branch that shows the most recent chain L ancestor that has been reflected by chain R. For example, block $B_{L,i+1}$ might include a proof that Hui was reflected by $B_{R,j}$. That branch is the only required branch (i.e., the missing branch), as chain L nodes are already aware whether $H_{R,j}$ was reflected by $B_{L,i+1}$.

Miners would need to do this for all simplex-chains that they reflect. Predictably, this has overhead with order $O(N_1 \cdot \log_2 N_1)$, where $N_1$ is the number of chains in the simplex. This method has complexity $O(c \cdot \log_2 c)$ which is discussed below.

Explicit Proofs (+PoRs): The UT protocol variant wherein miners/validators explicitly record both reflected headers and the single missing Merkle branch required to prove reflection.

Is it possible to avoid the explicit inclusion of those proofs, potentially allowing for O(c) complexity instead? If miners of any simplex-chain download the blocks of all simplex-chains then including all necessary proofs of reflection can be made redundant. Since miners, theoretically, have all the necessary data to construct the proofs, do those miners need to actually include those proofs? Could we treat those proofs as witnesses and prune them—similar to SegWit, Omitted Proofs (+OP): The UT protocol variant wherein miners/validators explicitly record only reflected headers, such that necessary proofs of reflection are deterministically recalculable.

There would be some downsides to omitting the proofs of reflection. For one, it would mean that simplex-chain nodes, during an initial sync, would not be able to verify the PoRs without auxiliary data—potentially a lot. Secondly, it would mean that miners must track the state of all reflections in the simplex for some period of time so that they ensure the integrity of the reflection protocol. This is possible without significant overhead.

Segmented State

Traditionally, blockchain protocols have some global state and a state-transition function. For example, the Ethereum Yellow Paper says: "Ethereum, taken as a whole, can be viewed as a transaction-based state machine: we begin with a genesis state and incrementally execute transactions to morph it into some current state. It is this current state which we accept as the canonical "version" of the world of Ethereum. [ . . . ] A valid state transition is one which comes about through a transaction. Formally: $\sigma_{t+1} \equiv Y(\sigma_t, T)$ where Y is the Ethereum state transition function."—Dr. Gavin Wood; Ethereum Yellow Paper/Petersburg Version 41c1837, s2

One of the reasons for this tradition is that transactions are (typically) permitted to depend on any part of the global state. For example: a Bitcoin transaction is permitted to spend any UTXO, and an Ethereum smart contract may interact with any other smart contract on the Ethereum blockchain. However, it is not necessary for a protocol to allow any and all transactions to depend on global state. A protocol could specify that certain transactions may depend only on a strictly defined subset of global state, i.e., a well-defined segment of global state that is independently calculable.

Simplex-chains can use this technique to their advantage by segmenting both transactions and state which are specific to Proof of Reflection. That way, the state of a simplex-chain's reflections can be calculated without needing to calculate the remaining state for that simplex-chain.

We could specify the state-transition of simplex-chains (using Ethereum's nomenclature) like this:

$$\sigma_{R,t+1} \equiv \Upsilon_R(\sigma_{R,t}, T) \tag{25}$$

$$\sigma_{R,t+1} \equiv \Upsilon_R(\sigma_{R,t} + \sigma_{\star,t}, T)$$

Where, at some time t: $\sigma_{R,t}$ is the segment of state that is tracking reflections and headers; $\sigma_{*,t}$ is the global state excluding $\sigma_{R,t}$: YR is the state-transition function for the reflections segment; and Y* is the state transition function for all remaining segments. Note that if T is a reflection-transaction (i.e., it contains headers to be reflected) then Y* does nothing, and if T is any other type of transaction then YR does nothing.

In essence Equation 25 shows that $\sigma_{*,t}$ depends only on the $\sigma_{R,t-1}$ state-segment and the current transaction, whereas out depends on the global state.

If simplex-chains are segmented in this manner, then miners will be able to calculate the reflection-state of other simplex-chains without calculating their complete state. This would allow them to deterministically calculate proofs of reflection for all other simplex-chains.

Exploiting Segmented State

Given that the reflection-segments of simplex-chains will contain mostly redundant data (i.e., headers), numerous optimizations are possible. For example, it's not necessary for a miner's node to re-download reflected headers since it already has most (or all) of them; that node just needs to know which headers are reflected and in what order. Transmitting the hashes of headers, only, reduces the effective size of simplex-blocks from b to b. $(g+B_h/2B_h)$, where g is the size of the relevant digest in bytes. For g=32; $B_h$=112, this reduces effective block size to ~0.643b—an improvement of ~35%.

However, instead of using that technique to minimize bandwidth, it could instead be used to maximize the number of simplex-chains. If simplex-blocks dedicate ½ of their capacity to reflections, then we can reduce that burden by $1-32/B_h \approx 70\%$, or we could increase the capacity for reflections by $B_h/32 \approx 300\%$.

Header Omission (+HO): The UT protocol variant wherein miners/validators explicitly record only the hashes of reflected headers. A requirement is that block producers must eagerly download the headers of all simplex-chains and deterministically recalculate the relevant Proofs of Reflection.

Starting with +PoRs, we have reached the +HO variant via omitting proofs (+OP). However, it is not the proofs that are redundant, but the headers. Does header omission with explicit proofs provide any advantages? Yes.

Particularly, if miners include only the single missing Merkle branch associated with the necessary PoRs, then no additional information is required besides the header itself. Headers are trivial to acquire from the network, and each only needs to be acquired once, regardless of the number of PoRs it is a part of. Since the hash of each header is part of the missing POR Merkle branch, miners only need to provide an ordered list of Merkle branches for full POR verifiability. Additionally, these Merkle branches will be part of specific SPV proofs, so when a cross-chain SPV transaction (that uses those branches) is made, it can omit those parts of the proof (replacing them with a pointer).

This UT protocol variant is +HOPoRs, the combination of header omission (+HO) and explicit proofs (+PoRs). It may present decisive advantages for implementations of simplex tilings.

FIG. 21: Possible upgrade paths between UT variants, starting at UT+PoRs in the top left—the most conservative variant. Solid arrows show paths of increasing capacity.

Confirmation Times

A confirmation is a discrete event that occurs when a block is produced. When an attacker is performing a hash-rate based double-spend attack they are, effectively, racing the honest network; that race is measured in confirmations, not time. In a traditional blockchain (e.g., Bitcoin, Ethereum) confirmations occur, on average, at a predictable rate (that of the target block production frequency). Thus, for any particular traditional blockchain, a convenient time-based rule of thumb can be devised, e.g., a Bitcoin transaction is safe to accept after 1 hour. However, this approximation only works because blocks (and thus confirmations) are only produced locally (to that blockchain) and at a probabilistic (roughly constant) rate. Put another way, the frequency of confirmations is identical to the frequency of blocks, $B_f$ Hz. Since $O(B_f)=O(1)$, the time-complexity of confirmation in these networks is also O(1).

When using PoR, though, the assumptions behind that rule of thumb do not hold—while blocks on a single chain may be produced at a constant rate, that chain also gains a security benefit from other chains. For the case of a 2-chain simplex (where those chains have the same block production frequency), the rate of confirmations will be twice the rate of block production. This is easily generalized: for an $N_1$-simplex with simplex-chains that share some block frequency $B_f$, the rate of confirmation will be $C'=N_1 \cdot B_f$ Hz. Thus, the rate of confirmations has complexity:

$$O(C') = O(N_1 \cdot B_f) = O(N_1) = O(c).$$

Let confirmation time be the duration breakpoint beyond which enough confirmations have occurred to consider a transaction safe. This is equivalent to the rule of thumb mentioned earlier. For a traditional blockchain, as mentioned, this is the product of some constant and the expected duration between blocks: $B_f^{-1}$. For a simplex, though, the expected duration is $C'^{-1}=1/N_1 \cdot B_f$. Thus, as the simplex grows—as $N_1$ increases—the entire network's rate of confirmations also increases, and thus confirmation time approaches 0.

A 200-simplex with $B_f=1/15$ has a confirmation rate of $C'=40/3=13.3$ Hz. An 800-simplex with $B_f=1/60$ has the same confirmation rate. A 1400-simplex with $B_f=1/15$ has $C'=93$ Hz. This is about 46.5× faster than EOS/Solana, about 1116× faster than Eth2, about 1400× faster than Ethereum, and about 55,800× faster than Bitcoin.

PoR incents miners to publish blocks as soon as possible so that those blocks begin gaining reflections. If a miner does not publish a block immediately, then the reflections in that block become out-of-date very quickly as there are new, additional headers to reflect arriving constantly. Additionally, any competing block (published immediately by an honest miner) will begin acquiring reflections earlier, and contains more valuable reflected headers (incenting other miners to subsequently reflect it). So the published block has two distinct advantages over the withheld block. This mitigates the selfish mining attack.

DoS and DAGs

Up to this point, simplex-chains have been treated like traditional blockchains, where each block has only one parent. Since the vast majority of a simplex-chain's security is provided by other simplex-chains (and only a small proportion comes from that chain's foundational consensus method), are attacks like an empty-block Denial of Service (DoS) possible? If a simplex-chain were to use PoW, then it might be (relatively) trivial for an attacker to perform such an attack. This is because—in traditional blockchains—controlling more than 50% of the blocks produced provides exclusive control over which candidate child blocks win (i.e., are accepted into the canonical chain). Is there a way that we can mitigate this risk? If blocks were permitted more than a single parent, can this exclusivity be denied?

Block-DAG Lineage

The idea that blocks in a chain can have multiple parents—i.e., the chain forms a Directed Acyclic Graph (DAG) that is not also a tree dates back to the publication of GHOST by Sompolinsky and Zohar (Secure High-Rate Transaction Processing in Bitcoin (Sompolinsky, Zohar; 2013)). However, GHOST disallows multiple canonical parents, and a chain using GHOST defines its canonical history—the main chain—via the chain formed exclusively from the first parent of each block. A block's other, non-canonical parents are linked to only for the purpose of contributing to the total chain-weight. In the years after GHOST was published, a number of DAG-based blockchain designs were developed that facilitated merging histories from multiple parent blocks.

In late-2015 several new, alternative methods were also published, however these are not generalisations of Nakamoto consensus. Namely: Lerner's DagCoin, and IOTA's Tangle. Since then, multiple other models have been proposed, and some built.

For the purposes of this paper, we are concerned with the method detailed in Inclusive Block Chain Protocols.

Basic Structure

There are decisive advantages to using DAGs (instead of trees) as the fundamental structure of a chain. Namely, multiple histories (both compatible and incompatible) can be merged into a single, consistent history-a feature which eliminates stale blocks and thwarts attacks like an empty-block DoS. UT's simplex-chains must be block-DAGs to remain functional and avoid such DoS attacks.

Often the motivation for using a block-DAG instead of a block-tree is to increase the block frequency. Since block-DAGs can reference multiple previous blocks, the stale-rate can approach (or reach) 0. Increasing the block frequency is counter-productive in UT, though, since UT is sensitive to the size and number of headers that are produced. In UT, the purpose of using block-DAGs is to thwart certain attacks, not to increase the block frequency. The intention is for UT simplex-chains to use fairly typical block frequencies (e.g., 15 s)—possibly decreasing those frequencies over time to increase capacity. Slower block frequencies also decrease incidence of multiple parents (each parent typically increases the header size by 32 bytes). Some basic block-dag segments are shown in FIG. 22.

The essence of DAG-based consensus is to prioritize execution of blocks and transactions based on the security contribution (i.e., weight) of each parent block (and that parent's ancestry). Based on a most recent common direct ancestor, we can decide which parent's history has priority execution. Prioritized blocks are positioned earlier in the final ordering.

In DAG (or DAG-like) chains, direct ancestors are sometimes called the pivot chain or main chain. Provided that parent blocks are sorted by cumulative work, the chain of direct ancestors between a given block and the genesis block must be the single heaviest path between the two. (This is the case for UT.)

Let's limit DAG-chain blocks to two parents. If the best block has two parents, then each parent will have a subgraph of blocks between itself and the most recent common direct ancestor of the two parents. The subgraph which takes priority is that of the prioritized parent's ancestry. If that subgraph is a chain, then the ordering and execution of blocks is trivial. If it is not, then there must be another subgraph within that subgraph, and this algorithm is applied recursively. After the prioritized subgraph is processed, the remaining blocks (those that are only ancestors of the remaining parent block) are ordered and applied-invoking recursion where necessary. Finally, the best block is applied. In this way, all blocks are executed after their ancestors, and there is a clear and total ordering that trivially converges.

In the case that more than two parent blocks are permitted, there is a trivial generalization of the above. That is: replace all but the last (worst) parent with a virtual parent block that links back to all remaining actual parent blocks (but contributes zero block-weight itself). Replacing the best parents (rather than the worst parents) with a virtual block means that the fork rule works automatically. This can be repeated to allow for arbitrarily many parents.

FIG. 23 is an example of this algorithm for a moderately complex chain-segment ($B_i \ldots B_{i+3}$ which is 7 blocks total), and each step is enumerated and explained.

We should expect that conflicting transactions (which might otherwise be attempted double-spends) arise during this process. Ancestors of one parent may not be ancestors of another parent. The exact protocol for handling conflicts is up to the implementation, but a trivial method is that blocks commit to (via hash-pointers) conflicting transactions. If a miner produces an invalid block (which is invalid only because it breaks this rule), then other miners can flag it as a conflicting block via a similar mechanism.

Further reading: Inclusive Block Chain Protocols (Lewenberg, Sompolinsky, Zohar; 2015).

Preventing DoS Attacks

Consider the situation where an attacker is attempting to deny service via the production of empty blocks, and that the attacker can create blocks faster than the honest network. Such a situation is illustrated in FIG. 24. Since the goal of the attack is to prevent transactions from occurring, the attacker must produce empty blocks.

The attacker could also fill the blocks with spam transactions. That's more work for the attacker, but also more work for the honest network (calculating and storing that state, maybe indefinitely). It's preferable that the attacker has minimal transactions in their blocks. It's tempting to think of ideas like: since the attacker's blocks are empty, we can let honest nodes make larger blocks via some kind of weighted average block size calculation plus some flexibility in the size of blocks produced. The problem with this is that it incents the attacker to fill their blocks with spam transactions, which is counterproductive.

The attacker should still be reflecting other simplex-chains so as to maximize the total weight of the attacker's chain-segment. Given this, the attacker's blocks will contain reflected simplex-chain headers but no transactions.

Furthermore, if the attacker links back to any honest blocks then the honest blocks' histories will be merged with the canonical history; thus the attack would fail. The attacker's only available strategy is to produce a single chain of empty blocks.

How does such an attack fair? The challenge of such a DoS attack is to prevent honest miners from extending the attacker's chain-segment. For traditional (non-DAG) chains—where each non-genesis block has exactly one parent—this is accomplished as soon as the attacker is able to reliably produce a heavier chain-segment than the honest network for a given period. (Typically, this means the attacker produces blocks more frequently.)

However, if blocks are allowed to have more than one parent then there is no point where an attacker can maintain a DoS attack indefinitely. Instead, they can only delay the execution of some transactions for a short period of time. Particularly, if an attacker can produce $A_{blocks}>1$ for every 1 block produced by the honest network, then the attack can delay transactions for up to $(A_{blocks}{}^2-1)B_f^{-1}$ seconds, where Bris the frequency of block production (in Hz). After this (approximate) point, the weight of the honest chain-segment, which includes the attacker's chain-segment, is always greatest.

If an attacker performs a repeating cycle of these attacks, then they may be able to decrease the effective capacity of the chain by a factor of $A_{blocks}$. The opportunity cost of this attack, for the attacker, is at least as much as the lost transaction fees.

All that is okay so far, but this thought experiment is flawed. It is smoothed out compared to what we'd expect in reality—the discrete and probabilistic natures of block production and reflections are ignored. In FIG. 24, those're explicitly excluded. What happens if we include the effect of other simplex-chains, though?

Consider an attacker producing 2 blocks for every 1 honest block. What happens most of the time? Well the attacker's blocks get reflected first, so those blocks have an appreciable advantage over the honest blocks. The honest blocks will get reflected, too, but most of the time the attacker's blocks will get the advantage from earlier reflections. Most of the time. Occasionally, when an honest block is a bit lucky, an honest block will beat the attacker's next block—gaining reflections earlier. At that point, the attacker has lost—they need to outpace the difference in the number of reflections between the honest block and attacking blocks. So, unlike a normal double-spend (where the attacker wins if they ever get ahead), now the honest network wins (ends the DoS) if it ever gets ahead of the attacker—after that point, there's no viable strategy for the attacker besides to build on the honest blocks. The asymmetry has flipped.

There's more that can be done here, too, like honest users (not necessarily miners) creating transactions (with large fees) that depend on certain history (i.e., that some honest block is in the history of the chain). That will attract miners from other chains due to unrealized RoI. The attacker could include that transaction, but then they need to voluntarily end the DoS themselves. If you're worried about that, because it seems like miners might empty-block DoS simplex-chains, consider: when in equilibrium, that situation is essentially the same as an efficient market (for transaction execution).

Is there a reasonable strategy whereby the honest network can temporarily increase the number of miners? If there were, it'd be possible to temporarily limit the attacker to <50% of mining power, ending the DoS quickly.

Lowering Block Production Variance

Is it possible to dramatically lower the variance of block production in PoW blockchains without altering incentive structures, compromising security, or changing the probability of generating a valid block?

Yes. The method relies on the structure of the network, rather than the consensus protocol itself. Particularly, the network must be structured such that miners' choices result in decreased block production variance—an emergent phenomenon. It's important that it's emergent and not synthetic (e.g., by increasing the block reward with time-since-last-block) because we don't want people to game the system. It's better to have a simple system with emergent properties than a complex system with those properties "designed in".

Say you have a network with 10 chains: $C_0$, $C_1$, $C_2$, . . . , $C_9$. If the networks are separate, then you have 10 groups of miners: $M_0$, $M_1$, $M_2$, . . . , $M_9$. They have to choose one chain to mine on, so the distribution of miners is expected to be approximately the distribution of normalized block rewards+tx fees. The proportions of block rewards between $C_i$ & $C_j$ don't really matter, we expect the mining groups $M_i$ & $M_j$ will just sort themselves out due to market forces. For simplicity, though, this example assumes that mining rewards and the distribution of miners is an even 10% across the board.

If the network has spare capacity (i.e., transactions are mostly cleared out with each block; the mempool for each chain is ~empty) then we have a situation like this:

Set t=0 to be immediately after a block is published on a chain. Then, as t progresses, transactions with fees should build up in the mempool, so $TxFees \propto t$. The reward for mining a block is r+TxFees for some block reward, r. If $TxFees \propto t$ then $r+TxFees \propto K+t$ for some constant K. The potential reward-over-time for a miner (t vs r+TxFees) looks like a sawtooth function with a y-axis offset. It builds as more transactions pile up, and drops back to the baseline reward after a block.

If the miners $M_0$, . . . , $M_9$ are capable of working on one of any $\{C_0, \ldots, C_9\}$ (and they have identical ROI profiles to the other miners), then they're incented to work on the chain with the most transactions in the mempool. That means: miners should, roughly, work the chain that has gone the longest without a block. What should we expect based on those incentives? Miners should work on each chain only in the final moments of the block production cycle. If block times were set to 60 s, then they'd start mining at around the 54 s mark because that's how they maximize their ROI. Why wouldn't they just keep mining on the same chain? Because in the time that they focused on one chain, another one passed that >54 s high-ROI threshold and thus has the best ROI potential per hash done. We should thus expect that this configuration of chains actually synchronizes miners, resulting in block production that is somewhat regular and lower in variance.

Miner Resonance: The effect whereby block production variance is reduced when miners can (and do) collectively change which chain they are currently mining faster than blocks are produced for those chains, due to changes in network-wide incentivization.

One reason that we can predict that transactions will build up in this fashion (with those fees and in a predictable way) is that most of the transactions that are included in simplex blocks will be dapp-chain header-transactions. The average hash-rate on each simplex-chain, as described above, is always the same regardless of which of the two miner strategies are used. However, the variance of block production on each of these chains won't be that of a chain with 60 s block times, it'll be closer to that of a chain with 6 s block times.

Simplex Security and the Confirmation Equivalence Conjecture

Simplex Security

Simplexes are secure if attacking a single simplex-chain is as difficult as attacking the whole simplex (the network).

Say the attacker controls q proportion of the network's work-generation capacity (e.g., hash-rate for PoW chains), and honest nodes control p proportion, such that p+q=1. An attacker with q<p can attempt doublespends, and should succeed some of the time, but never with certainty. The attacker should only be able to control the network's history if q>p.

Successfully attacking a single blockchain requires an attacker to publish an alternate chain-segment that the fork rule considers heavier than the corresponding public chain-segment. Those two segments will have a common ancestor, so the weight of the attacker's segment must be greater than the weight of the public chain-segment (both start at that common ancestor). Simplex-chains evaluate block-weight as the sum of work done on that block, plus work done on reflecting blocks. So effecting a double-spend on one simplex-chain requires generating a chain-segment with more total block-weight (including reflections) than the public chain-segment.

It is not viable for the attacker to mine the attacking chain-segment in public, so they must mine it in private. Blocks mined in private will not gain reflections from honest miners on other simplex-chains, so any reflections contributing to the double-spend must be created by the attacker. The attacker's reflecting blocks (which reflect the attacking chain-segment) on other simplex-chains can be public, but the attacker's task is simpler and not detectable if the attacker mines reflecting blocks in private. There is no viable way for the attacker to prevent honest miners from reflecting the honest chain-segment, including new blocks that extend it, nor to prevent the honest chain-segment from reflecting blocks from other simplex-chains. The honest chain-segment, on the targeted simplex-chain, will not be reflected by the attacker (since that would be self-defeating). Similarly, the attacker's chain-segment will not be reflected by the honest network, since it's being mined in private.

Let r be the network-wide rate-of-work (hash-rate). Over some attack duration d, on average we expect the attacker's chain-segment to weigh qrd and the honest chain-segment to weigh prd. Thus, for the attacker's chain-segment to reliably win, it must be that $qrd>prd \Rightarrow q>p$.

Confirmation Equivalence Conjecture (CEC): The conjecture that, when using POR and appropriately converting work, confirmations of reflecting chains can be treated as equivalent to local confirmations of the same weight. The Confirmation Equivalence Conjecture is why POR works. If it were false, then PoR could not work, and neither would simplexes. Additionally, this is the root of UT's O(c) confirmation rate—the conjecture implies that confirmation rate is proportional to the number of mutually reflecting chains.

Consider a traditional PoW blockchain (e.g., Bitcoin, Eth1, etc). It's well known that the risk of a double-spend against a particular block is related to the number of confirmations that block has. Additionally, if reflecting chains maintain projections as headers-only chains (i.e., construct a main chain via SPV rules), then it should be much harder for an attacker to succeed if reflections are mined in public. However, this is not a linear relationship; rather, it's similar to exponential decay. After the first few confirmations, each additional confirmation reduces the risk of a double-spend by approximately the same factor. So security takes time, because confirmations take time.

Now, consider a simplex: the equivalence conjecture says that it doesn't matter whether confirmations come from the local chain, or if they come from a reflecting chain. So, a simplex-chain in a 2-chain simplex (wherein each simplex-chain has $C'=2B_f$) should, after C local confirmations, be as secure as a standalone blockchain with 2C confirmations. This is true for larger simplexes, too: doubling the size of a simplex means we can halve the number of local confirmations that we wait for—the chance of a doublespend succeeding should be approximately the same. More generally, a simplex-chain in an N-chain simplex will, after C local confirmations, be as secure as a standalone blockchain after CN confirmations. As blockchain architects, if the CEC is true, then UT allows us to maintain security by trading waiting time for more simplex-chains.

Generalizing Double-Spends

With a traditional blockchain, the network has no "memory" of work (mining) that has been done which did not result in a valid block (i.e., the main chain does not record or account for that work). Specifically, the network gains no knowledge of how much work has been done between blocks. This is almost self-evident: each block is the sole way that work can be added to the chain. Naturally, there is no smaller unit of contributed work than an individual block-so there's no "memory". When an attacker publishes a heavier chain-segment which causes a reorganization, it is immediately in the interests of miners to begin building on the attacker's best block. A heavier chain-segment is decisively better in all cases. That may seem obvious, but it's actually a specific case that only works for traditional blockchains. If there were some "memory", it might be worth miners continuing mining their existing block, instead of reorganizing and building on the attacker's best block.

What kind of "memory" could there be? Are Proofs of Reflection a "memory"? yes.

Let the total chain-weight of the attacker's best block be called WA, and the total chain-weight of the honest network's best block be called WH. Consider a miner of a simplex-chain (chain L) who is working on a draft block during an active attack (though, of course, the miner does not know about the attack). Specifically, let's consider just before the attacker publishes their chain-segment. In the memory pool of that miner, there will be PoRs, and those PoRs are only valid for the honest chain-segment (most likely they are for the best known honest block, but don't need to be). Each L block, in and of itself, only adds w weight to the L chain. The memory pool is where unconfirmed transactions (and other things) are stored before they are included in a block. Each node has their own memory pool. A miner typically decides a block's contents by choosing the combination of transactions from their memory pool that results in the largest reward (i.e., transactions with the largest fees).

However, if that draft block contains n pending PoRs, and each POR provides w weight on average, then a valid block (created from that draft) will contribute, via PoRs, about nw weight to the honest chain-segment. What happens when the attacker's chain-segment is published (along with their reflecting chain-segments for other simplex-chains)? The miner has a choice: reorganize to the attacker's chain-segment and mine on top of a chain with weight WA, or continue mining on the honest chain-segment that weighs WH+nw. That extra term, nw, is the "memory", and it makes all the difference. It is only safe for the attacker to publish their chain-segment after WA>WH+nw—only then is it decisively better than the honest chain-segment. If, however, the attacker publishes their chain-segment when WH<WA<WH+nw: the best chain-segment for honest miners to mine is still the honest chain-segment, not the attacker's.

Miners don't actually have to change their behavior at all: their choice is the same, whether they are mining a simplex-chain or a traditional chain. That choice is: of all possible blocks to mine, which results in the greatest reward? If they build on the honest chain-segment, does their resulting block have more total chain-weight than if they were to build on the attacker's chain-segment?

There are some subtleties to consider if chains are DAGs or use GHOST: both chain-segments can be included as ancestors, but which should take priority? If the weight of PoRs is not taken into account (or applied after evaluating the order of parents), then the attacker's chain-segment takes priority when WA>WH. This rule conflicts with what we discussed above, so it must be that parents are ordered based on their chain-weights including any PoRs in that block—the honest chain-segment should take priority when WA<WH+nw. Also, note that this is why the weight of PoRs is attributed to the reflected block (usually a parent) rather than the block that contains the PoRs. In essence, the inclusion of this "memory" requires that the fork rule take context into account-particularly the context of the descendant block. This is not a paradox because the fork rule is only used to choose the priority chain in the context of some descendant block (even if that block is an invalid draft).

Testing the Confirmation Equivalence Conjecture

The hypothesis is that: double-spends against an individual simplex-chain in an N-chain simplex after C local confirmations are as hard as doublespends against a traditional blockchain after CN confirmations.

First, define P(q; c) to be the function that returns the probability of an attempted doublespend succeeding on a traditional blockchain according to Rosenfeld's analytical solution (Analysis of hash rate-based double-spending (Rosenfeld; 2012)).

$$\forall c \in \{1, 2, \ldots, N\}: P(q; c) = \begin{cases} 1 - \sum_{m=0}^{c} \binom{m+c-1}{m} (p^c q^m - p^m q^c), & \text{if } q < p \\ 1, & \text{otherwise} \end{cases} \tag{26}$$

Next, we will declare a new function, P', and assume that it exists and is measurable. Particularly: P'(q; c=C; $N_1$=N) is the probability of a double-spend attack succeeding against a simplex with N simplex-chains after C confirmations, given an attacker with q proportion of the network hash-rate. We do not know the definition of this function, but we can measure its output. As a base case, it is taken that:

$$P(q; c) \equiv P'(q; c; N1 = 1) \tag{27}$$

A simplex of 1 chain (the 0-simplex) is a traditional blockchain. So we can take Bitcoin for example: the probability of an attack succeeding after 6 confirmations is given by $P(q; c=6) \approx P'(q; c=6; N_1=1)$. One prediction of the hypothesis is that:

$$P'(q; c = CN; N_1 = 1) \approx P'(q; c = C; N_1 = N) \quad (28)$$

In fact, we can take this further. The relationship that exists is continuous—it must be if confirmations are equivalent. This is the extended CEC:

$$\forall a \in \{1, \ldots, N\}: P'\left(q; c = \frac{C\,N}{a}; N_1 = a\right) \text{ is approximately constant} \quad (29)$$
$$\Rightarrow P'\left(q; c = \frac{C\,N}{a}; N_1 = a\right) \approx P(q; c = CN)$$

We don't need to know a closed form of $P'(q, c, N_1)$ to test the CEC: all cases that we can measure are equivalent to some other, traditional case, and we can convert between them. This is the basis of the method used to test this hypothesis. Rosenfeld's solution requires an integer value for c. This is due to his solution assuming a static difficulty and the longest-chain fork rule; the construction is consistent with Bitcoin (provided the difficulty doesn't adjust), but not with chains that recalculate difficulty every block. Additionally, when using work instead of height as the measure of an attack's success, fractional values of c have real meaning-especially with a reactive DAA and N1=1. Both factors turn out to be unproblematic for us, though. Rosenfeld's solution has reach beyond those assumptions and observed results converge with it.

If Equation 29 is correct, it indicates that there exists a generalization of traditional blockchains (which have N1=1); particularly, that there is another dimension (N1; the size of the simplex) which is geometrically related to the first dimension, c. This experiment does not test the conversion of chain-work—the same hashing algorithm is used for each simplex-chain and no conversion of work takes place.

In simulations of the above described blockchain networks, the following was found: Sharing PoW security between blockchains without merged mining is possible. POR works as claimed when implemented correctly. The Confirmation Equivalence Conjecture is, generally and in principle, true. Simplexes are secure against a minority attacker and are thus O(n) secure (assuming no relevant bottlenecks).

Scaling Complexity Analysis of Ultra Terminum

UT has two primary methods of scaling: horizontally via mutual POR (simplex-chains), and vertically via one-way POR (dapp-chains). Horizontal scaling via POR is novel. Dapp-chains are similar to many of the sharding and pseudo-sharding ideas proposed for other networks (Polkadot, Eth2, etc), though there are fewer restrictions on dapp-chains in UT compared to other designs. Additionally, dapp-chains in UT are secured by the entire simplex. In the case of PoS dapp-chains, this provides additional security compared to 'naked' PoS chains. Hosting dapp-chains on many simplex-chains also provides greater system-wide maximum capacity than a network built upon a single base-chain.

A common method of sharding is to nest blockchains. For example, Ethereum 2 has The Beacon Chain—its root-chain (the single base-chain of a network). This type of configuration, where a base-chain facilitates child-chains, is referred to as nesting in this section and in the context of UT's architecture and complexity. Base-chains are at the first level of nesting. The shards of Ethereum 2 are a level of nesting above the Beacon Chain, i.e., nesting level 2. UT's dapp-chains are also at nesting level 2. A Base-chain is a chain that has no parent-chains; i.e., is at the base nesting level.

Sometimes (but not always) people use terms like layer 2 to describe this sort of nesting, though such usage of layer 2 is ambiguous and potentially misleading. It easily confuses nesting with off-chain scaling methods (such as payment channels, rollups, or ephemeral 'child' blockchains, e.g., Plasma), and it potentially misleads readers about the security properties of nested blockchains. Nested blockchains can faithfully inherit the security properties of their parent-chains, which is not the case for layer 2 solutions prior to finalization.

Furthermore, terms like layer x cannot accurately describe UT's design. Consider a PoS dapp-chain on UT. Would that dapp-chain be layer 1 or layer 2? It would be inaccurate to call it layer 2 whilst directly comparable chains (like Ethereum 2, Polkadot, or Cardano) are called layer 1. Such PoS UT dapp-chains have all the security qualities of an equivalent stand-alone PoS chains, and more. If they were called layer 1 chains, then what is the simplex-layer 0? It is clear that the common idea behind layer 1/2 scaling does not have sufficient capacity to accurately describe UT's simplex- and dapp-chains; it is inadequate.

Analysis Methodology

The following derivations focus on throughput of particular blockchain designs and scaling configurations. These derivations will let us evaluate the complexity of each design.

Raw throughput of a network, $T_i$, is measured in bytes/sec (B/s) for some level of nesting, i. $T_i$ directly corresponds to a design's maximum transactions per second (TPSi), where Txavg is the average size of a transaction, via: TPSi=$T_i$/Txavg.

The raw B/s throughput of a chain at the ith level of nesting is denoted by $k_i$. Note that $T_i$ is a calculated value, but $k_i$ is a parameter that may be chosen. An increase to $k_i$ is effectively an increase in maximum block size. We will also derive relationships between the maximum number of chains at a level of nesting, $N_1$, and the maximum network throughput at that level of nesting, $T_i$. For most existing blockchain designs, N1=1.

With regards to simplexes, we are particularly concerned with the complexity of a maximal simplex: i.e., the simplex with the highest TPS possible. Maximal Simplex: A simplex with the maximum TPS under given O(c) constraints. Additionally, O(ki) is defined as O(ki)=O(c). This is reasonable provided there are no O(c) bottlenecks, e.g., network bandwidth, CPU throughput, memory requirements, etc.

Complexity of O(c) Chain

Example: Bitcoin: The raw throughput, k1, can be calculated for existing chains (e.g., Bitcoin) via the product of the maximum block size, Bmax (in bytes), and the block production frequency, Bf (in hertz, or s−1): k1=Bmax. Bf. The throughput, T1, of an O(c) chain is equivalent to its raw throughput: T1=k1. The complexity order of the network is given by O(T1)=O(k1)=O(c) as expected. Care should be taken to account for protocol extensions like Segregated Witness that effectively reduce the size of transactions (in SegWit's case, by ~¼). For Bitcoin-given k1=1700 B/s, and transaction size Txavg=500·¾ B—the maximum TPS is given by: TPSBitcoin≈1700/Txavg=4.5. This is what we expect based on the measured real-world performance of Bitcoin.

Optimistic Complexity of $O(c^2)$ Chains

Examples: Ethereum 2, Polkadot. Suppose the root-chain has a throughput of k1 B/s and it can support up to N2 nested chains. Those nested chains have headers of Dh bytes that are produced at a frequency of Df (s−1). If all headers of nested chains are recorded in the host chain, then each nested chain consumes at least $D_f \cdot D_h$ B/s of the root-chain's capacity. Thus, $N_2$ is given by:

$$N_2 = k_1 / (D_f D_h) \tag{30}$$

For blockchains of this design: $N_1=1$. If each nested chain has a throughput capacity of $k_2$ B/s, then:

$$T_2 = \frac{k_1 \cdot k_2}{D_f D_h} \approx \frac{k^2}{D_f D_h} \tag{31}$$

Thus $O(T_2)=O(c^2)$ as expected.

Effective Header Size

It's typical, though, that the headers of nested chains, alone, are not sufficient: additional data is required. When such data is required to be recorded on-chain (i.e., it cannot be deterministically regenerated), then the effective header size is the size of the raw header, plus the size of any auxiliary data. For example, in an Ethereum 2 beacon block, each shard has a header size of 280 B, but there is additional overhead. A reasonable lower-bound is that each header has an effective minimum header size of 312 B. In the case of Polkadot, it is measurable that a typical minimum of 819 B is used in the paraInclusion.candidateBacked extrinsic (i.e., the transaction type that records parachain headers). So, a lower-bound on the effective header size of a parachain is 819 B (this does not include bitfields). In those situations, with regards to these capacity derivations, one can use the effective header size as a replacement for the raw header size.

Complexity of UT1

There is no single root-chain for a collection of mutually reflecting blockchains (i.e., a simplex), so $N_1 \neq 1$. What is $N_1$ then? In a simplex, each chain has $k_1$ B/s capacity, but this is split between reflections and transactions. At this foundational level (where there is no nesting yet), headers are $B_h$ bytes with a frequency of $B_f$ Hz. There are $N_1$ simplex-chains. We will generally not consider the impact of explicitly including PoRs along with block headers (i.e., the +PoRs UT variants). The methods we use here are easily generalized to account for those variants.

Reflecting a single simplex-chain requires $B_f \cdot B_h$ B/s of capacity, and each simplex-chain must reflect $N_1-1 \approx N_1$ other simplex-chains. This means that a simplex-chain must reserve $N_1 B/B_h$ B/s of its capacity for reflections, denoted by $k_{1,B}=N_1 \cdot B_f \cdot B_h$. Additionally, simplex-chains must reserve some capacity for transactions, $k_{1,tx}$. Since simplex-chains must split their capacity between reflections and transactions, set: $k_1=k_{1,tx}+k_{1,B}$ and $k_{1,tx}=k_1-k_{1,B}$.

$$\text{Given } k_{1,B} = N_1 \cdot B_f \cdot B_h: \tag{33}$$

$$k_{1,tx} = k_1 - N_1 \cdot B_f \cdot B_h$$

Since each simplex-chain reserves $K_{1,tx}$ B/s for transactions, the total throughput reserved for transactions will be $N_1 \cdot K_{1,tx}$. Thus:

$$T_1 = N_1 \cdot k_{1,tx} \tag{34}$$

$$= N_1(k_1 - N_1 \cdot B_f \cdot B_h) N_1 \cdot k_1 - N_1^2 \cdot B_f \cdot B_h \tag{35}$$

The optimal number of simplex-chains will maximize throughput. We can find that maxima via:

$$\frac{dT_1}{dN_1} = k_1 - 2 \cdot N_1 \cdot B_f \cdot B_h$$

At $$\frac{dT_1}{dN_1} = 0,$$

we find $$N_1 = \frac{k_1}{2 \cdot B_f \cdot B_h}.$$

Thus $$O(T_1) = O(k_1^2) = O(c^2).$$

From Equation 35 and substituting $N_1$ from above:

$$T_1 = \frac{k_1^2}{4 B_f B_h}.$$

Thus $O(T_1)=O(k_1^2)=O(c^2)$.

What are $k_{1,B}$ and $k_{1,tx}$ in terms of $k_1$? From above:

$$N_1 \cdot k_{1,tx} = \frac{k_1^2}{4 \cdot B_f \cdot B_h}.$$

Substituting $N_1$ from above gives:

$$k_{1,tx} = \frac{k_1}{2}.$$

Thus, from the definition of $k_1$ earlier: $k_{1,b}=k_1/2$

Dapp-Chains and the Complexity of UT2 and UT3

If a system supports nested chains, then we can say that for some throughput, $T_i$, at nesting level i, the (i+1)th nesting level can support Nin nested chains via $$N_{i+1} = \frac{T_i}{D_f \cdot D_h}.$$

Combining these yields:

$$N_{i+1} = \frac{T_{i+1}}{k_{i+1}} \tag{40}$$

UT with Dapp-Chains ($UT_2$)

For $UT_2$, $T_2$ can be calculated by combining the above with prior steps to find that $$T_2 = \frac{k_1^2 \cdot k_2}{4 \cdot B_f \cdot B_h \cdot D_f \cdot D_h}.$$

Thus $O(T_2)=O(c^3)$.

Complexity of Cross-Chain SPV Proofs & Proofs of Reflection

Each chain—at full capacity—operates with order O(c) by definition. Thus its state has order O(c) also. The size of SPV proofs scale logarithmically with the set you're proving membership of, e.g., the number of transactions, or size of the chain's state, etc. Thus, SPV proofs scale with order O(log 2 c).

For a given $O(c^j)$; $j \in \{2, 3, 4\}$ configuration of UT (i.e., UT1, UT2, UT3), a chain can process SPV proofs of state on another chain. For j=4, the furthest that a transaction can occur from its host simplex-chain is in the 3rd level of nesting (i.e., a dapp-dapp-chain). It would require j−1 SPV proofs to "ascend" from the host simplex-chain to a dapp-dapp-chain. However, given that full nodes of a dapp-dapp-chain are required to be full nodes of both the host dapp-chain and the host simplex-chain, transactions in that dapp-dapp-chain do not need to provide SPV proofs of state in either of those host chains—full nodes already have those details. That is: transactions which "descend" the levels of nesting can do so with O(1) cost. SPV proofs are only required when transactions "ascend" the levels of nesting to other simplex-, dapp-, or dapp-dapp-chains.

Thus, the maximum number of SPV proofs required to prove state anywhere in a UT simplex is j. Since j is constant, cross-chain SPV proofs therefore have order:

$$O(j \cdot \log_2 c) = O(\log_2 c) \tag{43}$$

Proofs of Reflection

A simplex-chain reflects $N_1 - 1 \approx N_1$ other simplex-chains. A Merkle tree of reflected headers has order $O(N_1)=O(k_1)=O(c)$ and a corresponding proof size of order $O(\log_2 N_1)=O(\log_2 k_1)=O(\log_2 c)$. Since those other simplex-chains also have $\sim N_1$ reflections, proving reflection in those other $\sim N_1$ simplex-chains requires $\sim N_1$ Merkle branches. Thus, the full set of reflection proofs, per simplex-chain, is $O(N_1 \cdot \log_2 N_1)=O(c \cdot \log_2 c)$.

$UT_x$: Tiling Simplexes

In a normal simplex, all simplex-chains mutually reflect all other simplex-chains. This method (UT1) is useful, but, without dapp-chains, it is limited to $O(c^2)$ scalability. Can we do better than $O(c^2)$ scalability, though? Is O(n) scalability possible?

When analyzing simplexes, we saw that each chain in a simplex reserves ½ of its capacity for reflections (with other simplex-chains) and ½ of its capacity for transactions and dapp-chain headers. We could, however, use some of this capacity for reflections for a slightly different purpose. If we were to divide the capacity for reflections into multiple partitions, then we would have a smaller simplex, but could also use this new excess capacity for something else. Let's consider a simplex where ¾ of its capacity for reflections is reserved as excess capacity. Here, internal reflections are the mutual reflections between all simplex-chains that are part of the same simplex.

Figure 25:
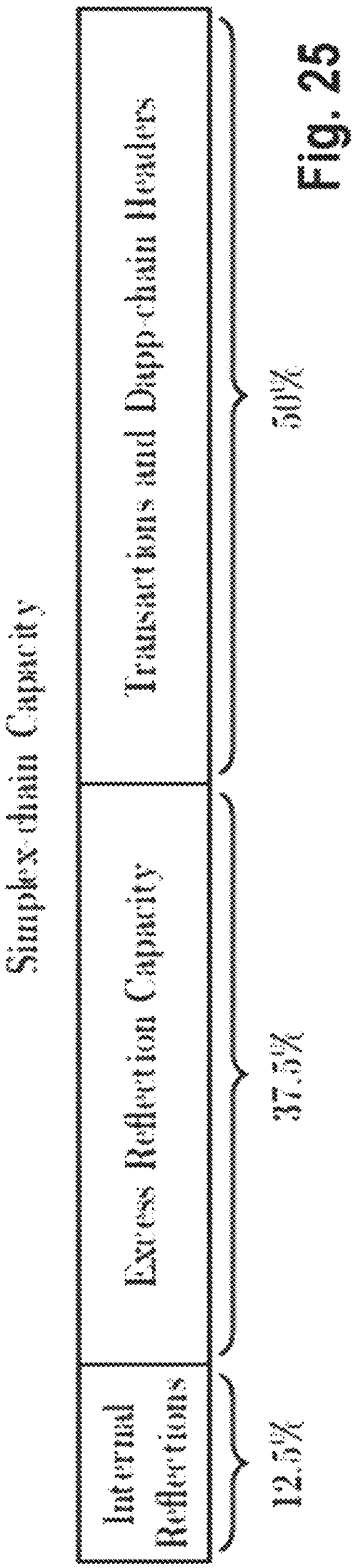
FIG. 25 illustrates an example simplex chain's capacity division.

FIG. 25 illustrates an example simplex chain capacity division.

What can we use that excess capacity for? To answer this, we need to introduce a new type of simplex: a simplex tile. These are smaller simplexes that, unlike maximal simplexes, explicitly reserve some reflection capacity for the purpose of mutually reflecting simplex-chains in other simplex tiles. Reflections with simplex-chains in other tiles are called external reflections. A Simplex Tile is a simplex which partitions its capacity for mutual reflections such that each simplex-chain mutually reflects all other simplex-chains in that tile, and all other simplex-chains in neighboring (or adjacent) tiles.

Figure 26:
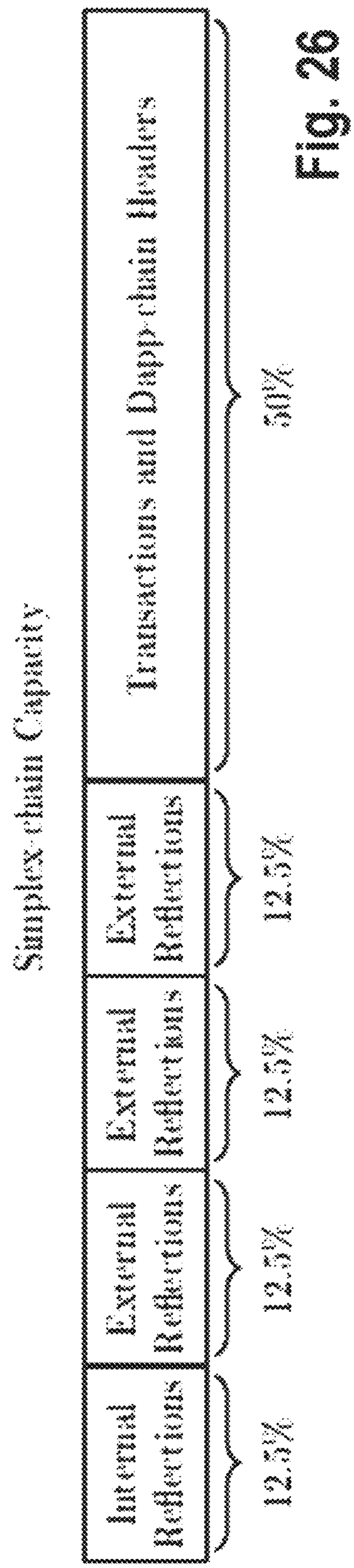
FIG. 26 illustrates replacement of the Excess Reflection Capacity in FIG. 25 with External Reflections of other simplex-chains in other simplex tiles.

We can now replace the Excess Reflection Capacity in our simplex-chain capacity diagram like that illustrated in FIG. 26. Simplex tiles will be the foundational unit from which we construct Simplex Tilings.

Simplex Tilings

We connect simplex tiles together, via mutual reflection, to create a simplex tiling. For the sake of brevity, when we say that a simplex tile reflects another tile (or that a tile is connected to another tile), we mean that all simplex-chains in the first tile mutually reflect all simplex-chains in the second tile. A simplex tiling is thus a graph of interconnected tiles. Connected tiles are neighbours and are adjacent to one another in the tiling. A Simplex Tiling is an interconnected graph of mutually reflecting simplex tiles.

Fig. Before we look at some complex (and useful) tilings, let's consider three examples that are some of the simplest tilings possible: FIG. 26 illustrates examples containing 2, 3, and 4 simplex tiles respectively.

Note: we are not yet concerned with the security properties of these examples—we need to build up to that first.

FIG. 27 illustrates Trivial simplex tilings—these are all equivalent to a single simplex as each simplex-chain reflects all other simplex-chains in the network. In those examples, notice that each simplex tile reflects each other tile. This means that each simplex-chain is mutually reflecting all other simplex-chains (in all other tiles), so each of these tilings is equivalent to a standalone simplex. These tilings aren't particularly useful to us in practice, though, because we don't have a way to increase network-wide capacity beyond $O(c^2)$.

If we want O(n) capacity, then we'll need to come up with a new pattern for how to connect tiles together and how to add new tiles. Specifically: the pattern must always have room for more simplex tiles, and each tile added must, on average, add more that 1 new spot for additional tiles.

Tile Valence

The valence (v) of a tile is the number of other tiles that it can connect to. In our example earlier, we split our simplex tile's capacity for reflections into 4 equal parts—each part was 12.5% of each simplex-chain's total capacity. Since 1 of those parts is reserved for internal reflections, and 3 parts are reserved for external reflections, that simplex tile has a valence of v=3. If, instead, we split our simplex tile's capacity for reflections into 5 equal parts, then each part would be 10% of each simplex-chain's total capacity, and the tile would have v=4.

We don't have to use a valence of 3—we can split up a tile's capacity for reflections any way that we like. Each tile could even have different valences, too, but this makes designing a tiling more complex. For the sake of simplicity, we will only consider tilings where each tile has the same capacity and the same valence. When we say that a tiling (rather than a tile) has a valence of v, we mean that each tile in the tiling has a valence of v.

If a tiling has a valence of v=0, then all capacity for reflections is reserved for internal reflections—so this is just a normal simplex. If a tiling has a valence of v=1, then the tiling is limited to 2 tiles at most—there is only one solution. We end up with a tiling that's equivalent to a normal simplex, though, since all simplex-chains must reflect all other simplex-chains. The complete tiling with v=1, which is the only possible tiling, is shown in FIG. 27 (*a*).

If a tiling has a valence of v=2, then there is a countably infinite number of solutions. The trivial solution (which has 3 tiles) is where each simplex tile is connected to all other simplex tiles—this is shown in FIG. 26*b*. We can create a tiling of v=2 with 4 tiles, too: A-B-C-D-A. This is part of a class of solutions: a loop. With v=2, we can construct a loop of arbitrary length. The last solution is a long chain of tiles that never loops back around; see FIG. 28. This is our first unbounded solution—it's a solution where we can always add more tiles. The problem with this solution is that, although it may have O(n) capacity, the distance between tiles is also O(n). This is not practical since O(n) SPV proofs would be needed to prove state on the far side of the tiling. (The class of solutions that are loops is impractical for the same reason).

FIG. 28: The only unbounded tiling at v=2. Although it is unbounded (we can always keep adding tiles), the distance between those tiles is proportional to the size of the network-so this isn't scalable.

Things start to get interesting when v>2. If a tiling has a valence of v≥3, then there are many possible patterns of solutions. We will focus on one particular class: the patterns of tiling that are also trees.

Tree-Tilings

The tree-tilings that we'll consider are straight forward to construct. First, we start with a root tile. Then, when we need more capacity, we create new tiles that are children of the root tile. Then, when each of these child-tiles is nearing maximum utilization, new children are created as children of that tile—they are grandchildren of the root tile. We can continue in this manner indefinitely.

How many children, at most, should we create under each tile? The root tile has capacity for v children, but each other tile only has capacity for v−1 children. We could allow the root tile to have up to v children—and it is possible to create a tree-tiling like this—however, we're not going to do that here. Instead, we'll limit the root tile to v−1 children to match all other tiles. This means that the tilings we'll consider will be n-ary trees—if v=3 then the tiling is a binary tree; if v=4 then it's a ternary tree; if v=5 then it's a quaternary tree, etc.

Binary tree-tilings of depths 1, 2, and 3 are shown in FIG. 29. Note that, although FIG. 29 constructs the tiling as a balanced tree, there's no requirement that a tree-tiling needs to be balanced. Let's use the term depth (d) to describe how far a tile is from the root tile. The root tile has d=0, children of the root tile have d=1, grandchildren of the root tile have d=2, etc.

Recursive Proof of Reflection

So far, we've defined the 'shape' of our tiling, but we don't know much about whether it is (or even can be) secure. Notice that the leaf tiles in FIG. 29*c* are 3 reflections away from the root tile. Eventually, we will need to answer at least these two questions: Can the chains in those leaf tiles be secured by the root tile? and How do we do this? Recursive POR provides the foundation that we need to answer those questions and analyze the security of our constructed tiling. Let us begin with the simplest case of recursive POR: 3 chains that do not form a simplex.

Simple Recursive POR: L↔M↔R

Say we have three chains: L, M, and R. They are doing mutual reflection like this: L↔M↔R. That is: L reflects M but not R; M reflects both L and R; and R reflects M but not L. With what we already know, it's clear that M is as secure as all three combined. However, that isn't the case for L and R. How can we make L and R as secure as M without having them mutually reflect one another? Is this even reasonable?

Let's consider chain L—what happens if L's local chain-work is, say, 3× that of chain M? The total chain-work that L takes into account is 4/3 of its local chain-work, so an attacker would need ⅔ worth of L's local chain-work to control L's history. This is more than 50% of L's local chain-work, but, depending on R, it's within reason that an attacker might achieve the required hash-rate.

Case 1: If R's local chain-work is large (say, 3× that of M), then M is almost twice as hard to attack as L. This is a problematic situation: it means that an attacker might be able to perform a double-spend against L even though they could not perform one against M. Therefore, this case would not be O(n) secure.

Case 2: However, if R's local chain-work is small (say, ⅓ that of M), then R is not particularly significant. Thus, M is not substantially harder to attack than L, and an attacker could attack both L and M simultaneously (optionally, R too). But, R is substantially easier to attack than either M or L. The total chain-work that R takes into account is only 4/13 that of the whole network. So, this case is also not O(n) secure, even though L is O(n) secure.

These two problem cases are what recursive POR solves.

Notice that in both cases, M is O(n) secure. Given this, chains L and R should be able to use the same work that chain M does to reach the same level of security. The first problem is that L and R cannot use the same WeightOf algorithm as before (although, M can). Particularly, L and R's WeightOf must count: not only their local chain-work and that contributed reflected M blocks, but also some additional weight based on reflections from other chains. Each M block might record the total chain-work that it adds to M (including PoRs), but L and R's new WeightOf can't use this value directly. Firstly, that value includes past local chain-work that reflected M (which includes both L and R blocks). But more importantly, we don't want to force L and R to verify every PoR that contributes to M, just the ones that matter. So how can L and R nodes know which work to count?

There is a trivial solution to this problem: require L and R nodes to download the headers of all relevant chains, verify relevant PoRs, and track the origin of those PoRs. Nodes must track the origin of work contributed via POR to avoid double-counting work. An easy example of this is: L nodes should not count M's PoRs where an L block is the reflecting block; that work is already directly included in L's local chain-work.

Chain L can only count work contributed by R after a multi-stage POR can be constructed. For example, let's consider the (rather orderly) chain-segments in FIG. 30.

FIG. 30: A diagram of chain-segments demonstrating the simplest case of recursive POR. Solid arrows indicate the usual child-parent relationship, and dotted arrows (←) indicate reflection.

We can see that $R_{k+2}$ implicitly reflects $L_{i+1}$ via $R_{k+2}$'s explicit reflection of $M_{i+1}$. We can use this implicit reflection because the network already depends on all the PoRs that are sufficient to prove it. $L_{i+2}$'s POR for $L_{i+1}$ will prove $L_{i+1} \leftarrow M_{j+1}$ (i.e., that $L_{i+1}$ was reflected by $M_{j+1}$). $M_{j+2}$'s POR (via R) for $M_{i+1}$ will prove $M_{j+1} \leftarrow R_{k+2}$. We combine these two for the full path by which $R_{k+2}$ implicitly reflects $L_{i+1}$: $L_{i+1} \leftarrow M_{i+1} \leftarrow R_{k+2}$. Similarly, we know that $L_{i+3}$ implicitly reflects $R_{k+2}$: $R_{k+2} \leftarrow M_{j+2} \leftarrow L_{i+3}$.

Thus, for $L_{i+3}$, we can construct a full recursive POR of $L_{i+1}$ via $R_{k+2}$ using the proofs for each link between them: $L_{i+1} \leftarrow M_{i+1} \leftarrow R_{k+2} \leftarrow M_{j+2} \leftarrow L_{i+3}$.

Since L nodes already know about all the M and R blocks (and the relevant PoRs), the full recursive POR does not need to be explicitly recorded. It is already known to all L nodes, since each part of the recursive POR is available in one of the L, M, or R chains (it is explicitly recorded if a +PoRs UT variant is used, and recalculated by the node otherwise). A PoR can only contribute to local blocks that are in the reflecting block's past. By inspection, we can see that the most recent R block (the reflecting block) in $L_{i+3}$'s past is $R_{k+2}$, and the most recent L block (the local block) in $R_{k+2}$'s past is $L_{i+1}$. Thus, we can see that our method for attributing reflected work-following the arrows-works for recursive PoR, too.

There is something important to point out here: latency. Notice that these 3 blocks (in chronological order) are required for this recursive POR to exist: $M_{i+1}$, $R_{k+2}$, and $M_{i+2}$. A non-recursive PoR only needs to wait for 1 reflecting block to be produced (after which the POR counts as draft reflected work). So, in this case, the expected delay will be 3 normal (assuming all chains have the same block periods). In general (if only one POR path between two given blocks will exist) this delay, measured in block periods, is equal to the length of the full POR (excluding L blocks), which equals 2x−1 the depth of recursion (x).

Recapping the first problem: L and R nodes need an expanded WeightOf function with access to the origin of implicitly reflected work, and knowledge of where that work has already been counted. Nodes can do this relatively efficiently, for all relevant chains, by downloading the headers and verifying the PoRs. This method does not require recursive PoRs to be explicitly recorded in full since the components of these PoRs are already available and have already been individually verified. Our existing rules about how to attribute the weight of PoRs (follow the arrows) still works.

Our solution to the first problem is promising, but we have used an implicit assumption: there is only one viable path for PoRs between L and R. What if there are multiple paths between L and R? This is the second problem.

Recursive POR with Multiple Paths

Say that we now have four chains: L, $M^1$, $M^2$, and R doing mutual POR as illustrated in FIG. 31. Both $M^1$ and $M^2$ are already O(n) secure. Assuming that L and R nodes download and verify all PoRs, how can L and R count each other's work? First, let's consider when L can definitely count all the work contributed by a R block, as illustrated in FIG. 32.

Figure 33:
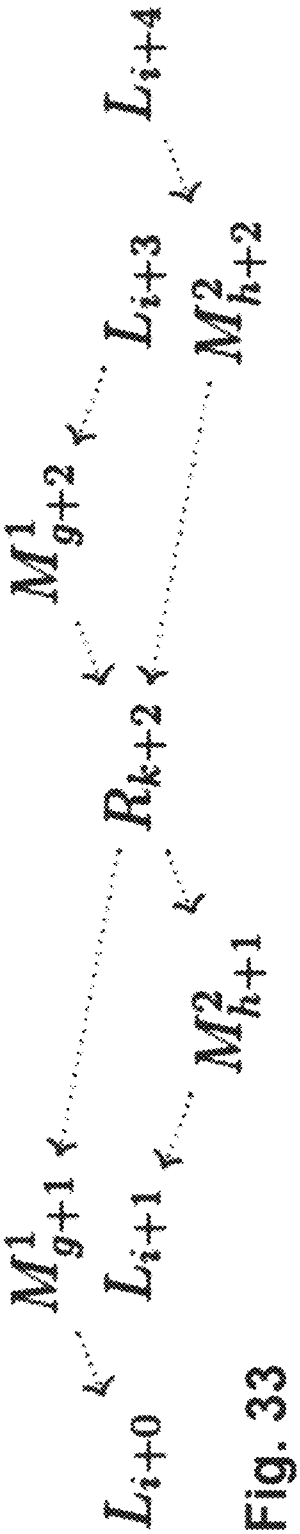
FIG. 33 illustrates 4 possible paths from $L_{i+3}$ to $L_{i+1}$.

As before, we'll look at valid PoRs for $L_{i+3}$ that prove $L_{i+1}$ was reflected in $R_{k+2}$. The exact reflections that exist will be analogous to our prior example, too. See FIG. 32 for the chain-diagram. Notice that there are 4 possible paths from $L_{i+3}$ to $L_{i+1}$ as illustrated in FIG. 32. If all 4 of these PoR paths exist, then $R_{k+2}$ definitely reflects $L_{i+1}$, and its weight can be included in $L_{i+3}$'s total chain-weight. But, what if only some of those paths are available? Consider this alternative case, illustrated in FIG. 33. In this case, L is implicitly reflected in $R_{k+2}$, and $L_{i+3}$ has two possible recursive PoRs of this: $L_{i+1}$ via $$M^2_{h+1};$$

and $L_{i+0}$ via $$M^1_{g+1}.$$

Are both valid? Is either preferable? If $L_{i+3}$ includes the full weight of $R_{k+2}$ in its chain-weight, then what happens when $L_{i+4}$ is mined and the other two POR paths via $$M^2_{h+2}$$

become available?

We can be sure that $R_{k+2}$'s weight can be fully included in L's chain-weight after $L_{i+4}$ is mined (since all POR paths now exist). However, it's not so clear what we should do when not all PoR paths yet exist. Let us approach this from these principles: A reflecting block can only contribute work once—we should not count work more than once. A PoR contributes as much work as an attacker would need to perform to create a competing POR of the same weight. Firstly, we can say that the total work contributed by all possible POR paths is equal to the sum of local work contributed by each unique block in those paths to their respective chains. That is: no work is counted twice, and all blocks in a PoR path contribute work. Secondly, consider that the work contributed by an individual POR is equal to the amount of work that an attacker would need to do to produce an equal and competing PoR. This means that any POR path proving that $R_{k+2}$ reflects $L_{i+1}$ is worth at least as much as $R_{k+2}$. Additionally, a recursive POR is, in isolation, worth exactly as much as the sum of weights of each block in that PoR (excluding local blocks). Thus, we can safely add $R_{k+2}$'s full weight via $L_{i+3}$ (and that weight is attributed to $L_{i+1}$ since it is the most recent L block in $R_{k+2}$'s history). An attacker would need to produce at least as much work as $R_{k+2}$ to perform doublespend against L after $R_{k+2}$'s reflection of $L_{i+1}$ has been counted (assuming the doublespend competes with $L_{i+1}$). Therefore, only the first available recursive POR via $R_{k+2}$ matters. The number of paths from $R_{k+2}$ to past L blocks is not relevant: $L_{i+0}$ is in the history of $L_{i+1}$, and $R_{k+2}$ can only count once. Additionally, the number of paths from L blocks to $R_{k+2}$ IS also not relevant, since $R_{k+2}$ is in the history of all such blocks. Having multiple paths does provide some benefit (as there must be some new reflecting blocks, at least initially), but there will almost always be shorter PoRs that provide the same benefit.

Another way to look at multiple paths is that an attacker (who is attacking L, $M^1$, $M^2$, and R) does not have to do any additional work to generate multiple redundant paths (besides the additional work that is directly involved in creating new blocks).

We do not require that a recursive POR to use the use the same chains in each half of the PoR. Of the 4 possible PoRs, the preferable one is:

$$L_{i+1} \leftarrow M^2_{h+1} \leftarrow R_{k+2} \leftarrow M^1_{g+2} \leftarrow L_{i+3}.$$

This recursive POR path is preferable because it is from the first possible L block to enable a POR via $R_{k+2}$, and goes to the most recent L block in $R_{k+2}$'s history. We go from $L_{i+3}$ to $R_{k+2}$ via $M_1$, and from $R_{k+2}$ to $L_{i+1}$ via $M_2$.

We also can now reason about paths that are longer than the shortest possible path. For example, consider that $M_1$ and $M_2$ reflect each other (although this is not shown in our chain-segment examples). There could be PoR paths that include multiple blocks from $M_1$ and $M_2$ (e.g., $$L_{i+0} \leftarrow M_{g+1}^1 \leftarrow M_{h+1}^2 \leftarrow R_{k+2} \leftarrow M_{g+2}^1 \leftarrow L_{i+3}).$$

$L_{i+3}$). Whilst these kind of paths are valid, they are not that useful: in the example, we expect that $$M_{h+1}^2$$

already reflects an L block, either $L_{i+0}$ directly or a more recent L block.

Finally, let's consider the issue of latency again. Now that there are two possible chains to use going from L to R and vice versa, how long should we expect to wait for draft reflected work via R to appear? After the first L block is generated, we need to wait for a block from either $M^1$ or $M^2$. That takes 0.5 block periods on average. Next, we wait for a block from R (1 block period on average), and then for another block from either $M^1$ or $M^2$ (0.5 block periods). So the expected waiting time is 2 block periods.

Figure 34:
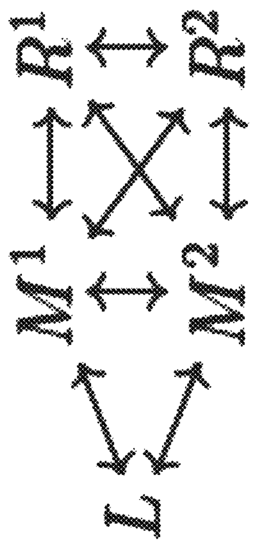
FIG. 34 illustrates a further configuration.

If we had two possible R chains ($R^1$ and $R^2$), then we'd expect to wait only 1.5 block periods for draft reflected work from either $R^1$ or $R^2$. That configuration would look like that illustrated in FIG. 34. In general, for a recursive POR of length 2d−1, where each reflection could be provided by $N_1 v^{-1}$ possible chains, the expected latency of draft reflected work is $N_1^{-1}v(2d-1)$ block periods. This is directly relevant to how fast work propagates within a tiling.

Note that, for a standalone simplex, we can see that $2d\cdot 1=1$ (each POR is of length 1), and v=1 (there is no tiling), so the expected latency of draft reflected work is $N_1^{-1}$ block periods, which, in seconds, is $(N_1 B_f)^{-1}=C'^{-1}$.

Secure Construction of Tree-Tilings

A tiling is secure when attacking any chain in the tiling is as difficult as attacking the entire tiling. Tree-tilings provide specific advantages over other tiling patterns because they are conducive to analysis. One may analyse a tree-tiling in terms of the relationship between parents and children and the relationship between a tile and the root tile. A tiling can be made secure using the combination of recursive POR with specific protocol rules governing the structure of a tiling. For tree-tilings, one such method is detailed below.

Local chain-work is defined as the work contributed by a single simplex-chain (excluding all reflections). Tile-work is defined as the sum of local chain-work of each chain in a given simplex-tile. It is convenient, for the purpose of analysis, to normalize tile-work against a unit tile (which is a tile that is defined to have 1 unit of tile-work). The core of a tree-tiling is defined as the root tile and its immediate child-tiles. All nodes of all chains in all tiles in the network will verify the work of all chains in the core and the PoRs of between all chains in the core.

The security of the tree-tiling will be maintained via recursive POR with the core. The protocol can be constructed so that most of the local chain-work that is produced in the tiling is produced in the core. This is done through a Reward Adjustment Algorithm (RAA) which will adjust block rewards across the tiling to ensure that more than 99% of all work is produced in the core. The RAA does not require global knowledge for this, only local knowledge of its own tile's tile-work and that of its parent tile and that of any child tiles. For a given tile, if the ratio of its tile-work production to that of its parent should exceed some threshold, then the RAA can both instruct that tile to decrease its block rewards by some amount and instruct the parent tile to increase its block rewards by the same amount. If that ratio should drop below some second, lesser threshold, then the inverse instructions are given. There is no required lower bound, though, so this step may be omitted provided that the block rewards of given tile are automatically adjusted up whenever it is allowable. Since the RAA is run by all nodes of all chains in all tiles, the parent tile in this example also repeats the process with its parent tile. In this way, the changes necessary to maintain an appropriate balance of tile-work are propagated through the tiling. Excess block rewards percolate towards the root tile.

The RAA has slightly modified thresholds for the core. The root tile can have a positive bias so that the production of tile-work is more heavily concentrated there. This positive bias can be any number greater than 1, for example: 8. The exact thresholds used by the RAA throughout the rest of the tiling are dependent on this bias and the valence. If the positive bias is 8× and the tiling has a valence of 3, then the standard ratio threshold used by the RAA should be ⅛ (0.125) or less. That is: each tile should produce no more tile-work than ⅛$^{th}$ of its parent's tile-work. The child tiles of the root tile should produce no more than 1/64$^{th}$ of the root tile's tile-work. The specific ratios are governed by an upper limit determined through algebraic analysis of the tiling. Particularly, the total work over the tiling is determined via the sum of an infinite geometric series in terms of the threshold ratio, and an inequality is created in terms of the work produced in the core, this sum, and an attacker with 49.5% of the network hash-rate. Specifically: $(M+r(v-1))/2>qS$, where M is the root tile's bias, r is the threshold ratio, v is the valence, q=0.495 is the proportion of the network hash-rate controlled by the attacker, and S is the total rate of work produced over the entire tiling (note that $S=M-1+(1-r(v-1))^{-1}$).

If all tiles in the tiling use recursive POR with the core (the root tile and its children), then they are at least as secure as the core. The core contains at least 99% of all work produced throughout the network. Thus, all tiles are secured by at least 99% of all work produced throughout the network. Thus, each chain is individually as difficult to attack as the entire network. Thus, a tree-tiling constructed in this way is O(n) secure.

The capacity of such a tree-tiling is directly proportional to the number of individual blockchains comprising it. The number of such chains is dependent on the depth of the tree-tiling and grows exponentially with increasing depth. The order of that exponential growth is v−1, where v is the valence. For example, a tiling of v=3 and depth 5 has 63 tiles in total. Compared to a UT network that does not use tiling, this provides an increase in capacity by a factor of approximately 16. If the depth of the tiling is increased to 10, then the increase in capacity is by a factor of approximately 512. For a depth of 15, the factor is over 16,000.

The ability of a tree-tiling to remain architecturally stable and operationally enduring is dependent on the propagation speed of work within the tiling and the depth of the recursive PoRs involved. The propagation speed of work is the delay between the creation of a block in a given chain and the first recursive POR via the core becoming available for that block divided by the depth of the recursive PoR. The soundness of tree-tilings is inversely related to the delay in recursive PoRs becoming available (which implies that higher propagation speed results in a more sound tree-tiling).

The duration before a recursive POR becomes available is the sum of times for each link in the recursive PoR. Each link in a recursive POR may be facilitated by the creation of a block in any of the simplex-chains that are part of the appropriate tile. Tiles can support more simplex-chains with lower values of v. In general, the time taken to create each link in the recursive POR is one divided by the average block frequency of chains in that tile divided by the number of chains in that tile. For a tiling with 100 chains with an average block frequency of $B_f$=15 Hz, each link takes approximately 0.15 seconds to appear. After a recursive POR becomes available, the chain for which it is valid increases in chain-weight by the same amount as the core did, and thus the difficulty of attacking that chain increased by the same amount as the core. This means that as more and more recursive PoRs become available (for subsequent blocks) the chain in question remains as difficult to attack as attacking the core. Thus, any chain in a tile at a depth of 10 becomes effectively as secure as the entire network after approximately 2.85 seconds.

Tree-Tiling Conclusion

A tree-tiling constructed in this way can propagate work extremely quickly. Additionally, the computational requirements on each node are not overly burdensome, the bandwidth requirements are easily parallelizable, and the increase in network-wide capacity with increasing depth grows exponentially (but none of the architectural costs grow exponentially). Thus, using this method, it is possible to construct a secure and decentralized blockchain network with practically unbounded capacity.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of maintaining integrity of a distributed block chain, including blocks of at least a first (L) and second (R) block chain sequence of blocks, the method including the steps of:

(a) reflecting at least headers of a first block ($L_{i+1}$) of the first (L) block chain in a subsequent first block ($R_{j+1}$) of the second (R) block chain;

(b) reflecting at least headers of the subsequent first block ($R_{i+1}$) in a subsequent ($L_{i+2}$) block of the first (L) block chain;

(c) for the first (L) block chain, and the subsequent ($L_{i+2}$) block, finding a most recently reflected L block as indicated in the reflected headers of the subsequent first block ($R_{j+1}$);

(d) establishing the most recently reflected L block is known to a most recently reflected R block ($R_{j+1}$); and (e) establishing that the reflected R block ($R_{i+1}$) of the second (R) block chain is known to a current L block ($L_{i+2}$);

and wherein said reflecting includes incorporating header information of a block of one block chain into a block of the other block chain.

2. A method of maintaining the integrity of a distributed block chain as claimed in claim 1, the method further including the steps of:

(b1) reflecting at least the headers of the subsequent first block ($L_{i+2}$) in a subsequent ($R_{j+2}$) block of the second (R) block chain;

(c2) for the second (R) block chain, and the subsequent ($R_{i+2}$) block, finding the most recently reflected R block in the reflected subsequent first block ($L_{i+2}$);

(d3) establishing the most recently reflected R block is known to the most recently reflected L block; and (e4) establishing that the L block ($L_{i+2}$) is known to the current R block ($R_{j+2}$).

3. A method as claimed in claim 1, wherein said reflecting further includes an estimate of a cost of creation of the reflected block chain blocks.

4. A method as claimed in claim 1, wherein the reflected header information further includes a weighting of the reflected block chain, the weighting being an indicator of work formed in the reflected chain.

5. A method as claimed in claim 4, wherein the weighting is an estimate of relative work involved in the reflected chain creation.

6. A method as claimed in claim 1, wherein miners of the block chains are incentivized to mine blocks of the block chain which produce a block with a largest reward divided by that block chain's average time between blocks.

7. A method as claimed in claim 1, further comprising recursively reflecting blocks, including the step of a first L block of the first (L) block chain mutually reflecting an M block of an M block chain with the M block mutually reflecting an R block of the second (R) block chain.

8. A method as claimed in claim 7, wherein in a blockchain environment where the first (L) block chain mutually reflects the M block chain which also mutually reflects the second (R) block chain, a method of mutually recursively reflecting the first (L) block chain and the second (R) block chain, the method including the steps of:

(a) the first L block reflecting a first M block of the M block chain, (b) a subsequent L block of the first (L) block chain reflecting a second subsequent M block of the M block chain, (c) the first (L) block chain utilizing the two reflected blocks of the M block chain to determine a reflection of the second (R) block chain.

9. A method as claimed in claim 8, wherein the second (R) block chain utilizes two reflected blocks of the M block chain to determine a reflection of the first (L) block chain.

10. A method as claimed in claim 1, wherein a series of block chains mutually reflect one another.

11. A method as claimed in claim 10, wherein the first (L) block chain reflects multiple child base-chains which, in turn, reflect further child-base chains.

12. A method as claimed in claim 10, wherein miners of each block chain partially validate the blocks of all other associated reflected block chain.

13. A method as claimed in claim 12, wherein the headers include Merkle proofs.

14. A method as claimed in claim 13, wherein at least one node of the first (L) block chain replicates a local instance of the second (R) block chain that follows network rules of the second (R) block chain.

15. A method as claimed in claim 12, wherein the first (L) block chain uses a chain-weighting algorithm which has as input a determination of whether the headers of blocks of the first (L) block chain have been recorded in the second (R) block chain.

16. A method as claimed in claim 15, wherein the chain-weighting algorithm has as input an exchange rate of coin of the first (L) block chain and coin of the second (R) block chain.

17. A method as claimed in claim 12, wherein the block chains use different consensus methods.

18. A system comprising:

a network including a plurality of pairs of reflected block chains having reflections, wherein:

headers of blocks of a first of the pair are recorded in a second of the pair and headers of blocks of the second of the pair are recorded in the first of the pair, and the system is configured to perform the method of claim 12.

19. A system as claimed in claim 18, wherein new block chains and associated reflections are instantiated depending on a capacity of the system.

20. A system as claimed in claim 18, wherein the network comprises a plurality of simplex tiles wherein each simplex tile is arranged such that reflections thereof are internal and mutual and wherein each simplex tile has at least one external reflection to a block chain of another simplex tile.

21. A method as claimed in claim 1, wherein headers of blocks of the second (R) block chain are recorded in the first (L) block chain.

* * * * *